US011130508B2

(12) United States Patent
Houghton

(10) Patent No.: US 11,130,508 B2
(45) Date of Patent: Sep. 28, 2021

(54) SOLAR POWERED CELL NETWORK SWITCH POINT INDICATOR SYSTEM

(71) Applicant: RailSwitchNet, LLC, Burlington, VT (US)

(72) Inventor: Selden Houghton, Milton, VT (US)

(73) Assignee: RailSwitchNet LLC, Burlington, VT (US)

( * ) Notice: Subject to any disclaimer, the term of this patent is extended or adjusted under 35 U.S.C. 154(b) by 324 days.

(21) Appl. No.: 16/511,996

(22) Filed: Jul. 15, 2019

(65) Prior Publication Data

US 2020/0017131 A1 Jan. 16, 2020

Related U.S. Application Data

(60) Provisional application No. 62/698,621, filed on Jul. 16, 2018.

(51) Int. Cl.
| | |
|---|---|
| *B61L 7/06* | (2006.01) |
| *B61L 7/10* | (2006.01) |
| *H02S 40/38* | (2014.01) |
| *H02S 99/00* | (2014.01) |
| *B61L 9/04* | (2006.01) |
| *B61L 27/00* | (2006.01) |

(Continued)

(52) U.S. Cl.
CPC ............. *B61L 7/067* (2013.01); *B61L 7/08* (2013.01); *B61L 7/103* (2013.01); *B61L 9/04* (2013.01); *B61L 27/0005* (2013.01); *B61L 27/0038* (2013.01); *B61L 27/0077* (2013.01); *H02S 40/38* (2014.12); *H02S 99/00* (2013.01); *H04L 67/10* (2013.01); *H04L 67/12* (2013.01)

(58) Field of Classification Search
CPC .... B61L 7/00; B61L 7/06; B61L 7/067; B61L 7/08; B61L 7/10; B61L 7/103; B61L 9/04; B61L 27/0005; B61L 27/0038; B61L 27/0077; B61L 5/107; B61L 5/1881; H02S 40/38; H02S 99/00; H04L 67/10; H04L 67/12
See application file for complete search history.

(56) References Cited

U.S. PATENT DOCUMENTS

| | | | | |
|---|---|---|---|---|
| 5,050,823 A | * | 9/1991 | Parker | ..................... G06F 11/08 246/5 |
| 5,735,492 A | * | 4/1998 | Pace | ........................ B61L 9/04 246/125 |

(Continued)

FOREIGN PATENT DOCUMENTS

EP        0957020 A1 * 11/1999     ............. B61L 5/107

*Primary Examiner* — Zachary L Kuhfuss
(74) *Attorney, Agent, or Firm* — Eric R. Benson, Esq.

(57) ABSTRACT

This invention relates generally to a device which utilizes a solar powered Internet of Things (IoT) technology to remotely monitor the position of railroad switches and derails and send updates by cellular signal to a database via a cloud platform. This new and novel technology allows for cost effective remote monitoring of railroad switch points and derails in dark territory without the need for wayside power or radio communication equipment. The device is also capable of being integrated with dispatch CAD (computer automated dispatch), wayside signalization, positive train control devices, automatic alert generations, active warning devices, crossing gates, as well as power assisted railroad switches.

18 Claims, 30 Drawing Sheets

(51) Int. Cl.
   B61L 7/08    (2006.01)
   H04L 29/08    (2006.01)

(56) References Cited

U.S. PATENT DOCUMENTS

| | | | |
|---|---|---|---|
| 6,427,950 B1 * | 8/2002 | Hoyer | B61L 5/04 |
| | | | 246/257 |
| 7,075,427 B1 * | 7/2006 | Pace | B61L 23/06 |
| | | | 246/125 |
| 7,416,159 B2 * | 8/2008 | Beaman | B61L 5/067 |
| | | | 246/219 |
| RE48,026 E * | 6/2020 | Beamon | B61L 5/045 |
| 2018/0222505 A1 * | 8/2018 | Chung | B61L 27/04 |
| 2020/0399836 A1 * | 12/2020 | Zampini | B61L 5/10 |

* cited by examiner

User: admin | Administration | Device Management | Dashboard | History | Reports | Preferences | Sign Out

| Sub | Switch | Mileage | Power | Position | Derail | Battery | Temp | Cell | Time | Minutes | Type | Target |
|---|---|---|---|---|---|---|---|---|---|---|---|---|
| VTR | LTE Test S003 | 0.00 | On | Normal | On | 0 | 83 | ▂▃▅ | 2019-06-24 09:46:28 | 14 | Scheduled | |
| VTR | Test S001 | 0.00 | On | Normal | On | 81 | 77 | ▂▃▅ | 2019-06-24 09:53:08 | 7 | Scheduled | |
| VTR | Test S002 | 0.00 | On | Normal | On | 82 | 75 | ▂▃▅ | 2019-06-24 09:55:49 | 5 | Scheduled | |

| Sub | Advanced Switch Indicator | Mileage | Power | Aspect | Battery | Temp | Cell | Last Update | Minutes | Type |
|---|---|---|---|---|---|---|---|---|---|---|
| VTR | LTE Test I003 | 0.00 | On | Green | 0 | 83 | ▂▃▅ | 2019-06-24 09:46:46 | 14 | Scheduled |
| VTR | Test I001 | 0.00 | On | Green | 83 | 72 | ▂▃▅ | 2019-06-24 09:55:20 | 5 | Scheduled |

FIG. 16

| Sub | Switch | Mileage | Power | Position | Derail | Battery | Temp | Cell | Time | Type | Target |
|---|---|---|---|---|---|---|---|---|---|---|---|
| VTR | Test S001 | 0.00 | On | Normal | On | 81 | 77 | Fair | 2019-06-24 09:53:08 | Scheduled | |
| VTR | Test S001 | 0.00 | On | Normal | On | 81 | 78 | Fair | 2019-06-24 09:38:03 | Scheduled | |
| VTR | Test S001 | 0.00 | On | Normal | On | 81 | 78 | Fair | 2019-06-24 09:22:58 | Scheduled | |
| VTR | Test S001 | 0.00 | On | Normal | On | 81 | 78 | Fair | 2019-06-24 09:07:53 | Scheduled | |
| VTR | Test S001 | 0.00 | On | Normal | On | 81 | 78 | Fair | 2019-06-24 08:52:48 | Scheduled | |
| VTR | Test S001 | 0.00 | On | Normal | On | 81 | 78 | Fair | 2019-06-24 08:37:42 | Scheduled | |
| VTR | Test S001 | 0.00 | On | Normal | On | 81 | 78 | Fair | 2019-06-24 08:22:37 | Scheduled | |
| VTR | Test S001 | 0.00 | On | Normal | On | 81 | 78 | Fair | 2019-06-24 08:07:33 | Scheduled | |
| VTR | Test S001 | 0.00 | On | Normal | On | 81 | 76 | Fair | 2019-06-24 07:52:30 | Scheduled | |
| VTR | Test S001 | 0.00 | On | Normal | On | 81 | 76 | Fair | 2019-06-24 07:37:25 | Scheduled | |
| VTR | Test S001 | 0.00 | On | Normal | On | 81 | 76 | Good | 2019-06-24 07:22:22 | Scheduled | |
| VTR | Test S001 | 0.00 | On | Normal | On | 81 | 76 | Fair | 2019-06-24 07:07:17 | Scheduled | |
| VTR | Test S001 | 0.00 | On | Normal | On | 81 | 76 | Good | 2019-06-24 06:52:14 | Scheduled | |
| VTR | Test S001 | 0.00 | On | Normal | On | 81 | 76 | Fair | 2019-06-24 06:37:11 | Scheduled | |
| VTR | Test S001 | 0.00 | On | Normal | On | 81 | 77 | Good | 2019-06-24 06:22:07 | Scheduled | |

SOLAR POWERED CELL NETWORK SWITCH POINT INDICATOR SYSTEM

CROSS REFERENCE TO RELATED APPLICATION

This Application claims priority from the Applicant's Provisional Patent Application No. 62/698,621 which was filed on Jul. 16, 2018.

STATEMENT AS TO RIGHTS TO INVENTIONS MADE UNDER FEDERALLY SPONSORED RESEARCH OR DEVELOPMENT

Not applicable.

REFERENCE TO A SEQUENCE LISTING, A TABLE OR A COMPUTER PROGRAM LISTING APPENDIX SUBMITTED ON A COMPACT DISC

Not Applicable.

FIELD OF THE INVENTION

This invention relates generally to the railroad industry. This invention is a device which utilizes a solar powered Internet of Things (IoT) technology to monitor the position of railroad switches and derails and sends updates respecting these positions by cellular signal to a database that is monitored by railroad personnel, which may include the train crew, via a cloud computing service platform. In the preferred embodiment of the invention the cellular signal is also transmitted to a solar powered wayside indicator which will illuminate red, green or yellow LED signal lamps that are visible to the train crew upon an approaching train. This new and novel technology allows for cost effective monitoring of railroad switch points and derails in dark territory without the need for wayside power or radio communication equipment. The device is also capable of being integrated with dispatch CAD (computer automated dispatch), wayside signalization, positive train control devices, automatic alert generations, active warning devices, crossing gates, as well as power assisted railroad switches and derails.

BACKGROUND ART

I. Dark Territory Switch Control Technology and Problems:

On Sunday, Feb. 4, 2018, the New York City to Miami Amtrak 91 train with 8 crew members and 139 passengers on board was traveling south at 56 mph in Cayce, S.C. when the engineer threw the train into emergency. In the following 5 seconds the train had slowed to 50 mph when it then collided head on into a parked CSX freight train. The collision was so powerful that the Amtrak locomotive was unrecognizable and the heavy parked CSX train was moved 15 feet with its locomotive heavily damaged. The crash killed 2 Amtrak crew members and sent 116 to the hospital with a wide range of injuries. The National Transportation Safety Board investigated the accident and concluded that the incident was caused by a track switch in the reverse position which caused the Amtrak train to leave the main line and enter upon the siding where the CSX train was parked. The reverse set track switch had an inoperative signal system that failed to warn the Amtrak crew of the condition of the switch.

While it is true that the Cayce S.C. accident could possibly have been prevented had the signal system been operational, the reality is that in the United States the overwhelming majority of railroad switches that are potentially misaligned or reverse set, and as such causing accidents, do not have any signaling systems. These stretches of railroad are called "Dark Territory." Dark Territory is a term used in the railroad industry to describe a section of running track that is not controlled by signalization. Train movements in Dark Territory were previously handled by timetable and train order operation. Since the widespread adoption of the use of two way radio communications these have been replaced by track warrants and direct traffic control with train dispatchers managing train movements directly over the radio. Despite these measures the safety concern in Dark Territory is the possibility of a misaligned or a reverse set switch left in that condition by human error that does not get picked up by dispatch and an erroneous track warrant is issued. As seen with the Amtrak 91 train an erroneous reverse set switch often has fatal consequences. A misaligned switch, which is neither in a normal nor in a reverse position, will lead to a derailment of a train as it attempts to pass the switch on the main line. Switch related accidents are the second highest number of accidents on U.S. railroads that can be reduced by implementation of existing safety technology, which is second only to broken rail. The large number of switches in Dark Territory and the costs of such implementation, however, effectively prevent any such existing technologies from being implemented, especially on the Class II and Class III railroads.

According to the U.S. Federal Railroad Administration in 2011, 34% or 31,831 miles of Class I Freight Railroads, 89% or 13,636 miles of Class II Regional Railroads and 97% or 27,473 miles of Class III Short Line Railroads are Dark Territory. Within that 72,940 miles of rail line there are thousands upon thousands of switches that could potentially be misaligned or erroneously left set in reverse or open, then by human error erroneously reported to dispatch as properly aligned (normal or locked and green) that then result in dispatch issuing a track warrant that leads to disaster such as occurred in Cayce, S.C. In fact 75.7% of all accidents per trillion gross ton mile (GTM) on Class I main lines are attributable to dark territory. In some instances the switches are intentionally misaligned (open position) or set in reverse by unauthorized tampering by vandals intent on causing harm.

Railroad track switch position monitoring devices or indicators are certainly not new, however, 52% of the nation's rail lines do not have such devices remaining as Dark Territory subject to human error or vandalism that lead to erroneous track warrants. There appear to be two principal reasons for this. First is the astronomical cost for the signalizing of such switches and installation of centralized train control, which often exceed $100,000.00 per switch. With over an estimated 10,800 such Dark Territory switches in the United States it would cost an estimated $1,080,000,000.00 to install basic wayside signalization systems on all of them and significantly more for centralized train control. Absent a government grant for such a project the Class II and Class III railroads where the majority of the Dark Territory is located are not able to afford such a large cost. The other limiting factor is access to reliable electrical power needed to operate these devices, which is often nonexistent in many remote locations.

The control of the movement of trains in a train yard and on the main line is very complicated and critical to avoid collisions with other trains and derailments. With intense competition in the transportation industry there is significant pressure to increase the performance of railroads in terms of speed and dependability as well as safety. This pressure has led to many innovations directed at automating various aspects of train operations, including switches.

The most common method of Class II and Class III railroads for controlling trains in the 41,109 miles of Dark Territory is known as track warrant control where there is no Centralized Traffic Control (CTC). CTC is a complex and expensive system that allows a dispatcher to control movement of trains by controlling track switches and wayside signals from a central dispatch office. Absent CTC a track warrant is permission given by a railroad's dispatcher over a radio to occupy a given section of main line track, i.e., a block. This form of track warrant control takes the form of verbal ("written") orders which can be modified or even rescinded by communication over a radio with the railroad's dispatcher. The dispatcher gives a train, or a maintenance crew, verbal authority (a warrant) to occupy a portion of main line track between named locations (e.g., mile markers, switches, stations, or other points). Track warrants may also specify speed limits, direction, time limits, and whether to clear the main line (e.g., by entering a secondary track such as a siding) and/or any other section of track (sidings, yards secondary track, etc.).

The track warrant system is a complicated and very time consuming procedure. It requires the train conductor or engineer to read back the warrant to the dispatcher before the warrant can go into effect. For purposes of my invention an important disadvantage to this warrant system is that it relies on the accuracy of the data provided to the dispatcher regarding the condition of the switches in the block covered by any given warrant that is reported by the last train crew or maintenance workers on the line subject to the previous warrant. Neither the dispatcher nor the train crew or maintenance workers have access to real time data as to the condition of the switches in a warrant as would be present in a costly CTC system. The dispatcher relies on the data as to switch positions provided by the train crew or maintenance workers who were last issued a warrant for the same block. Given human error, this data is subject to mistake, or possible error to an intervening vandalism, either of which can be disastrous.

The RDC (Railroad Development Corporation) Track Warrant Control System has automated some of the track warrant control by sending the warrant to the train crew by means of a computer system. Like the standard track warrant system this system does not utilize real time data and is susceptible to human error.

Some switches in Dark Territory are incorporated into an Automatic Block Signaling (ABS) system. ABS automatically engages the wayside signaling of block status and authority to enter or occupy any given block. In this system, dispatcher issued track warrants may overlap and the conductor or engineer ultimately rely on the automatic wayside signals to determine when and how to proceed in a given block. Since humans are involved in this process errors are possible. ABS systems are generally cost prohibitive and depending upon the location of any wayside signalization, these systems do not provide any significant advance notice of the condition of the switches in the system.

In yet another system that exists in the prior art, the Cab Signal system utilizes a display in the locomotive cab for the engineer and conductor. A wayside signal is displayed and requires the engineer and/or conductor to acknowledge any signals that are more restrictive than the current signal. The Cab Signal system is not automatic and relies upon the train crew to obey the more restrictive signal. Cab Signal systems are likewise very costly and often conflict with the data upon which the dispatcher may issue a warrant.

Several other systems are in use in the prior art to prevent a train from falling prey to a misaligned or erroneous reverse set switch. These extremely expensive and complicated systems include such technologies as: Centralized Traffic Control (CTC); updated CTC systems such as the Harmon Electronics' Radio Actuated Code System that integrates differential GPS technology; the Union Switch and Signal Inc. Automatic Train Stop (ATS) system which utilizes a mechanical contact between a wayside trip arm and a brake emergency trip switch mounted to the train; the Automatic Train Control (ATC) system where train location information, speed information, and train control information are continually exchanged between a locomotive and computerized wayside controllers in real time; the General Electric Transportation Systems' Advanced Automated Train Control (AATC) system is combined with an Automatic Train Operation (ATO) system and fully automates the movement of trains; the Positive Train Stop (PTS) system which uses transponders along the tracks and on-board receivers to supplement an ATC system; the Harmon Industries' Ultracab utilizes an ATC system that automatically stops a train before going through a stop signal; the GE Transportation Systems' Incremental Train Control System (ITCS); and the GE Harris Railway Electronics' Precision Train Control. As mentioned above, regardless of how laudable a goal it may be to install these highly sophisticated and expensive systems to protect public safety, the reality is that the Class II and Class III railroads simply cannot afford to do it. Therefore these railroads have a long felt need for a device that will provide their dispatchers, maintenance workers and train crew with real time data regarding the conditions of the switches on the railroad at a price that they can afford.

II. Derail Technology and Problems:

In the overwhelming number of dark territory switches, the switch is located on a siding where railroad cars are often uncoupled from a train and left parked at a point on the siding such that a train on the main line can safely pass, which point is called the clearance point. To prevent the uncoupled cars from rolling onto, or too close to, the mainline the handbrakes on the cars are set and a derail is engaged. A derail, sometimes referred to as a derailer, is a device used to prevent the fouling (blocking or compromising) of a railroad track, typically a main line. Undetected such a blocking when undetected by a train crew can lead to a collision, property damage and even death. The derail will also prevent a collision with anything present on the track, such as a person, a train or a fallen branch by unauthorized movements of trains or unattended rolling stock. A derail works by derailing the equipment as it rolls over or through it. Although accidental derailment is damaging to equipment and track, and requires considerable time and expense to remedy, derails are used in situations where there is a risk of greater damage to equipment, injury or death if the equipment were allowed to roll past the clearance point into a zone of danger.

Derails have failed in the past and often with dire consequences. On Apr. 1, 1987, for example in Burnham, Ill. an unsecured car in a siding defeated a derail and fouled the main railroad line. Due to rusty rails, a coal car failed to shunt the track circuit that should have put block signals to stop. The engineer of a Chicago South Shore and South Bend passenger train was killed and four people suffered minor injuries when the lead car of the train rammed a portion of an empty coal car that rolled down a siding and partially blocked the South Shore line near Burnham. On Apr. 20, 2017, three workers were killed in an accident on the Englewood Railway in Woss, British Columbia when 11 runaway railcars full of logs crashed into them and their equipment while they were working on the line. The railcars had become decoupled at the top of the hill and as they rolled out-of-control down the hill they overpowered the derails which had been installed incorrectly and into rotting rail ties.

Unfortunately many incidents of unattended or parked railcars rolling onto a main line or otherwise fouling track are the result of train crew negligence or failure to set the derail or vandals intentionally disengaging the derail thus allowing a car to roll thereby. While sophisticated derail detection and control devices exist, their use is most often limited to railyards and not in remote dark territory, primarily because of the very high cost of such systems. For instance Automatic Derails from Control Tech of Northeast Florida markets an Automatic derail device it claims will allow an operator the ability to provide protection from a computer. Its device features indicator lights that alert workers when the derails are engaged or disengaged. The system also has a camera that lets workers monitor the status remotely. This system is sold at about $100,000.00, and does not integrate its monitoring with a switch and/or wayside signalization as would be needed in a dark territory setting, most often where no electrical power is available. Indeed there does not appear to be any such systems in the prior art.

II. Wayside Signalization Technology and Problems:

There are solar powered wayside systems available in the current marketplace. These systems still rely on radio signals for data transfer and do not teach the use of the IoT based data transfer. Ameresco Solar Railroad Solutions offers a solar powered wayside system that claims integration into PTC systems as well as Pole Line Elimination. These systems do not incorporate the means to integrate with derail data and provide multipoint retrieval and/or control via the Internet.

Long Felt Need Satisfied by the Invention

My invention meets the long felt need for a cost effective means of providing railroad dispatchers, maintenance workers, train crews or other authorized users with reliable, real time data of the condition of all the switches and derails located within a railroad's Dark Territory. My device incorporates cellular technology that is uniquely married up with standard railroad switch and derail controllers together with solar power technology utilizing reliable cloud computing service based IoT technology to provide real time data regarding switch and derail positions on the railroad to all key personnel and provide remote solar powered wayside signalization. My invention is easily adaptable to be used in any Centralized Train Control or Positive Train Control system and would replace the very expensive primary power and communication systems of those devices by the solar/battery and cellular communication features of my invention.

It has been more than ten years since the United States Congress passed the Rail Safety Improvement Act of 2008 which specifically directed the Federal Railroad Administration in Section 406 to oversee the "Development and Use of Rail Safety Technology in Dark Territory." While it is true that existing technologies in the prior art, as outlined above, are available to increase safety in Dark Territory, the reality is that nearly 11,000 switches and unnumbered derails remain in Dark Territory that need an inexpensive and reliable means to monitor those switches and derails for the safety of the general public as well as the railroad workers. My invention satisfies that long felt need.

DISCLOSURE OF THE INVENTION

Purpose of Invention

The purpose of the invention is to provide a low cost reliable solar powered cellular transmitted railroad switch and derail monitoring system that by means of cellular transmission utilizes the IoT on the cloud computing service to monitor in real time the condition of the railroad switches on the main line of a railroad and the derails located on connected side tracks. The device will provide key railroad personnel the data regarding whether a switch is in an open, reverse or normal position, and if a derail is engaged or disengaged, all of which is critical information necessary to determine if a train may safely pass the monitored switch on the main line tracks of the railroad. The invention also includes the use of solar powered wayside signalization whereby the switch condition (position) and derail condition (position) data is also received over the cloud computing service providing illuminated LEDs that indicate to an approaching train crew the condition of the switch and/or derail that the train is approaching. Additionally my invention includes a low cost reliable solar powered cellular transmitted railroad switch and derail monitoring system that utilizes the IoT on the cloud computing service.

Description of Problems Solved by Invention

Thus, while there are a number of prior art attempts to solve the problems identified above none of these devices are satisfactory solutions. Therefore there is a great need for a solar powered cell network switch point and derail indicator that solves these problems. My invention is designed to solve these problems that exist in the current art. Specifically my invention utilizes low cost reliable solar, IoT, Internet and cellular technologies to communicate standard analog railroad switch and derail condition data to key railroad personnel in real time.

My invention utilizes proprietary software and electronic hardware to translate standard railroad switch and derail condition (position) data into a form that may be uploaded via a user selected cellular network to a user selected cloud computing service for access by a computer. The computer then interprets that data it has received over the cloud computing service which a user then may access by means of different proprietary screen displays of the data in a form that facilitates a quick and efficient means of preparing accurate track warrants for the safe operation of trains on a railroad's main lines. These screen displays may be displayed on any device capable of connecting to the Internet, such as a PC, laptop, tablet or cellular telephone which have been granted permission to access that information from the computer. The devices may be used by any authorized railroad personnel, including, but not limited to dispatch, the train crew or office staff. Additionally, the railroad switch and derail condition (position) data is also transmitted over the cloud computing service to wayside signal devices that provide LED illuminated advance warning to approaching train crew as to the condition (position) of the switch(es) and derail(s) which the crew may be approaching at a distance that affords the train crew sufficient time to respond if the train cannot safely pass the switch if so indicated by the wayside signal.

Additionally by means of the computer an authorized user may program additional uses of the data it receives, such as: sounding an audible alarm; causing one or more lights to light up or flash; sending a text message to a mobile device;

placing a telephone call with a voice message given once answered; broadcast a radio signal; send an email; print reports; activate a gate or other early warning device at a railroad crossing; contact select emergency personnel; activate railroad switches, activate derails; and activate automatic or positive train control devices. Another important feature of my invention is that the computer permits an authorized user to access and program by means of the cloud computing service via the cellular network both a switch assembly cellular microcontroller connected to a switch and derail controller and a wayside assembly cellular microcontroller connected to a wayside signal.

Brief Description of Invention

My Solar Powered Cell Network Switch Point Indicator System invention relates generally to the railroad industry. The Solar Powered Cell Network Switch Point Indicator System in its best mode is generally composed of five major components: 1) a cloud computing service; 2) a cellular network; 3) at least one switch assembly comprised of a solar powered railroad switch position detection means and a railroad derail position detection means connected to a cellular microcontroller that is in communication with the cloud computing service via the cellular network; 3) at least one wayside assembly comprised of a solar powered wayside signal means that is in communication with the cloud computing service via the cellular network; and 5) at least one computer that is in communication with the switch assembly and the wayside assembly by means of the cloud computing service.

The switch assembly in the best mode is comprised of: a switch assembly solar panel comprised of a 50 W 17V Solar panel; a switch assembly battery comprised of a 12V lead acid battery; a railroad switch circuit controller performing the function of the railroad switch position detection means; a derail circuit controller performing the function of the derail position detection means; a switch assembly solar controller, a switch assembly backup battery comprised of a 3.7V lithium polymer backup battery; a switch assembly circuit board; a switch assembly cellular microcontroller; a switch assembly cellular antennae connected to the switch assembly cellular microcontroller; and a switch assembly temperature sensor. The switch assembly is powered by the switch assembly solar panel and/or the switch assembly battery with the power's integrity to the switch assembly being monitored and controlled by the switch assembly solar controller. The switch assembly has failsafe backup power and high current demand provided by the switch assembly backup battery. The switch assembly cellular microcontroller generates data based upon the electrical current flowing through the switch circuit controller, which current flow will indicate the three possible railroad switch positions known in the railroad industry as open, reverse and normal. The switch assembly cellular microcontroller also generates data based upon the electrical current flowing through the derail circuit controller which current flow will indicate whether the derail is engaged or disengaged. The switch position and the derail position generated data is then transmitted in real time by cellular transmission over a cellular network to a cloud computing service and which data is thereby accessible by means of the cloud computing service by the wayside assembly and the computer. The computer processes the data that it has received over the cloud computing service into usable data displayed on various user selected screen displays that may be accessed by key authorized railroad personnel, i.e. the dispatcher, the train crew or other authorized railroad personnel by means of the computer, the Internet on user selected devices such as a personal computer, laptop computer, personal electronic device, tablet or cellular phone and to perform other user specified functions.

The computer in the best mode is programmed with proprietary software that allows the computer to process the data from the switch assembly that it has received over the cloud computing service to which it is connected for ultimate generation of a plurality of proprietary screen displays containing the data. The screen displays may then be selected and viewed by an authorized user by means of a user selected device such as the computer, a personal computer, laptop computer, a personal electronic device, a tablet or cellular phone. By means of the computer an authorized user may program additional uses of the data it receives, such as: sounding an audible alarm; causing one or more lights to light up or flash; sending a text message to a mobile device; placing a telephone call with a voice message given once answered; broadcast a radio signal; send an email; print reports; activate a gate or other early warning device at a railroad crossing; contact select emergency personnel; activate railroad switches, activate derails; and activate automatic or positive train control devices. Additionally the computer permits an authorized user to access and program by means of the cloud computing service both the switch assembly cellular microcontroller and the wayside assembly cellular microcontroller.

The wayside assembly in the best mode is comprised of: a wayside assembly solar panel comprised of a 100 W 17V Solar panel; a wayside assembly battery comprised of a 12V lead acid battery; a wayside assembly solar controller; a wayside lamp assembly with red, yellow and green LED lights which together performs the function of the wayside signal means, a wayside backup battery comprised of a 3.7V lithium polymer backup battery; a wayside assembly circuit board; a wayside assembly cellular microcontroller; a wayside assembly cellular antennae connected to the wayside assembly cellular microcontroller; and a wayside assembly temperature sensor. The wayside assembly is powered by the wayside assembly solar panel and/or the wayside assembly battery with the power's integrity to the wayside assembly being monitored and controlled by the wayside solar controller. The wayside assembly failsafe has backup power and wayside high current demand provided by the wayside assembly backup battery. The wayside assembly receives data from the switch assembly through the cloud computing service using IoT technology by means of the wayside cellular microcontroller regarding the railroad switch condition (position) and the derail condition (position) at the railroad switch being monitored by the switch assembly, which data is then processed by the wayside assembly cellular microcontroller which then provides power through the wayside assembly circuit board to illuminate one of three LED lights of the wayside lamp assembly to signal the condition (position) of the railroad switch and the derail, which signal is visible by a train crew in a train that is approaching the switch.

In the best mode, when the switch assembly(ies) detects and thence transmits data indicating that the railroad switch position of the railroad switch(es) it is monitoring is in the normal position and that the derail is in the engaged position, which data is accessed by each wayside assembly with programmed access thereto, each wayside assembly(ies) will then cause just the green LED light of the wayside lamp(ies) assembly to illuminate. An illuminated green LED light signaling to an approaching train that the switch(es)

that is being monitored by the device may be passed over on the main railroad line by the approaching train. In the event the switch assembly(ies) detects and thence transmits data indicating that the railroad switch position of the railroad switch(es) it is monitoring is in the reverse position, which data is accessed by each wayside assembly(ies) with programmed access thereto, the wayside assembly(ies) will then cause just the yellow LED light of the wayside lamp assembly(ies) to illuminate. An illuminated yellow LED light signaling to an approaching train that the switch(es) that is being monitored by the device may not be passed over on the main railroad line by the approaching train the switch(es) being set for a train to enter upon the railroad siding served by the switch(es). In the event the switch assembly detects and thence transmits data indicating that the railroad switch position of the railroad switch(es) it is monitoring is in the open position, which data is accessed by each wayside assembly(ies) with programmed access thereto, the wayside assembly(ies) will then cause just the red LED light of the wayside lamp assembly(ies) to illuminate. An illuminated red LED light signaling to an approaching train that the switch(es) that is being monitored by the device may not be passed over on the main railroad line by the approaching train, nor may the train enter upon the railroad siding served by the switch(es) and that the train must approach the switch(es) with extreme caution being prepared to stop before reaching the switch(es). In the event the switch assembly detects and thence transmits data indicating that the railroad switch position of the railroad switch(es) it is monitoring is in the normal position and that the derail position of the derail(s) located on the siding accessed by the railroad switch(es) it is monitoring is in the disengaged position, which data is accessed by each wayside assembly programmed with access thereto, the wayside assembly(ies) will then override the normal position data it receives regarding the switch(es) position and will then cause just the yellow LED light of the wayside lamp assembly(ies) to illuminate by flashing the yellow LED light on an off. An illuminated flashing yellow LED light signaling to an approaching train that the switch(es) that is being monitored by the device is in the normal position, but that the derail(s) is disengaged thereby alerting the train to approach the monitored switch(es) with caution being prepared to stop because of the possibility that the main line may be fouled by a train or railcars that may have rolled into that position because they were not prevented from doing so by an engaged derail. In the event the switch assembly(ies) detects and thence transmits data indicating that the switch assembly(ies) power has failed each wayside assembly programmed with access thereto will then cause just the red LED light of the wayside lamp assembly(ies) to illuminate by flashing the red LED light on an off. An illuminated flashing red LED light signaling to an approaching train that the switch assembly(ies) power has failed and the switch(es) position is unknown and that the train must approach the switch with caution being prepared to stop before reaching the switch. In the event the switch assembly(ies) fails to transmit any data indicating that the switch assembly(ies) connection the cloud computing service has failed then each wayside assembly programmed with access thereto will not illuminate any of the LED lights of the wayside lamp assembly(ies). An unilluminated or dark wayside lamp assembly(ies) signaling to an approaching train that the switch(es) position that the train is approaching is unknown and that the train must approach the switch with caution being prepared to stop before reaching the switch.

BRIEF DESCRIPTION OF THE DRAWINGS

FIG. 12 also depicting a top view of the Derail Assembly DRIA installed in its functional location on the side tracks of the switch being monitored by the Solar Powered Cell Network Switch Point Indicator System device with the Derail DR disengaged, which disengaged position will allow a train to pass by the derail on the siding and which disengaged derail position and reverse switch position will be communicated to the Wayside Assembly WIA depicted in FIG. 2 by the Switch Assembly Cellular Microcontroller U1 by means of the CLOUD COMPUTING SERVICE thereby causing the Wayside Yellow LED WYLED of the Wayside Lamp Assembly WLA to flash on and off thereby signaling an approaching train that the derail is in the disengaged position and to approach the switch with caution being prepared to stop before the switch since the main line may be fouled by rail cars that rolled beyond the clearance point. In the event the Manual Rail Switch MRSW is properly set to the reverse position as depicted in this FIG. 12, but the Derail DR was set in the engaged position as depicted in FIGS. 13 & 14 then the engaged derail position and reverse switch position will be communicated to the Wayside Assembly WIA depicted in FIG. 2 by the Switch Assembly Cellular Microcontroller U1 by means of the CLOUD COMPUTING SERVICE thereby causing the Wayside Yellow LED WYLED of the Wayside Lamp Assembly WLA to illuminate thereby signaling thereby signaling an approaching train that the derail is in the disengaged position, the switch is in the reverse position and to approach the switch with caution being prepared to stop before the switch since the train may not pass over the switch on the main line.

FIG. 13 also depicting a top view of the Derail Assembly DRIA installed in its functional location on the side tracks of the switch being monitored by the Solar Powered Cell Network Switch Point Indicator System device with the Derail DR engaged, which engaged position will not allow a parked train or other parked railcars to pass by the derail on the siding which could foul the main line and which engaged derail position and reverse switch position will be communicated to the Wayside Assembly WIA depicted in FIG. 2 by the Switch Assembly Cellular Microcontroller U1 by means of the CLOUD COMPUTING SERVICE thereby causing the Wayside Green LED WGLED of the Wayside Lamp Assembly WLA to illuminate thereby signaling an approaching train that it is safe to pass the switch on the main line.

FIG. 13 also depicting a top view of the Derail Assembly DRIA installed in its functional location on the side tracks of the switch being monitored by the Solar Powered Cell Network Switch Point Indicator System device with the Derail DR engaged, which engaged position will not allow a parked train or other parked railcars to pass by the derail on the siding which could foul the main line and which engaged derail position and open switch position will be communicated to the Wayside Assembly WIA depicted in FIG. 2 by the Switch Assembly Cellular Microcontroller U1 by means of the CLOUD COMPUTING SERVICE thereby causing the Wayside Red LED WRLED of the Wayside Lamp Assembly WLA to illuminate thereby signaling an approaching train that it is not safe to pass the switch on the main line and to approach the switch with extreme caution being prepared to stop before the switch.

FIG. 16 is a screenshot of one of the available data screen displays generated by the COMPUTER intended to be available for review by authorized railroad personnel, such as the train crew and railroad dispatchers responsible for issuing track warrants for the track where the switch data is being generated and received via the CLOUD COMPUTING SERVICE and user access to the COMPUTER by means of the Internet. The screen display depicted in this FIG. 16 displays data for more than one switch, each being monitored by a Solar Powered Cell Network Switch Point Indicator System device.

FIG. 17 is a screenshot of yet another one of the available data screen displays generated by the COMPUTER intended to be available for review by authorized railroad personnel, such as the train crew and railroad dispatchers responsible for issuing track warrants for the track where the switch position data is being generated and received via the CLOUD COMPUTING SERVICE and user access to the COMPUTER. The screen display depicted in this FIG. 17 displays data for one switch in fifteen (15) minute intervals which provides critical information necessary to track the integrity of the device and possible maintenance of the system.

Figure 19:
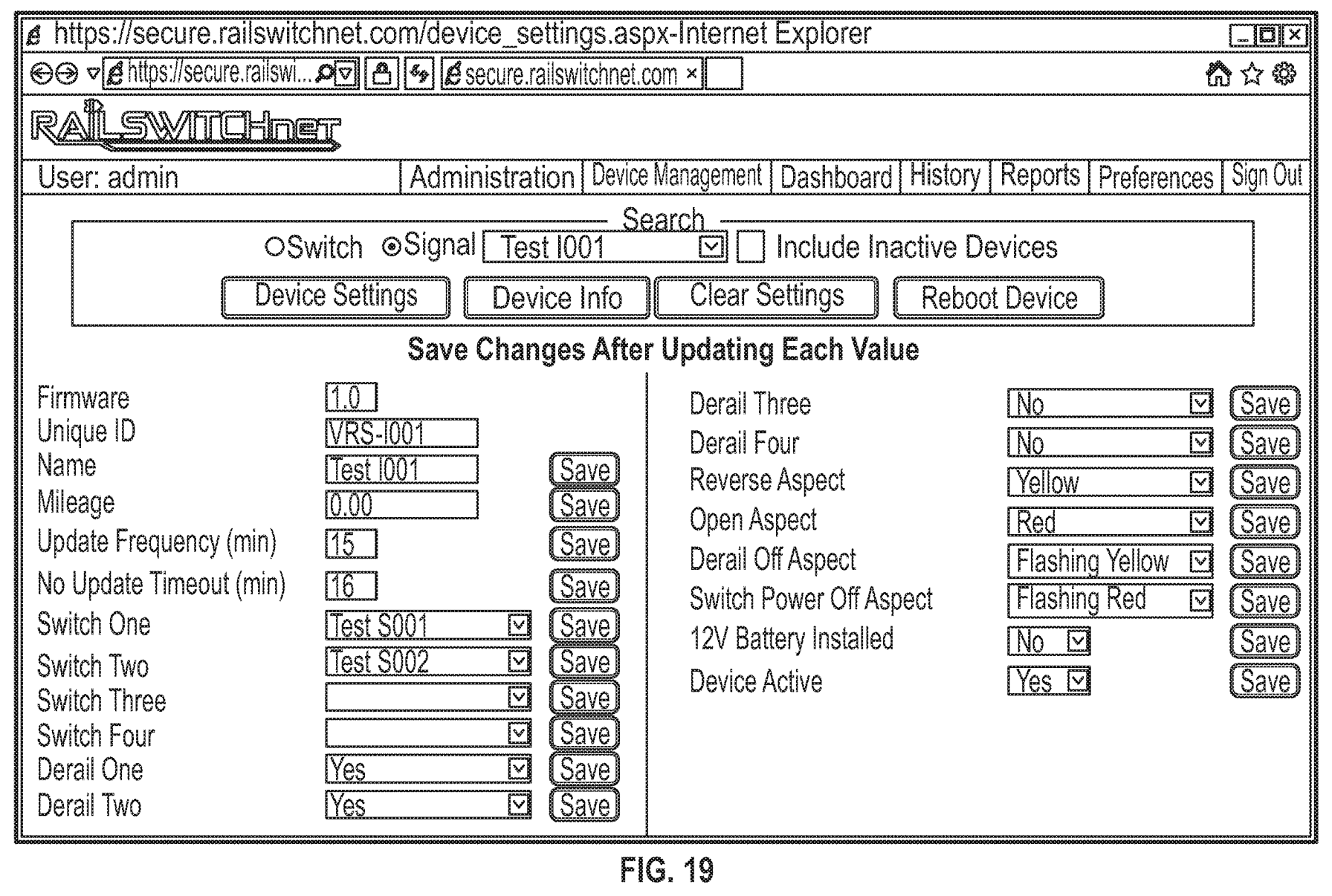

FIG. 19 is a screenshot of yet another one of the available data screen displays generated by the COMPUTER intended to allow authorized railroad personnel to remotely monitor, reboot and/or reprogram the Wayside Assembly Cellular Microcontroller U2 component of the Cell Network Switch Point Indicator Solar Powered Cell Network Switch Point Indicator System devices connected to the COMPUTER through the CLOUD COMPUTING SERVICE.

Figure 20:
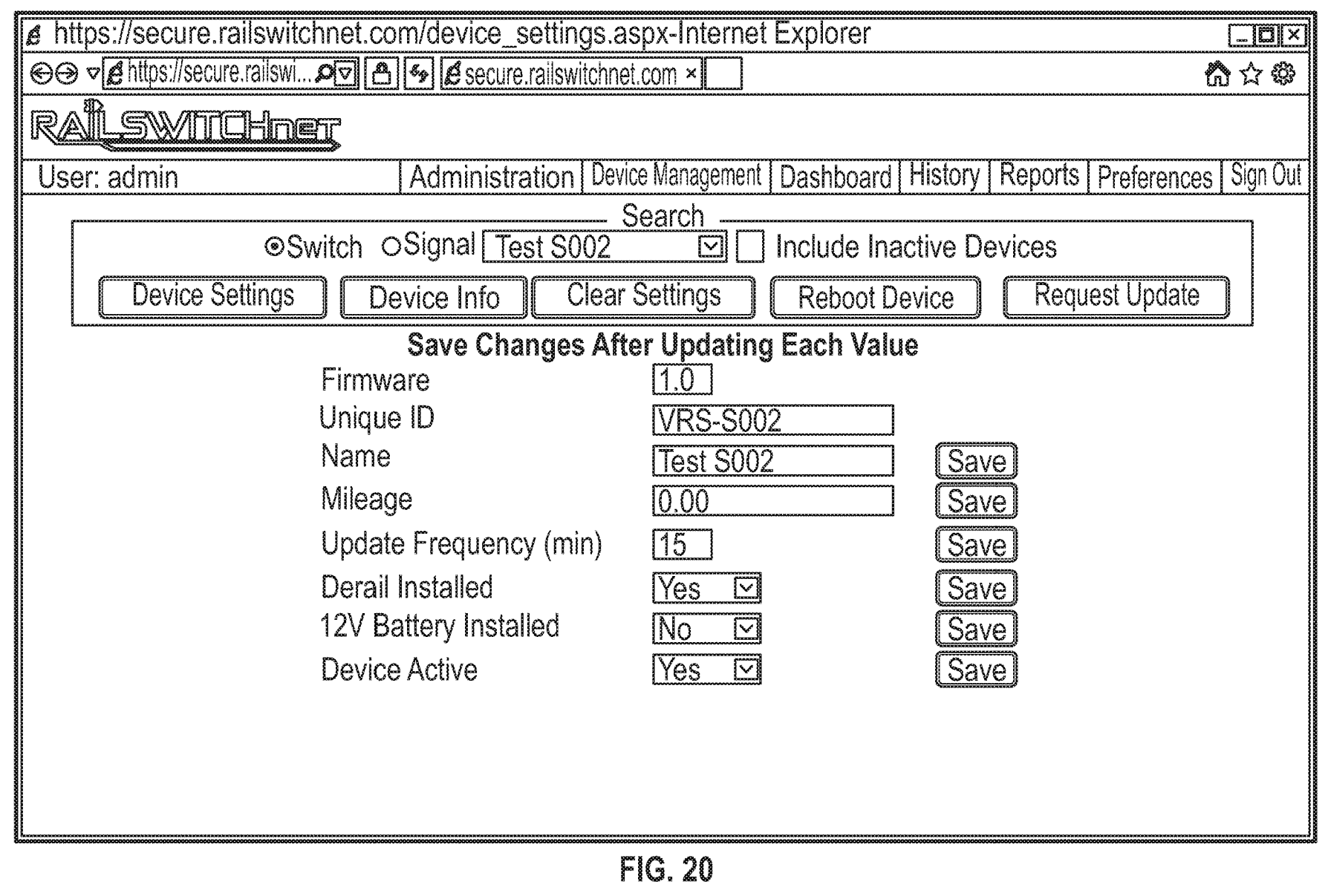

FIG. 20 is a screenshot of yet another one of the available data screen displays generated by the COMPUTER intended to allow authorized railroad personnel to remotely monitor, reboot and/or reprogram the Switch Assembly Cellular Microcontroller U1 component of the Solar Powered Cell Network Switch Point Indicator System devices connected to the COMPUTER through the CLOUD COMPUTING SERVICE.

BEST MODES FOR CARRYING OUT THE INVENTION

I. Preferred Embodiments

Figure 1A:
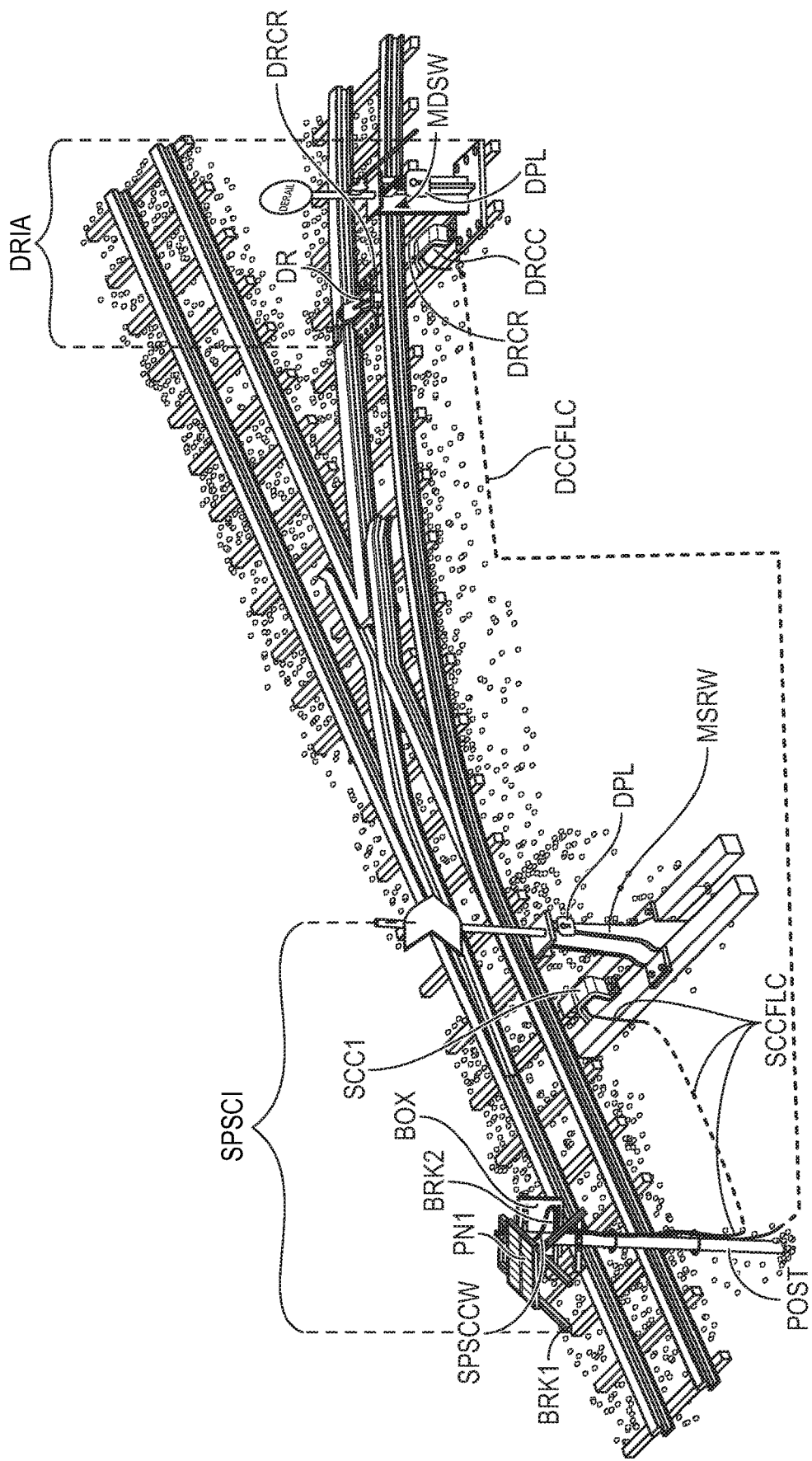
FIG. 1A is a perspective view of the Switch Assembly SPSCI of the Cell Network Switch Point Indicator device together with a perspective view of the Derail Assembly DRIA comprising part of the Solar Powered Cell Network Switch Point Indicator System device which together are depicted as installed on a railroad line at a switch point to be monitored by the device.

With reference now to the drawings, and in particular to FIGS. 1-21 thereof, are depicted the most preferred embodiment of a new and novel Solar Powered Cell Network Switch Point Indicator System device.

GENERAL DESCRIPTION OF REFERENCE NOMENCLATURE IN THE DESCRIPTION AND DRAWINGS

Any actual dimensions listed are those of the preferred embodiment. Actual dimensions or exact hardware details and means may vary in a final product or most preferred embodiment and should be considered means for so as not to narrow the claims of the patent.

LIST AND DESCRIPTION OF COMPONENT PARTS OF THE INVENTION

Part# Description
SPSCI Switch Assembly
PN1 50 W 17V Solar Panel
PN2 100 W 17V Solar Panel
COMPUTER Computer
CLOUD COMPUTING SERVICE Cloud Computing Service
SC1 Switch Assembly Solar Controller
WSC1 Wayside Assembly Solar Controller
WC Wire Connector
SCBPFL Solar Controller Positive Feed Line
SCBNFL Solar Controller Negative Feed Line
SCWPFL Solar Controller Positive Wayside Assembly Feed Line
SCWNFL Solar Controller Negative Wayside Assembly Feed Line
SCBPC Solar Controller 5V Power Cable
SCBPCP Solar Controller 5V Power Cable Plug
BA1 12V Lead Acid Battery
BBA 3.7V Lithium Polymer Backup Battery
BBAP 3.7V Lithium Polymer Backup Battery Positive Feed Line
BBAN 3.7V Lithium Polymer Backup Battery Negative Feed Line
BBAIP 3.7V Lithium Polymer Backup Battery Interface Plug
BBAIPI 3.7V Lithium Polymer Backup Battery Interface Plug Insert
BBAVH Backup Battery Velcro Holder
SCC1 Switch Circuit Controller
SIB1 Switch Assembly Circuit Board
WIB1 Wayside Assembly Circuit Board
U1 Switch Assembly Cellular Microcontroller
U2 Wayside Assembly Cellular Microcontroller
SIK1 Switch Assembly Normal 5V Reed Relay
SIK2 Switch Assembly Reverse 5V Reed Relay
DK3 Derail 5V Reed Relay
U3 Temperature Sensor
D6 Switch Circuit Board Green LED
D5 Switch Circuit Board Yellow LED
D4 Switch Circuit Board Red LED
D3 Switch Circuit Board Blue LED
D7 Switch Circuit Board Derail Orange LED
D9 Wayside Interface Board Green LED
D8 Wayside Interface Board Yellow LED
D7 Wayside Interface Board Red LED
D6 Wayside Interface Board Blue LED
USB USB Type A Female Connector
RESET Reset Switch
STATUS Board Status Indicator
MODE Board Monitor Mode Selector
BMA Board Condition Monitoring Assembly
BOX 12×10×6 Polycarbonate Enclosure BABOX Wayside Assembly Weather Resistant Battery Enclosure
BLOCK Box Lock
BRK1 Solar Panel Mounting Bracket
BRK2 Enclosure Mounting Bracket
POST 4" Diameter Post
MRSW Manual Rail Switch
SCCFLC Switch Circuit Controller Three Feed Lines Conduit
SCCFL Switch Circuit Controller Common Feed Line
SCRFL Switch Circuit Controller Reverse Condition Feed Line
SCNJL Switch Circuit Controller Normal Condition Feed Jump Line
SCCJL Switch Circuit Controller Common Feed Jump Line
SCRJL Switch Circuit Controller Reverse Condition Feed Jump Line
SCNBFL Switch Circuit Controller Normal Condition Circuit Board Feed Line
SCCBFL Switch Circuit Controller Common Circuit Board Feed Line
SCRBFL Switch Circuit Controller Reverse Condition Circuit Board Feed Line Switch Circuit Controller Normal Condition Circuit Board Feed Line
NOR Circuit Board Connection Point Switch Circuit Controller Common Circuit Board Feed Line Circuit
COM Board Connection Point Switch Circuit Controller Reverse Circuit Board Condition Feed Line
REV Circuit Board Connection Point
CA Cellular Antennae
CAB Cellular Antennae Bracket
CACW Cellular Antennae Connecting Wire
USBC USB Cable Male A to Male A Connecting the 5V power supply to SIB1
CLA Conduit Locknut Assembly
BASPF Connecting Wire Conduit to Battery
PBFL Positive Battery Feed Line
NBFL Negative Battery Feed Line
PBJL Positive Battery Jump Line
NBJL Negative Battery Jump Line
MPBFL Main Positive Battery Monitor Feed Line
MNBFL Main Negative Battery Monitor Feed Line
CHARGE SENSOR Charge Sensor
GND Power Monitor Negative Connection Point
+12V Power Monitor Positive Connection Point
SPSCCW Solar Panel Connecting Two Wire Conduit to Solar Controller
PNPFL Solar Panel Connecting Positive Feed Line to Solar Controller
PNNFL Solar Panel Connecting Negative Feed Line to Solar Controller
PNPFLJ Solar Panel Connecting Positive Jump Line to Solar Controller
PNNFLJ Solar Panel Connecting Negative Jump Line to Solar Controller
MP Mounting Plate
BAMP Cushioned Battery Mounting Plate
DPL Digital Padlock
WIA Wayside Assembly
WLA Wayside Lamp Assembly
WGLED Wayside Green LED
WYLED Wayside Yellow LED
WRLED Wayside Red LED
WLAFLC Wayside Lamp Assembly Three Feed Lines Conduit
WWB Wayside Assembly Wiring Terminal Block
SIWB Switch Assembly Wiring Terminal Block
WCW Wayside Common Wire
WRW Wayside Red LED Power Wire
WYW Wayside Yellow LED Power Wire
WGW Wayside Green LED Power Wire
WPB Wayside Power Bridge
WRBCW Wayside Red LED Power Board Connecting Wire
WYBCW Wayside Yellow LED Power Board Connecting Wire
WGBCW Wayside Green LED Power Board Connecting Wire
WRRJW Wayside Red Relay Power Jump Wire
WYRJW Wayside Yellow Relay Power Jump Wire
WGRJW Wayside Green Relay Power Jump Wire
K1 Wayside Red Relay
K2 Wayside Yellow Relay
K3 Wayside Green Relay
DRIA Derail Assembly
DRCC Derail Circuit Controller
MDSW Manual Derail Switch
DR Derail
DRCR Derail Connecting Rod
DCCFLC Derail Circuit Controller Two Feed Lines Conduit
DRFL Derail Condition Feed Line
DRCL Derail Common Feed Line
DRFJL Derail Condition Feed Jump Line
DRCJL Derail Common Feed Jump Line
DRFBFL Derail Condition Circuit Board Feed Line
DRCBFL Derail Common Circuit Board Feed Line
DCOM Derail Common Circuit Board Feed Line Connection Point
Derail Condition Circuit Board Feed Line Circuit Board Connection
DRL Point

DETAILED DESCRIPTION OF THE PREFERRED EMBODIMENT DRAWINGS

The Solar Powered Cell Network Switch Point Indicator System comprised of its component parts as depicted in FIGS. 1-21 is used, manufactured and comprised of the following components in their respective functional relationships:
Hardware Description and Function
The Switch Assembly
The Switch Assembly SPSCI is generally depicted in FIGS. 1A, 1B, 1C, 3, 8, 9A, 9B, 10, 11A & 11B and is generally comprised of: a switch assembly solar panel designated as the 50 W 17V Solar Panel PN1; a switch assembly weather resistant enclosure designated as the 12×10×6 Polycarbonate Enclosure BOX; a Switch Assembly Solar Controller SC1; a switch assembly battery designated as the 12V Lead Acid Battery BA1; a Switch Circuit Controller SCC1; a Derail Circuit Controller DRCC; a switch assembly temperature sensor designated as the Temperature Sensor U3; a Switch Assembly Circuit Board SIB1; a Switch Assembly Cellular Microcontroller U1; a 3.7V Lithium Polymer Backup Battery BBA; and a switch assembly cellular antennae designated as the Cellular Antennae CA.

Figure 8:
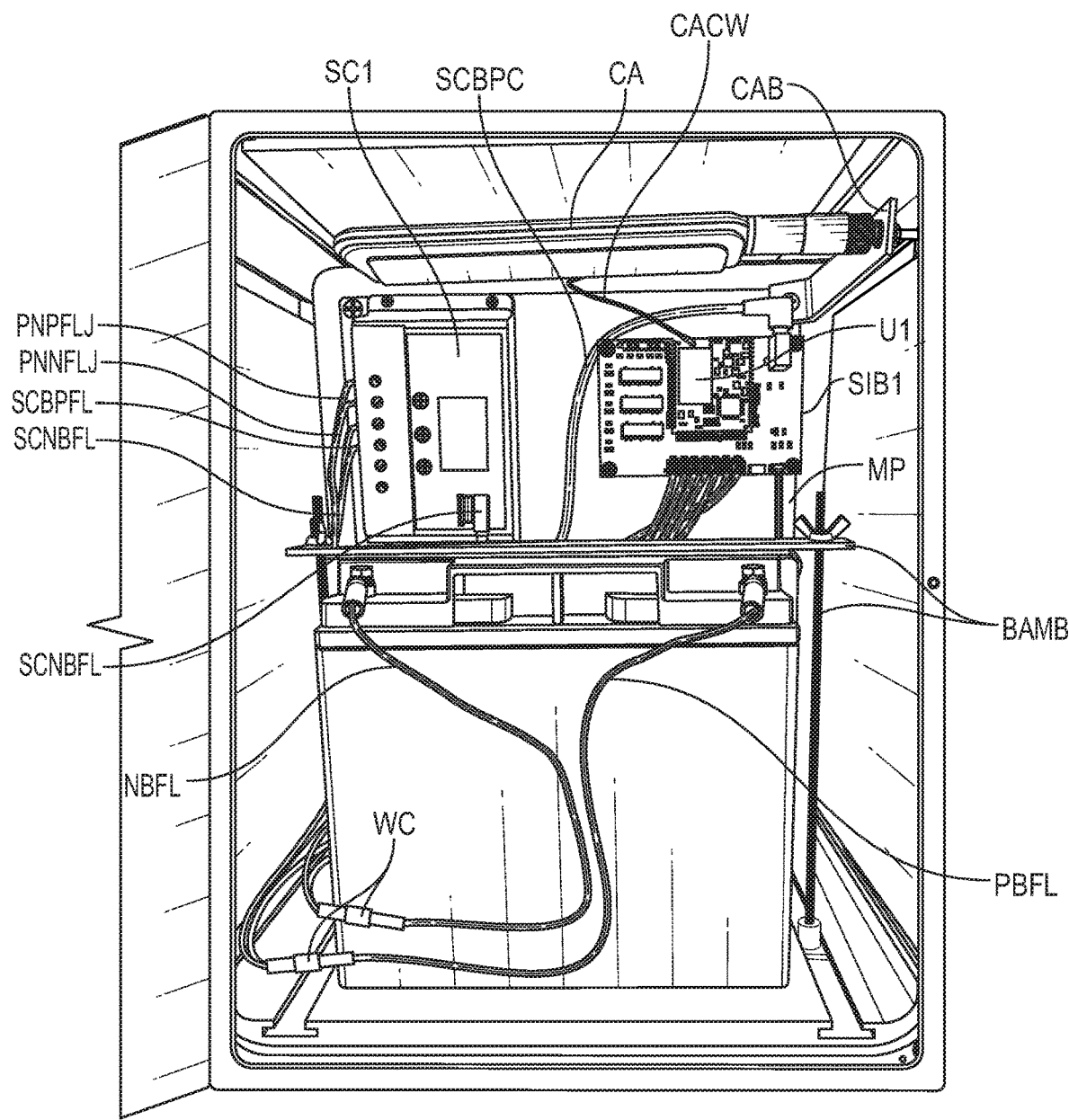
FIG. 8 is a front view of the switch assembly weather resistant enclosure designated as the 12×10×6 Polycarbonate Enclosure BOX depicted in FIGS. 1A & 1B with the switch assembly battery designated as the 12V Lead Acid Battery BA1, the Switch Assembly Circuit Board SIB1, the Switch Assembly Solar Controller SC1 and the switch assembly cellular antennae designated as the Cellular Antennae CA functionally connected together and depicted in said 12×10×6 Polycarbonate Enclosure BOX.
Figure 9A:
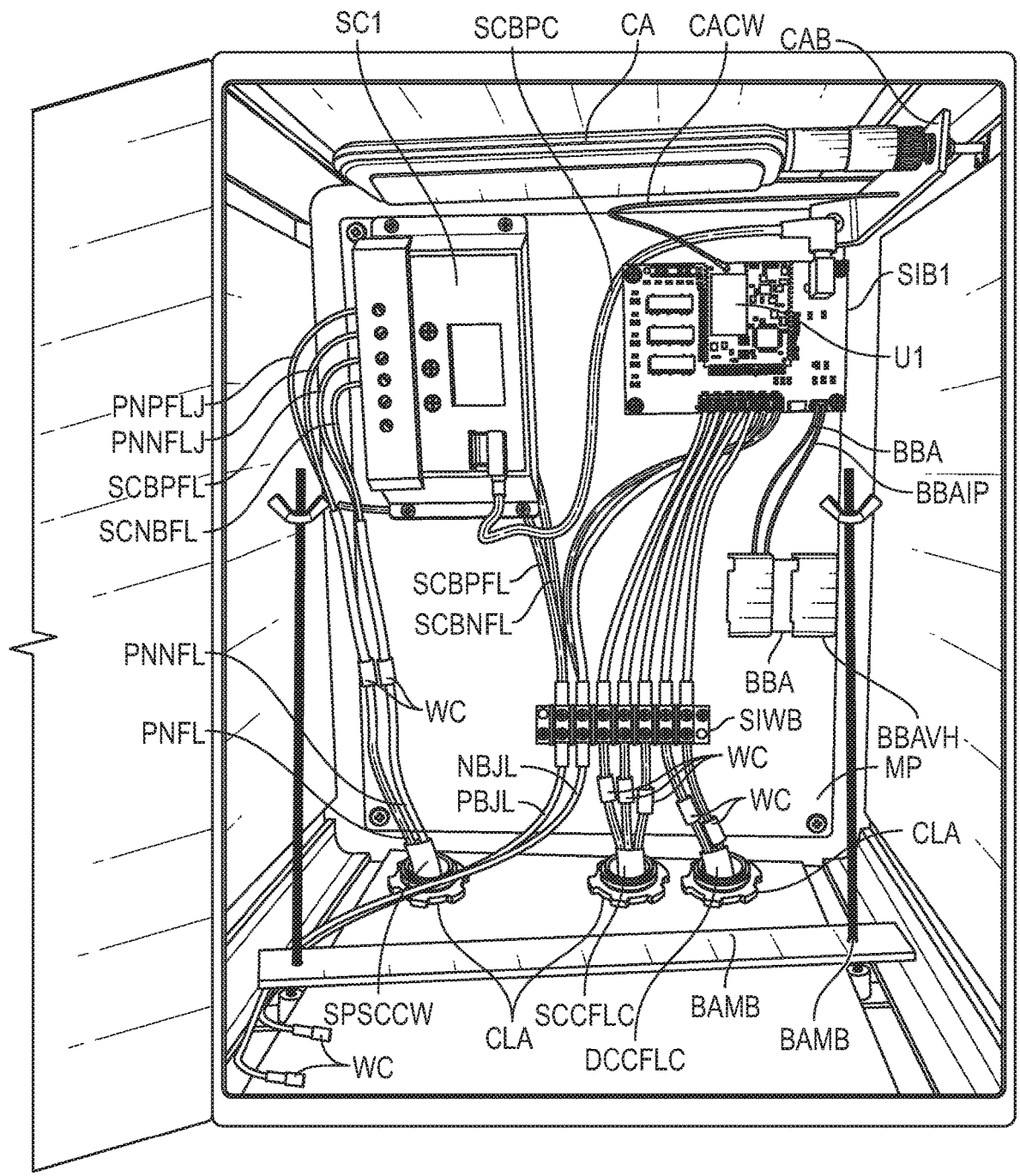
FIG. 9A is a front view of the switch assembly weather resistant enclosure designated as the 12×10×6 Polycarbonate Enclosure BOX depicted in FIG. 8 with the switch assembly battery designated as the 12V Lead Acid Battery BA1 removed and not depicted and further depicting the wiring connected thereto and exiting therefrom for connections to the switch assembly solar panel designated as the 50 W 17V Solar Panel PN1 and the Switch Circuit Controller SCC1 depicted in FIGS. 1A & 1B.

As depicted in FIGS. 8 & 9A the switch assembly weather resistant enclosure designated as the 12×10×6 Polycarbonate Enclosure BOX is fabricated from polycarbonate, fiberglass or other suitable material to permit the cell signal from the Switch Assembly Cellular Microcontroller U1 as transmitted through the Cellular Antennae CA to propagate through the 12×10×6 Polycarbonate Enclosure BOX. The 12×10×6 Polycarbonate Enclosure BOX is capable of being opened and closed by means of a lid or door which may be locked to prevent unauthorized access similar the Box Lock BLOCK of the Wayside Assembly Weather Resistant Battery Enclosure BABOX depicted in FIG. 5.

Figure 1B:
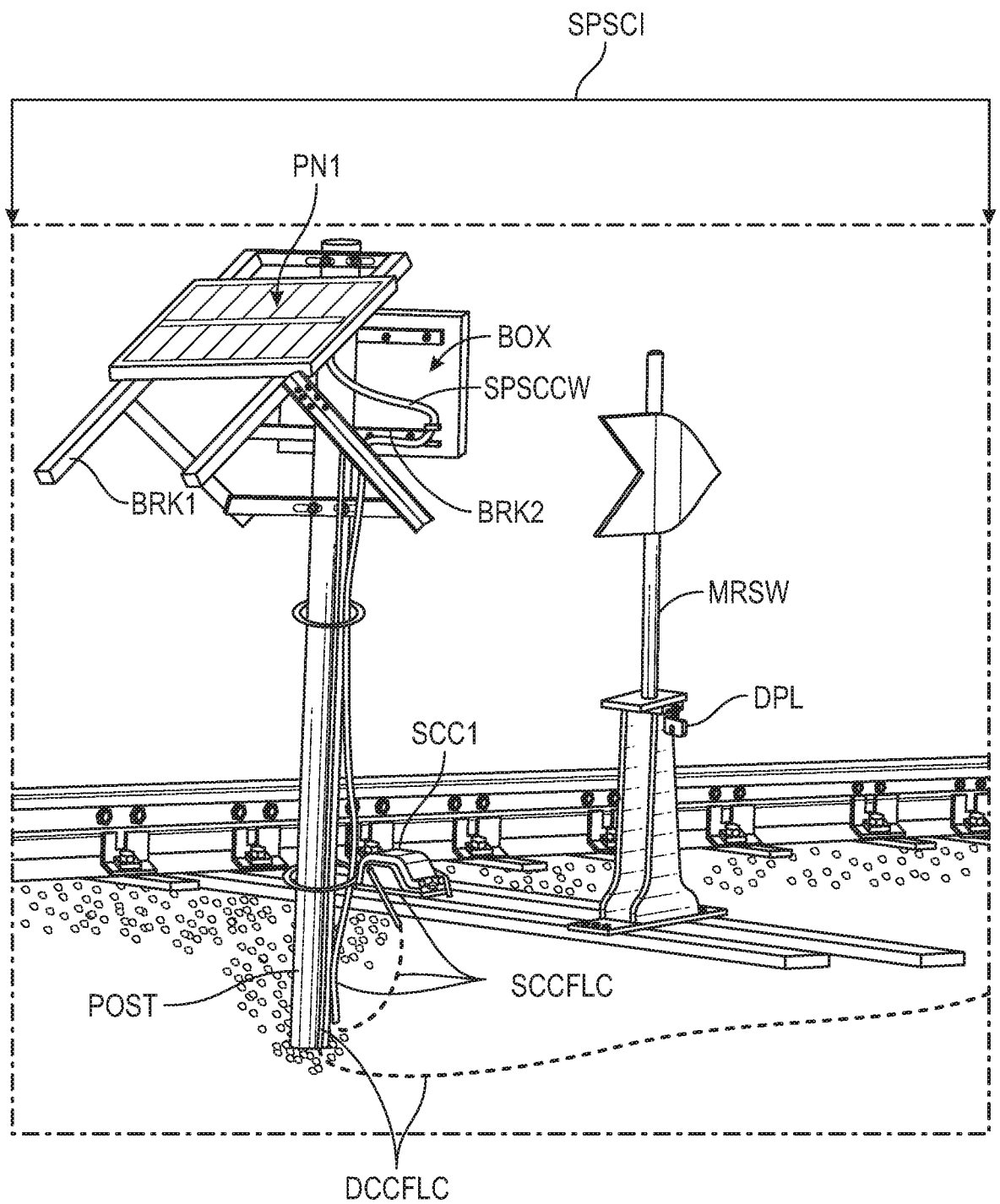
FIG. 1B is a larger perspective view of the Switch Assembly SPSCI of the Solar Powered Cell Network Switch Point Indicator System device as shown in FIG. 1A.
Figure 1C:
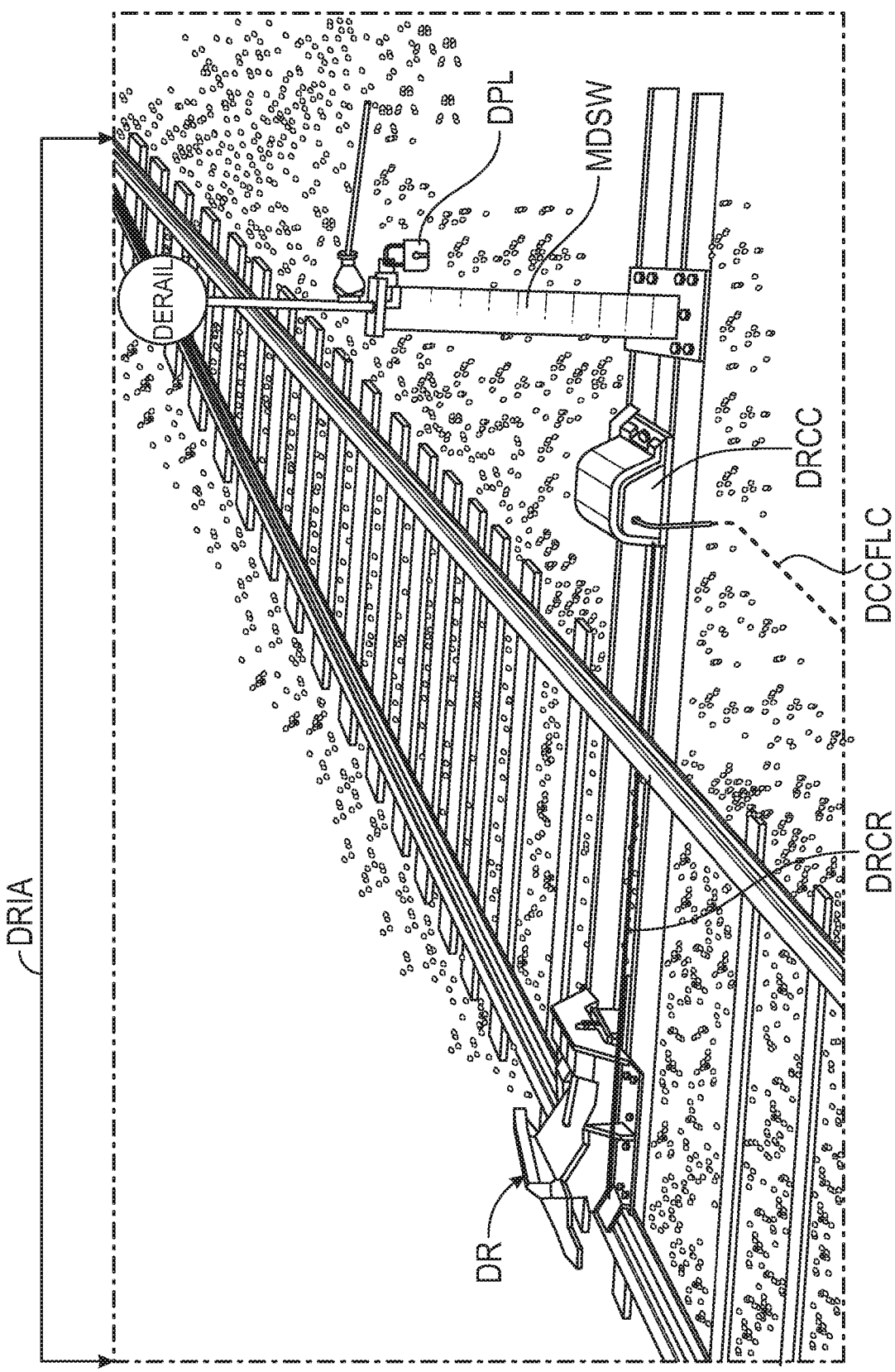
FIG. 1C is a larger perspective view of the Derail Assembly DRIA of the Solar Powered Cell Network Switch Point Indicator System device as shown in FIG. 1A.

As depicted in FIGS. 1A & 1B the switch assembly solar panel designated as the 50 W 17V Solar Panel PN1 being used in this invention to convert sunlight into electrical energy is securely mounted to a 4" Diameter Post POST by means of a Solar Panel Mounting Bracket BRK1 in a position that maximizes the amount of sunlight coming in contact with the 50 W 17V Solar Panel PN1. As depicted in FIGS. 1A, 1B, 8, 9A & 9B the electrical energy being generated by the 50 W 17V Solar Panel PN1 is transmitted to the Switch Assembly Solar Controller SC1 by means of a Solar Panel Connecting Positive Feed Line to Solar Controller PNPFL and a Solar Panel Connecting Negative Feed Line to Solar Controller PNNFL that both exit the 50 W 17V Solar Panel PN1 inside a Solar Panel Connecting Two Wire Conduit to Solar Controller SPSCCW which carries the two wires through a Conduit Locknut Assembly CLA that permits the conduit to enter into the switch assembly weather resistant enclosure designated as the 12×10×6 Polycarbonate Enclosure BOX and be secured in that position by the Conduit Locknut Assembly CLA. The switch assembly weather resistant enclosure designated as the 12×10×6 Polycarbonate Enclosure BOX is secured to 4" Diameter Post POST with an Enclosure Mounting Bracket BRK2 in a position that is at once accessible to user authorized personnel and will not block sunlight to the 50 W 17V Solar Panel PN1. The Solar Panel Connecting Positive Feed Line to Solar Controller PNPFL and the Solar Panel Connecting Negative Feed Line to Solar Controller PNNFL then extend outside the Solar Panel Connecting Two Wire Conduit to Solar Controller SPSCCW inside the switch assembly weather resistant enclosure designated as the 12×10×6 Polycarbonate Enclosure BOX where by means of two Wire Connectors WC the Solar Panel Connecting Positive Feed Line to Solar Controller PNPFL is connected to a Solar Panel Connecting Positive Jump Line to Solar Controller PNPFLJ and the Solar Panel Connecting Negative Feed Line to Solar Controller PNNFL is connected to a Solar Panel Connecting Negative Jump Line to Solar Controller PNNFLJ. The Solar Panel Connecting Positive Jump Line to Solar Controller PNPFLJ and the Solar Panel Connecting Negative Jump Line to Solar Controller PNNFLJ then connect to the Switch Assembly Solar Controller SC1 thereby facilitating the electricity generated by the 50 W 17V Solar Panel PN1 to be transmitted to the Switch Assembly Solar Controller SC1.

The Switch Assembly Solar Controller SC1 as depicted in FIGS. 8 & 9A is protected from the weather and is securely attached inside of the switch assembly weather resistant enclosure designated as the 12×10×6 Polycarbonate Enclosure BOX to a Mounting Plate MP. The Mounting Plate MP is securely attached to the switch assembly weather resistant enclosure designated as the 12×10×6 Polycarbonate Enclosure BOX.

The Switch Assembly Solar Controller SC1 as depicted in FIGS. 8, 9A, 9B & 15A is conductively connected and provides 5V electrical power to the Switch Assembly Circuit Board SIB1 and the Switch Assembly Cellular Microcontroller U1 by means of a Solar Controller 5V Power Cable SCBPC one end of which plugs into the Switch Assembly Solar Controller SC1 and the other end of which plugs in to a Solar Controller 5V Power Cable Plug SCBPCP which is conductively connected to the Switch Assembly Circuit Board SIB1 and the Switch Assembly Cellular Microcontroller U1.

Figure 9B:
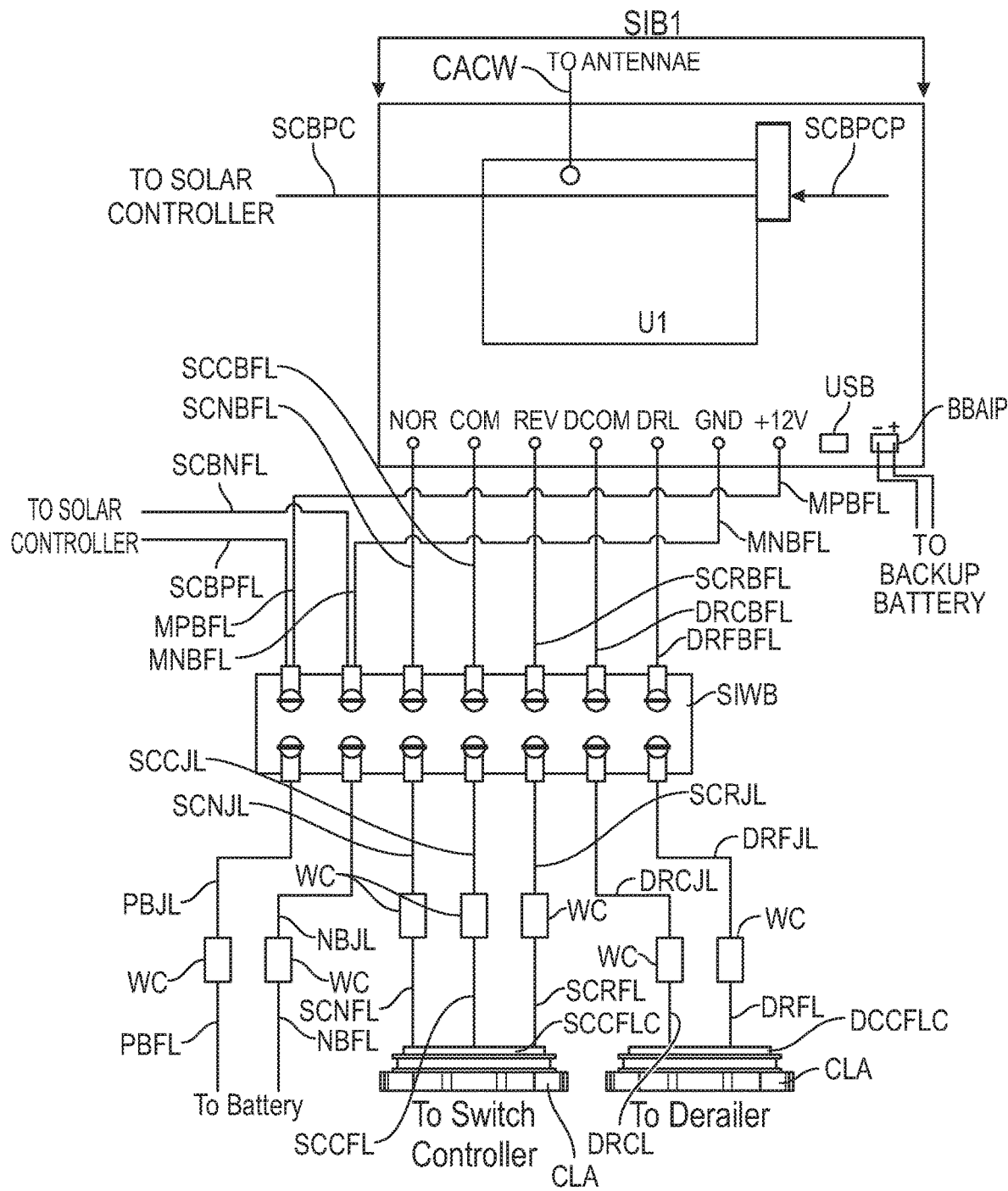
FIG. 9B is a wiring diagram of the Switch Assembly SPSCI depicted in FIGS. 1A, 1B, 8, 9A, 10, 11A & 11B.
Figure 11A:
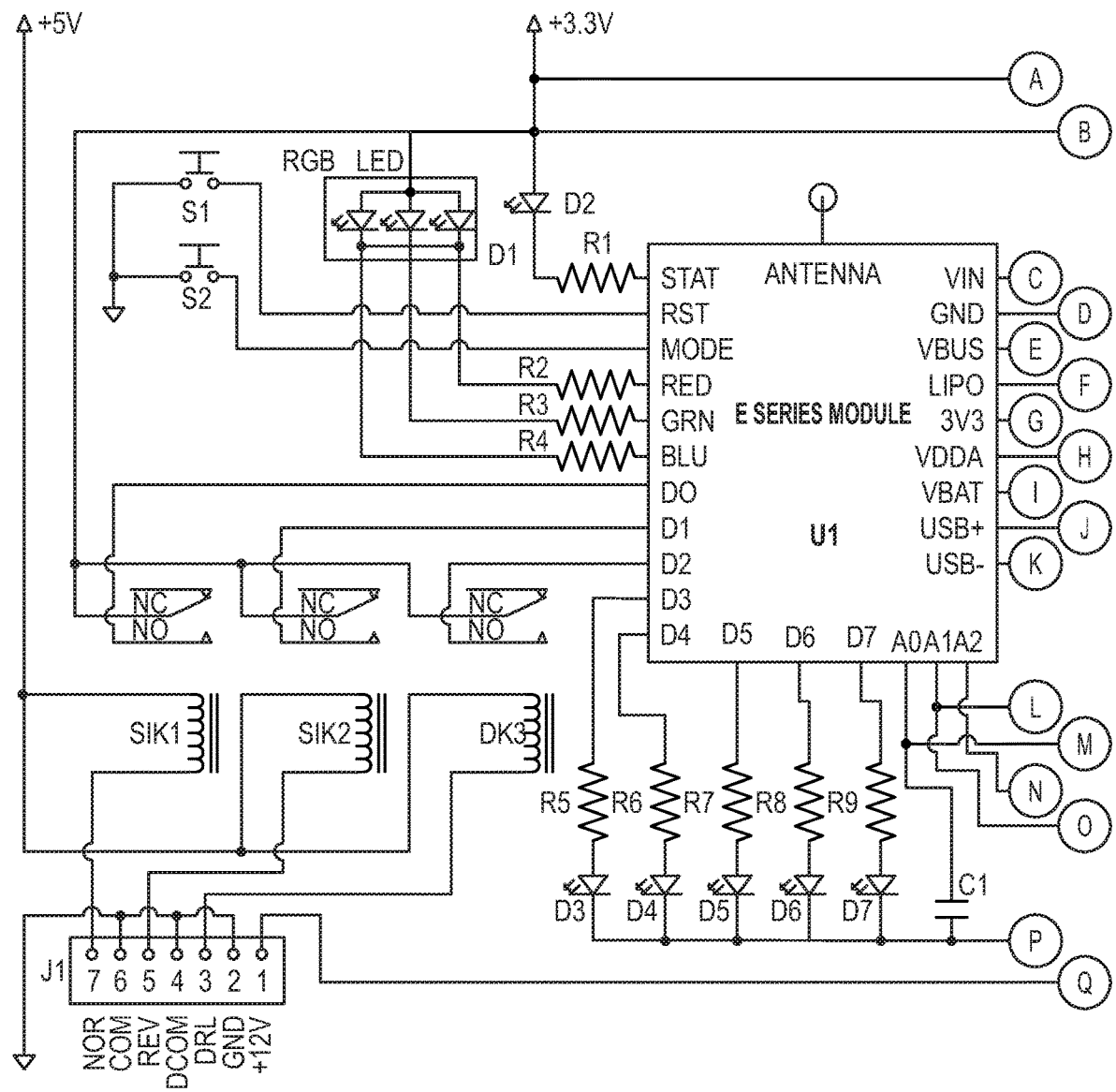
FIG. 11A is a portion of the circuit schematic of the Switch Assembly Circuit Board SIB1 which when viewed together with FIG. 11B depicts the entire schematic of the Switch Assembly Circuit Board SIB1 depicted in FIGS. 8, 9A, 9B & 10.
Figure 11B:
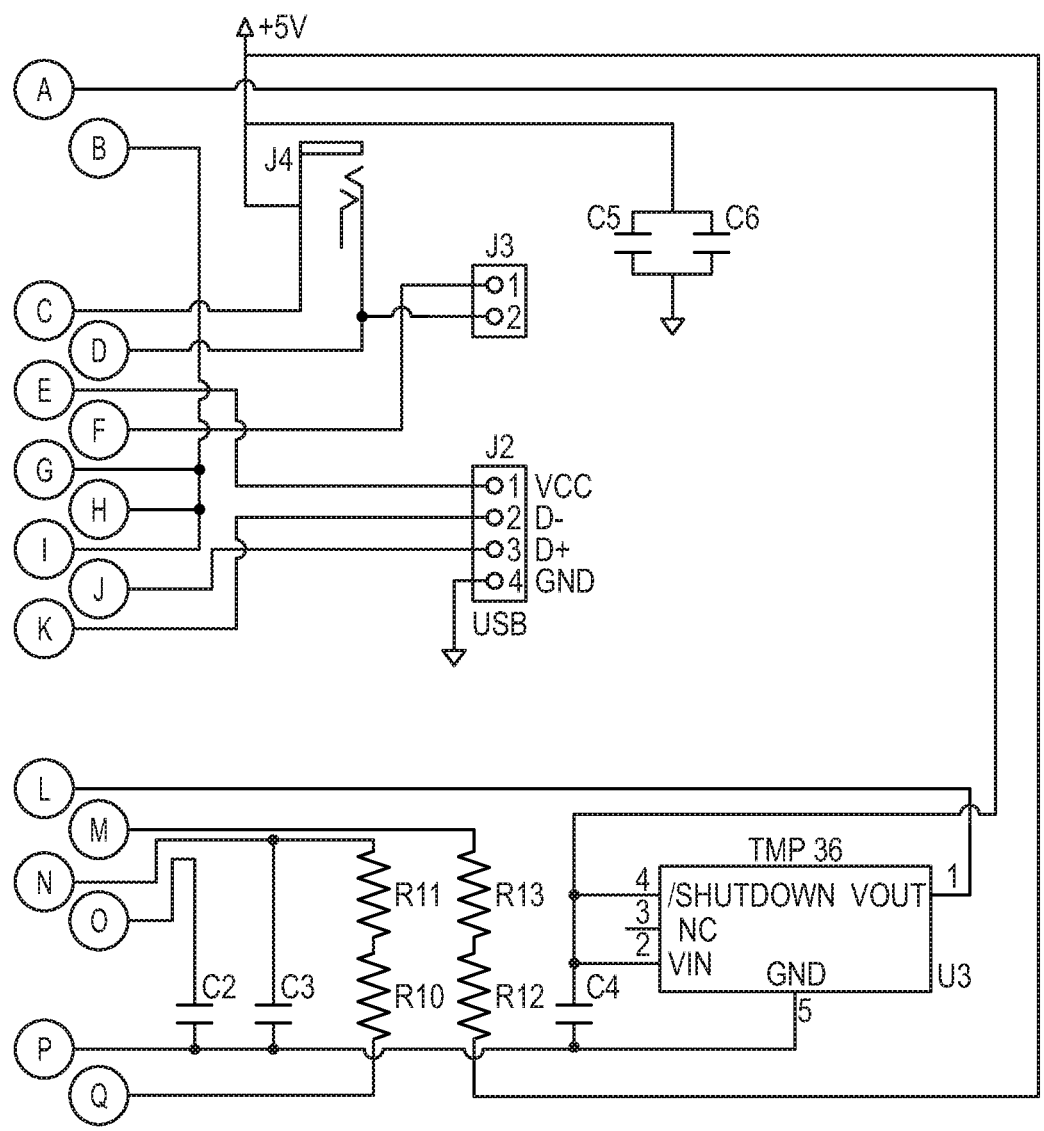
FIG. 11B is a portion of the circuit schematic of the Switch Assembly Circuit Board SIB1 which when viewed together with FIG. 11A depicts the entire schematic of the Switch Assembly Circuit Board SIB1 depicted in FIGS. 8, 9A, 9B & 10.
Figure 15A:
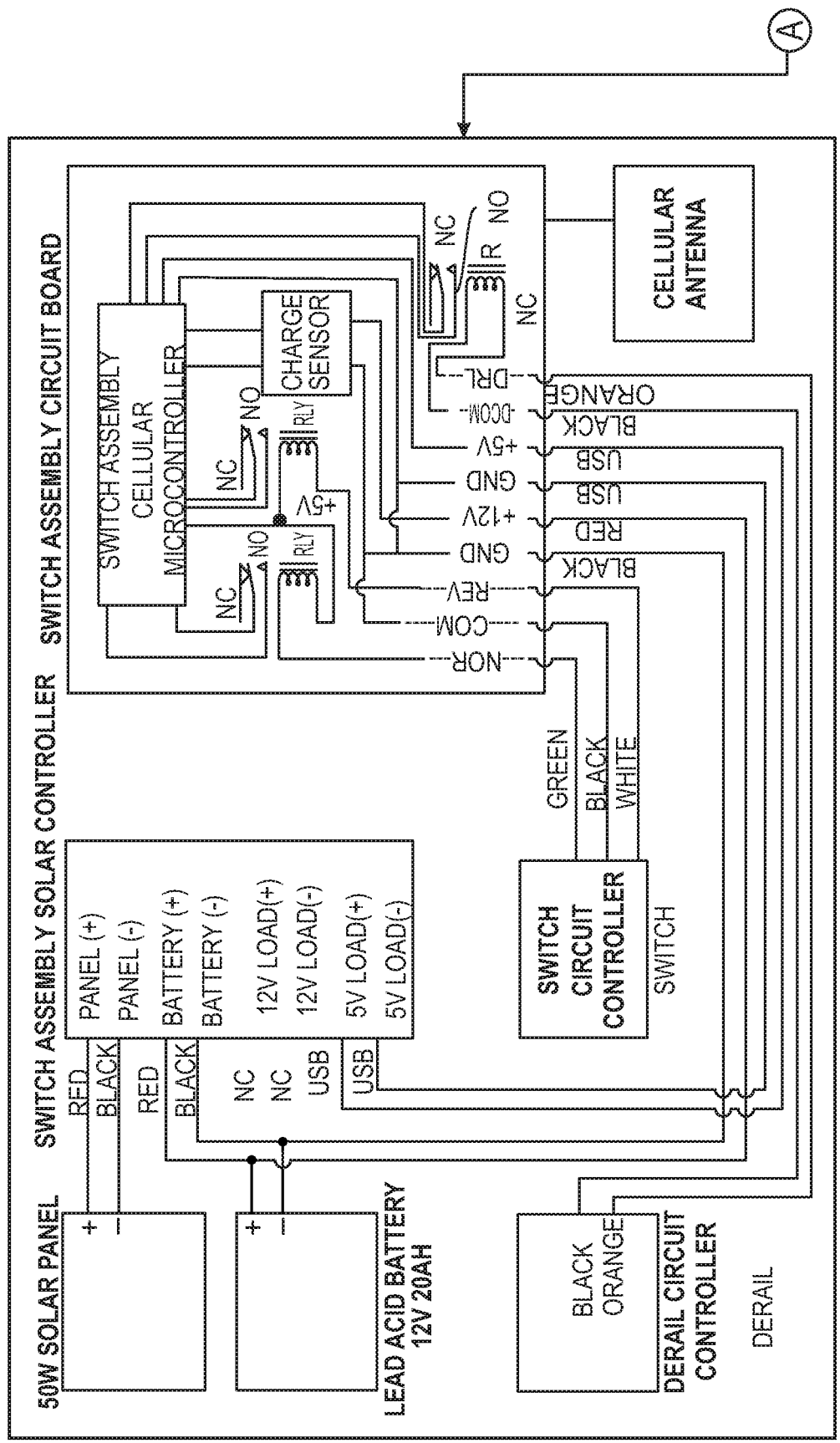
FIGS. 15A, 15B & 15C together comprise a Venn diagram that incorporates the circuit schematic of the Wayside Assembly Circuit Board WIB1 and the Wayside Assembly Cellular Microcontroller U2 together with the circuit schematic of the Switch Assembly Circuit Board SIB1 and the Switch Assembly Cellular Microcontroller U1 depicting how the data from each travels through the CLOUD COM- PUTING SERVICE as between them and to a COMPUTER which in turn processes the data for use by authorized railroad personnel or to automatically control railroad equipment.

The Switch Assembly Solar Controller SC1 as depicted in FIGS. 8, 9A, 9B & 15A provides 12V electrical power to the Switch Assembly Circuit Board SIB1 and the switch assembly battery designated as the 12V Lead Acid Battery BA1 by being conductively connected with 12V electrical power to a Switch Assembly Wiring Terminal Block SIWB by means of a Solar Controller Positive Feed Line SCBPFL and a Solar Controller Negative Feed Line SCBNFL. The Switch Assembly Wiring Terminal Block SIWB is secured inside the weather resistant enclosure designated as the 12×10×6 Polycarbonate Enclosure BOX by means of its attachment to the Mounting Plate MP. The Switch Assembly Circuit Board SIB1 is conductively connected to the Switch Assembly Solar Controller SC1 by: conductively connecting a Main Positive Power Monitor Feed Line MPBFL to the same connection point on the Switch Assembly Wiring Terminal Block SIWB as the Solar Controller Positive Feed Line SCBPFL conductively connecting it thereto as depicted in FIG. 9B with the other end of the Main Positive Power Monitor Feed Line MPBFL being conductively connected to a Power Monitor Positive Connection Point +12V which is conductively connected to the circuitry of the Switch Assembly Circuit Board SIB1 as depicted in FIGS. 11A, 11B & 15A; and conductively connecting a Main Negative Power Monitor Feed Line MNBFL to the same connection point on the Switch Assembly Wiring Terminal Block SIWB as the Solar Controller Negative Feed Line SCBNFL conductively connecting it thereto as depicted in FIG. 9B with the other end of the Main Negative Power Monitor Feed Line MNBFL being conductively connected to a Power Monitor Negative Connection Point GND which is conductively connected to the circuitry of the Switch Assembly Circuit Board SIB1 as depicted in FIGS. 11A, 11B & 15A.

As depicted in FIG. 8 the 12V Lead Acid Battery BA1 is secured in the switch assembly weather resistant enclosure designated as the 12×10×6 Polycarbonate Enclosure BOX by means of a Cushioned Battery Mounting Plate BAMP.

As depicted in FIGS. 8, 9A, 9B & 15A the positive terminal of the switch assembly battery designated as the 12V Lead Acid Battery BA1 is conductively connected to a Positive Battery Feed Line PBFL and the negative terminal of the switch assembly battery designated as the 12V Lead Acid Battery BA1 is conductively connected to a Negative Battery Feed Line NBFL. The Positive Battery Feed Line PBFL by means of a Wire Connector WC is conductively connected to a Positive Battery Jump Line PBJL and the Negative Battery Feed Line NBFL by means of a Wire Connector WC is conductively connected to a Negative Battery Jump Line NBJL. The Positive Battery Jump Line PBJL is conductively attached to the Switch Assembly Wiring Terminal Block SIWB whereby it is conductively connected to the Switch Assembly Wiring Terminal Block SIWB attached Solar Controller Positive Feed Line SCBPFL thereby conductively connecting the Switch Assembly Solar Controller SC1 to the positive terminal of the switch assembly battery designated as the 12V Lead Acid Battery BA1. The Negative Battery Jump Line NBJL is conductively attached to the Switch Assembly Wiring Terminal Block SIWB whereby it is conductively connected to the Switch Assembly Wiring Terminal Block SIWB attached Solar Controller Negative Feed Line SCBNFL thereby conductively connecting the Switch Assembly Solar Controller SC1 to the negative terminal of the switch assembly battery designated as the 12V Lead Acid Battery BA1.

As depicted in FIGS. 8, 9A, 9B, 11A, 11B & 15A the Switch Assembly Solar Controller SC1 is capable of receiving electrical power from either or both the switch assembly battery designated as the 12V Lead Acid Battery BA1 and/or the 50 W 17V Solar Panel PN1. With the power thus received the Switch Assembly Solar Controller SC1 can then output both 5V and 12V electrical power. The Switch Assembly Solar Controller SC1 being conductively connected to: the switch assembly battery designated as the 12V Lead Acid Battery BA1 facilitating a 12V electrical power connection thereby; the 50 W 17V Solar Panel PN1 receiving solar generated electrical power thereby; the Switch Assembly Circuit Board SIB1 supplying 5V electrical power thereby; and the Switch Assembly Cellular Microcontroller U1 supplying 5V electrical power thereby, performs the following functions: 1) provides the 5V electrical power to the Switch Assembly Circuit Board SIB1 required by the Switch Assembly SPSCI to monitor a railroad switch and a railroad derail; 2) monitors, charges and maintains the 12V charge of the switch assembly battery designated as the 12V Lead Acid Battery BA1; 3) provides the 5V electrical power required by the Switch Assembly Cellular Microcontroller U1; 4) monitors, charges and maintains the 3.7V charge of a 3.7V Lithium Polymer Backup Battery BBA; and 5) provides the 12V electrical power to the Switch Assembly Circuit Board SIB1 whereby the charge and power condition of the power sources to the Switch Assembly SPSCI can be monitored by means of the CHARGE SENSOR.

As depicted in FIGS. 8, 9A, 9B, 11A, 11B & 15A the Switch Assembly Solar Controller SC1 and the switch assembly battery designated as the 12V Lead Acid Battery BA1 are connected in parallel to the Switch Assembly Circuit Board SIB1 by means of the Main Positive Power Monitor Feed Line MPBFL and the Main Negative Power Monitor Feed Line MNBFL as explained above. This 12V current flow to the Switch Assembly Circuit Board SIB1 generates by means of the CHARGE SENSOR of the Switch Assembly Circuit Board SIB1 an analog output that is accessed by the Switch Assembly Cellular Microcontroller U1 by means of input A2 which interprets the input and then generates user desired data regarding the charge condition of the 12V Lead Acid Battery BA1 and condition of the Switch Assembly Solar Controller SC1 as depicted in FIG. 15A.

As depicted in FIGS. 1A, 1B, 3A, 3B, 9A, 9B & 15A the Switch Circuit Controller SCC1 is operatively attached to a Manual Railroad Switch MRSW whereby a user may set the Manual Railroad Switch MRSW in a normal, reverse or open position. Switch Circuit Controller SCC1 is mounted on the head blocks of the Manual Rail Switch MRSW. As depicted in FIG. 1A as part of another embodiment of the device is a Digital Padlock DPL which is programmed to wirelessly interface with a separate cellular microcontroller by means of bluetooth technology incorporated into a separate switch interface board. Unauthorized access to operation of the Manual Rail Switch MRSW is prevented by the Digital Padlock PDL and can be managed by key railroad personnel. The Digital Padlock DPL and separate switch interface board can be programmed to detect and transmit by means of the CLOUD COMPUTING SERVICE data that may indicate tampering or unauthorized attempts to use the Digital Padlock PDL.

Also as depicted in FIGS. 1A, 1B, 9A, 9B & 15A the Switch Circuit Controller SCC1 can only function as intended in the Switch Assembly SPSCI if it is conductively connected to a Switch Circuit Controller Common Circuit Board Feed Line Connection Point COM on the Switch Assembly Circuit Board SIB1 thereby providing a common ground in order that when a normal or reverse position are set with the Manual Railroad Switch MRSW 5V electrical power may flow from the Switch Assembly Circuit Board SIB1 to the Switch Circuit Controller SCC1 and back to the Switch Circuit Controller Common Circuit Board Feed Line Connection Point COM of the Switch Assembly Circuit Board SIB1 when one or the other of the electrical contacts of the Manual Rail Switch MRSW (turnout) are closed in either the normal or reverse positions. The closure of either of these contacts grounds out one of two relays (SIK1, SIK2) on the Switch Assembly Circuit Board SIB1. The circuit is completed by means of a conductively connected Switch Circuit Controller Common Circuit Board Feed Line SCCBFL which is in turn conductively connected by means of the Switch Assembly Wiring Terminal Block SIWB to a Switch Circuit Controller Common Feed Jump Line SCCFL which is in turn conductively connected by means a Wire Connector WC to a Switch Circuit Controller Common Feed Line SCCFL which in turn is conductively connected to the Switch Circuit Controller SCC1 thereby completing its connection to the Switch Assembly Circuit Board SIB1.

Figure 13:
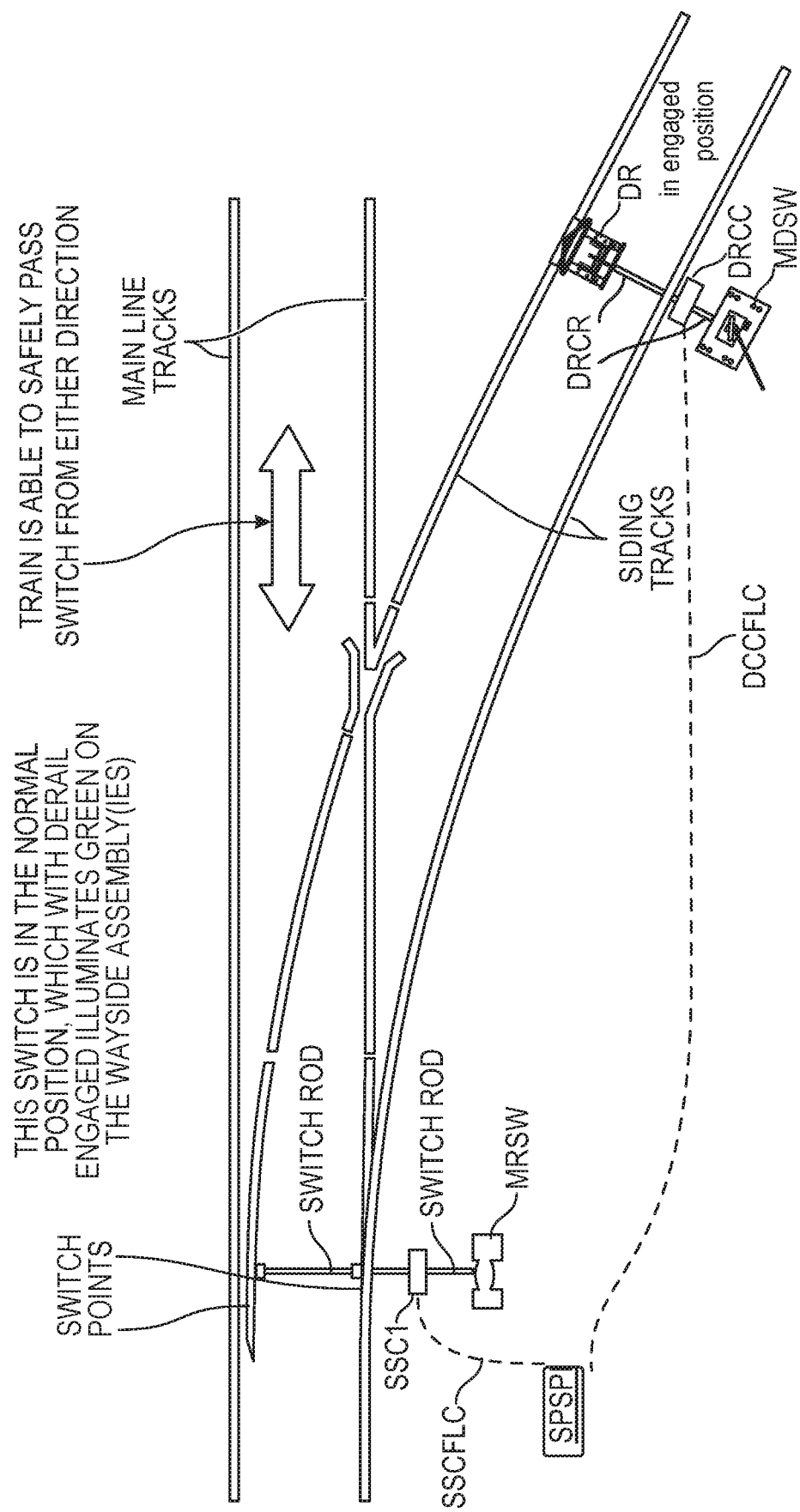
FIG. 13 is a top view of a typical railroad switch point at the location of siding tracks where the Manual Rail Switch MRSW is properly set to the normal position thereby allowing a train to pass the switch point safely on the main line tracks from either direction.

As depicted in FIGS. 1A, 1B, 9A, 9B & 15A the Switch Circuit Controller SCC1 is operatively attached to the Manual Railroad Switch MRSW to close electrical contacts when the Manual Rail Switch MRSW (turnout) is in the normal or reverse position. The closure of either of these contacts grounds out one of two relays (SIK1, SIK2) on the Switch Assembly Circuit Board SIB1 which is electrically connected to the Switch Circuit Controller SCC1. When the Manual Railroad Switch MRSW is placed in a normal position whereby a train traveling on the rail line may pass over the railroad switch from either direction and not enter upon the side tracks served by the railroad switch as depicted in FIG. 13 the normal position electrical contact of the Switch Circuit Controller SCC1 grounds out the Switch Assembly Normal 5V Reed Relay SIK1 thereby causing the Switch Assembly Circuit Board SIB1 to generate a digital output that is then inputted by means of the input pin DO to the Switch Assembly Cellular Microcontroller U1 which processes that input to generate and transmit data respecting the normal position of the railroad switch. The 5V electrical current that flows to ground by means of the Switch Circuit Controller SCC1 when the railroad switch is in the normal position is carried by the Switch Circuit Controller Normal Condition Circuit Board Feed Line Connection Point NOR of the Switch Assembly Circuit Board SIB1 by means of a conductively connected Switch Circuit Controller Normal Condition Circuit Board Feed Line SCNBFL which is in turn conductively connected by means of the Switch Assembly Wiring Terminal Block SIWB to a Switch Circuit Controller Normal Condition Circuit Board Feed Jump Line SCNJL which is in turn conductively connected by means a Wire Connector WC to a Switch Circuit Controller Normal Condition Feed Line SCNFL which in turn is conductively connected to the Switch Circuit Controller SCC1 thereby completing its connection to the Switch Assembly Circuit Board SIB1.

Figure 12:
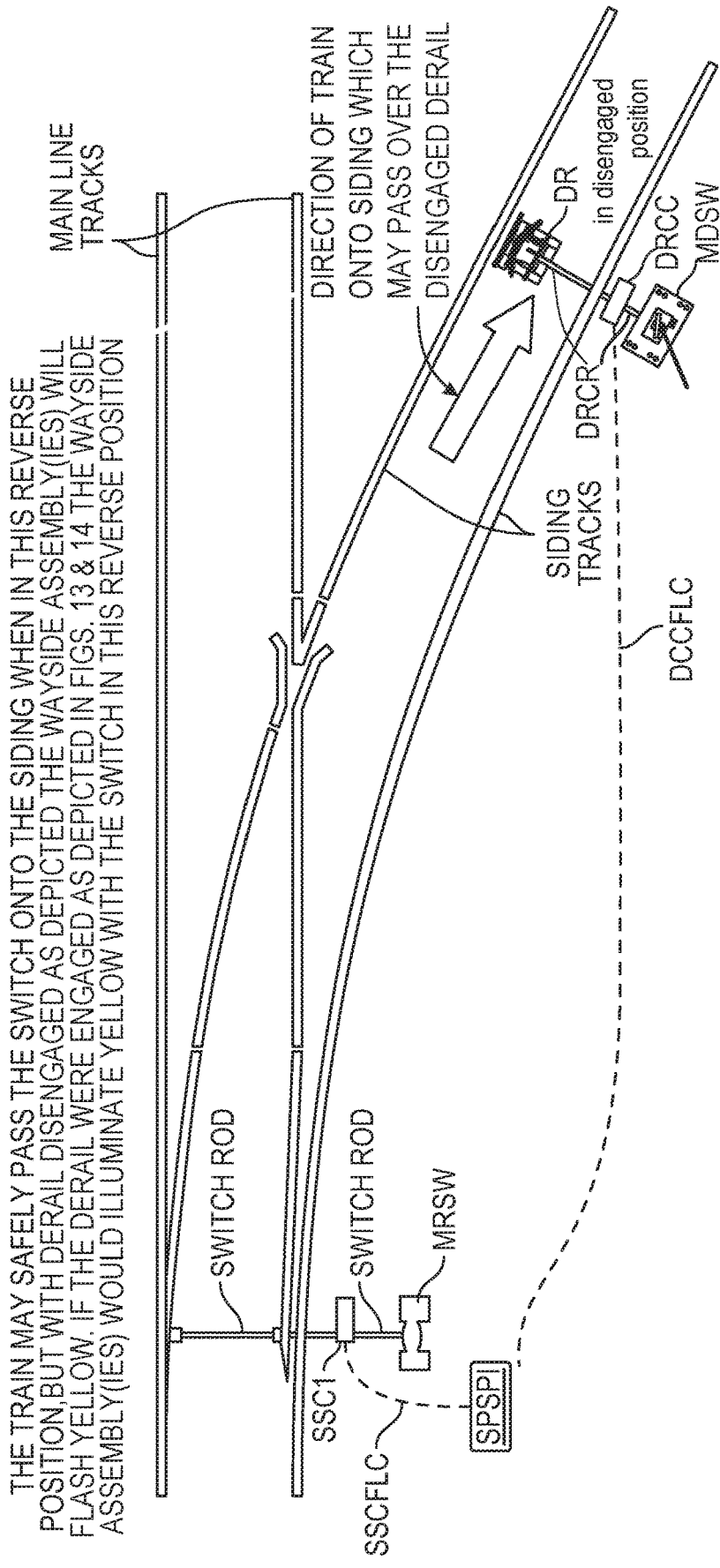
FIG. 12 is a top view of a typical railroad switch point at the location of siding tracks where the Manual Rail Switch MRSW is properly set to the reverse position thereby allowing a train to pass from the main line tracks onto the side tracks.

As depicted in FIGS. 1A, 1B, 9A, 9B & 15A the Switch Circuit Controller SCC1 is operatively attached to the Manual Railroad Switch MRSW such that when the Manual Railroad Switch MRSW is placed in a reverse position whereby a train traveling on the rail line may not pass over the railroad switch on the rail line but may pass over the switch and enter upon the side tracks served by the railroad switch as depicted in FIG. 12 the reverse position electrical contact of the Switch Circuit Controller SCC1 grounds out the Switch Assembly Reverse 5V Reed Relay SIK2 thereby causing the Switch Assembly Circuit Board SIB1 to generate a digital output that is then inputted by means of the input pin D1 to the Switch Assembly Cellular Microcontroller U1 which processes that input to generate and transmit data respecting the reverse position of the railroad switch. The 5V electrical current that flows to ground by means of the Switch Circuit Controller Reverse Condition Circuit Board Feed Line Connection Point REV of the Switch Assembly Circuit Board SIB1 by means of a conductively connected Switch Circuit Controller Reverse Condition Circuit Board Feed Line SCRBFL which is in turn conductively connected by means of the Switch Assembly Wiring Terminal Block SIWB to a Switch Circuit Controller Reverse Condition Circuit Board Feed Jump Line SCRJL which is in turn conductively connected by means a Wire Connector WC to a Switch Circuit Controller Reverse Condition Feed Line SCRFL which in turn is conductively connected to the Switch Circuit Controller SCC1 thereby completing its connection to the Switch Assembly Circuit Board SIB1.

As depicted in FIGS. 1A, 1B, 8, 9A & 9B the Switch Circuit Controller Common Feed Line SCCFL, the Switch Circuit Controller Normal Condition Feed Line SCNFL and the Switch Circuit Controller Reverse Condition Feed Line SCRFL all exit the Switch Circuit Controller SCC1 inside a Switch Circuit Controller Three Feed Lines Conduit SCCFLC which carries the three wires through a Conduit Locknut Assembly CLA that permits the conduit to enter into the switch assembly weather resistant enclosure designated as the 12×10×6 Polycarbonate Enclosure BOX and be secured in that position by the Conduit Locknut Assembly CLA.

Figure 2:
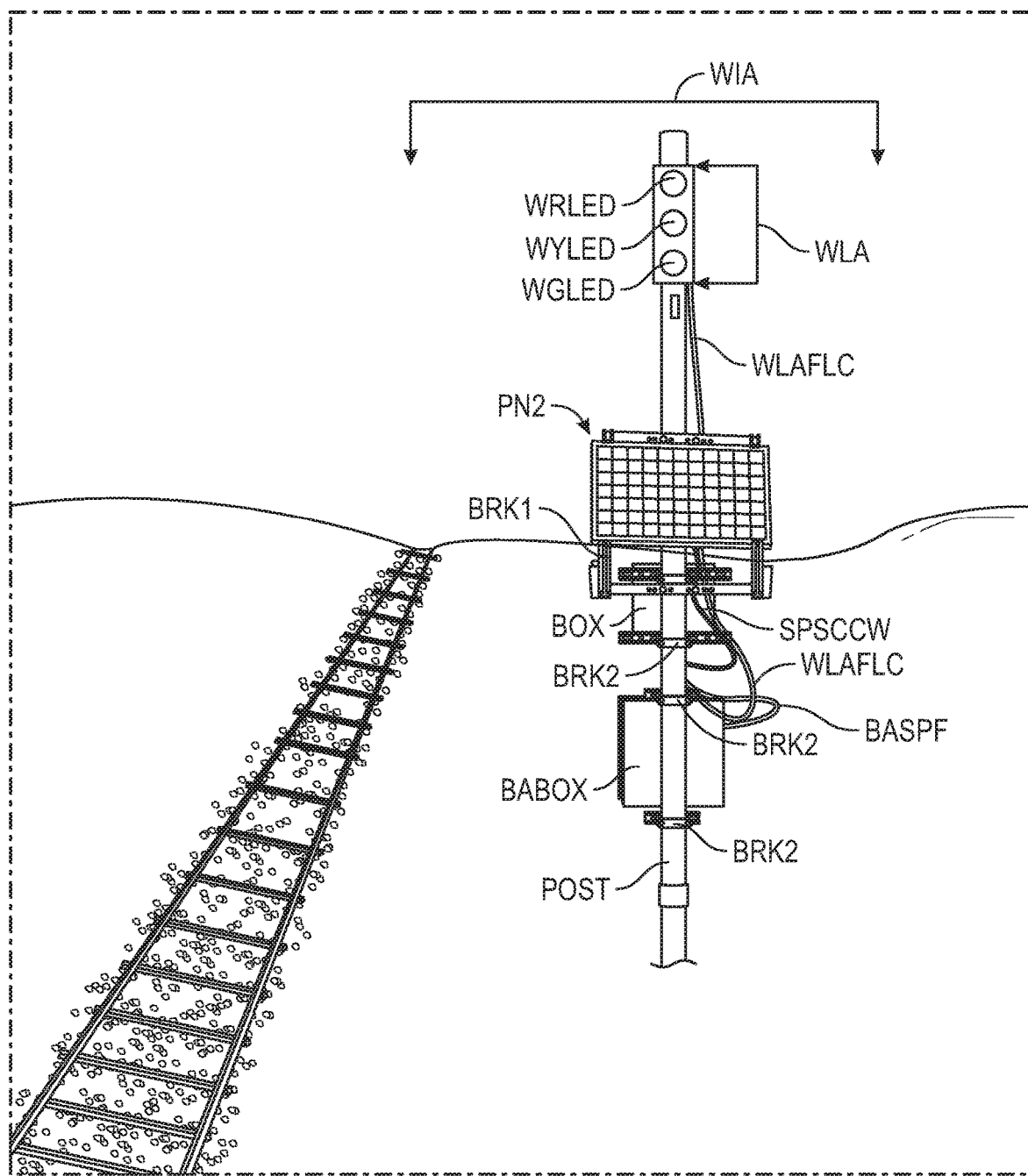
FIG. 2 is a perspective view of the Wayside Assembly WIA of the Cell Network Switch Point Indicator device installed in a functional location along side of a railroad line.
Figure 3A:
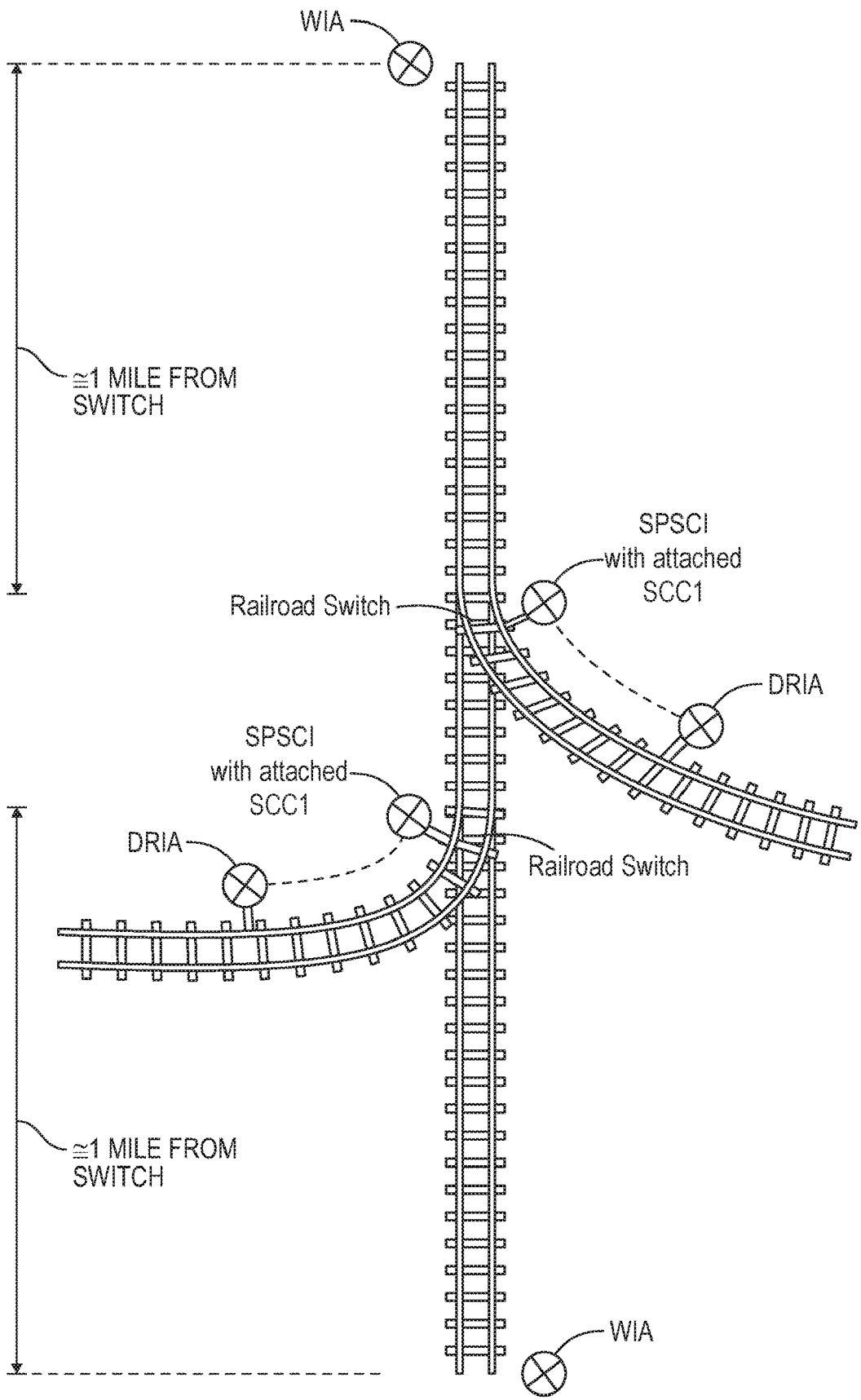
FIG. 3A is a top view of a rail line with two switches for two railroad sidings off the rail line being monitored by the device and depicting the functional installed locations of two Switch Assemblies SPSCI, each with an attached Switch Circuit Controller SCC1, two Derail Assemblies DRIA each electrically connected to a corresponding Switch Assembly SPSCI of the same switch and siding, and two Wayside Assemblies WIA. As depicted the two Wayside Assemblies WIA are each programmed to access the data being generated by both of the Switch Assemblies SPSCI. The Wayside Assemblies WIA will illuminate the most restrictive condition that it accesses from the Switch Assemblies SPSCI.
Figure 3B:
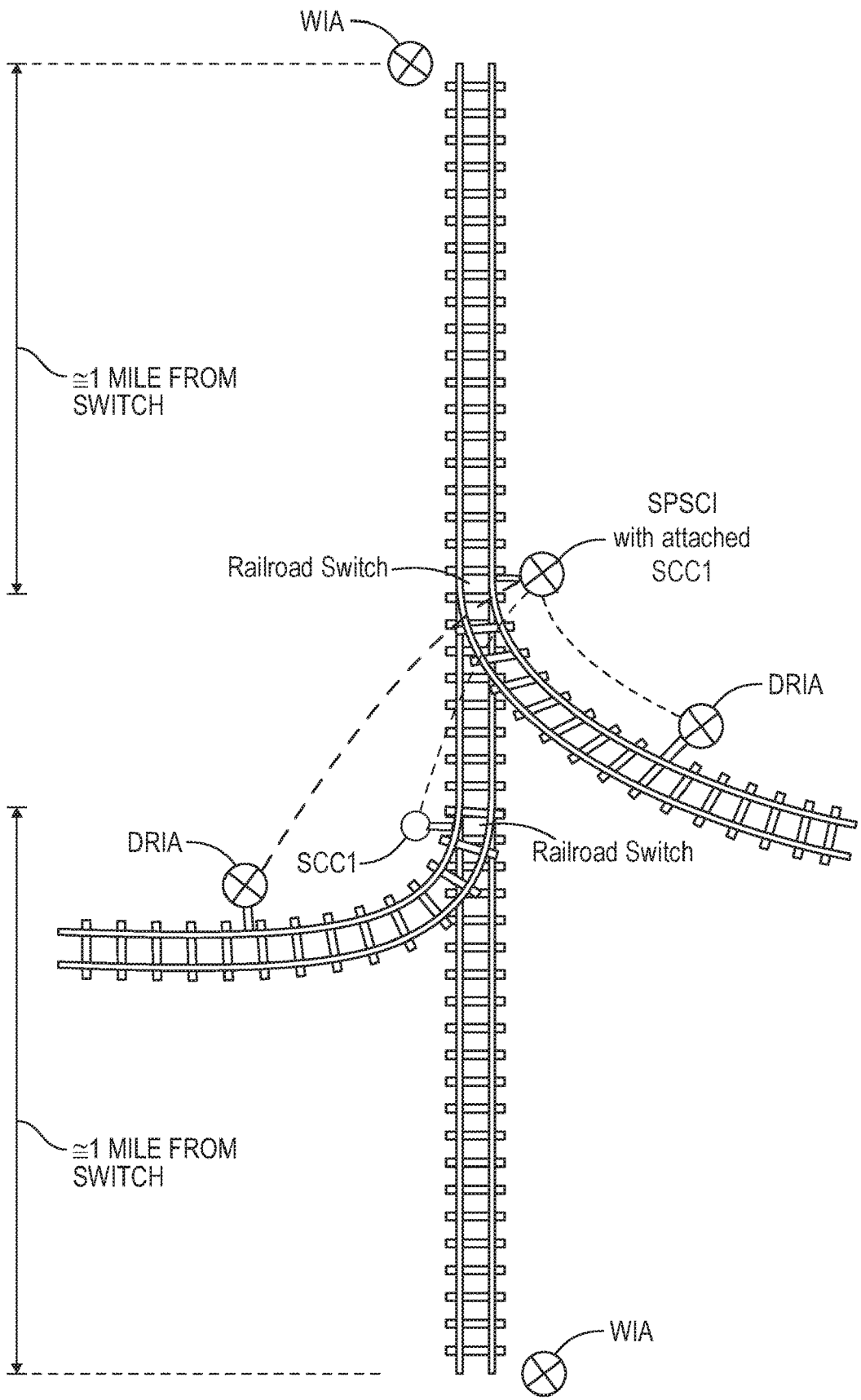
FIG. 3B is a top view of a rail line with two switches for two railroad sidings off the rail line being monitored by the device and depicting the functional installed locations of one Switch Assembly SPSCI with an attached Switch Circuit Controller SCC1 at one railroad switch location which is electrically connected to a second Switch Circuit Controller SCC1, two Derail Assemblies DRIA each electrically connected to the Switch Assembly SPSCI, and two Wayside Assemblies WIA. As depicted the two Wayside Assemblies WIA are each programmed to access the data being generated by the Switch Assembly SPSCI. The Switch Assembly SPSCI transmitting the most restrictive data based upon the switch and derail positions of the switches being monitored. The Wayside Assemblies WIA will illuminate the most restrictive condition that it accesses from the Switch Assembly SPSCI.

As depicted in FIGS. 3A & 3B it is not uncommon for more than one railroad switch and derail to be located in the same block between two wayside signals on the same railroad line. The Wayside Assembly Cellular Microcontrollers U2 of the Wayside Assemblies WIA depicted in FIGS. 3A & 3B are programmed to only display the same most restrictive switch or derail position on The LEDS of the Wayside Lamp Assembly WLA that it accesses from the CLOUD COMPUTING SERVICE. If for example one or more of the switches were set to normal and/or reverse position and one or more switches were set to an open position, then only the Wayside Red LED WRLED of both the Wayside Lamp Assemblies WLA depicted in FIGS. 2, 3A & 3B would illuminate regardless of the derail positions, which is the most restrictive wayside warning of this particular configuration of switch and derail positions. If for example all of the switches were set to normal, but only one derail was disengaged, then only the Wayside Yellow LED WYLED of both of the Wayside Lamp Assemblies WLA depicted in FIGS. 2, 3A & 3B would flash on and off regardless of the derail positions, which is the most restrictive wayside warning of this particular configuration of switch and derail positions. If for example one or more of the switches were set to normal position and one or more switches were set to a reverse position, then only the Wayside Yellow LED WYLED of both the Wayside Lamp Assemblies WLA depicted in FIGS. 2, 3A & 3B would illuminate regardless of the derail positions, which is the most restrictive wayside warning of this particular configuration of switch and derail positions.

Figure 15B:
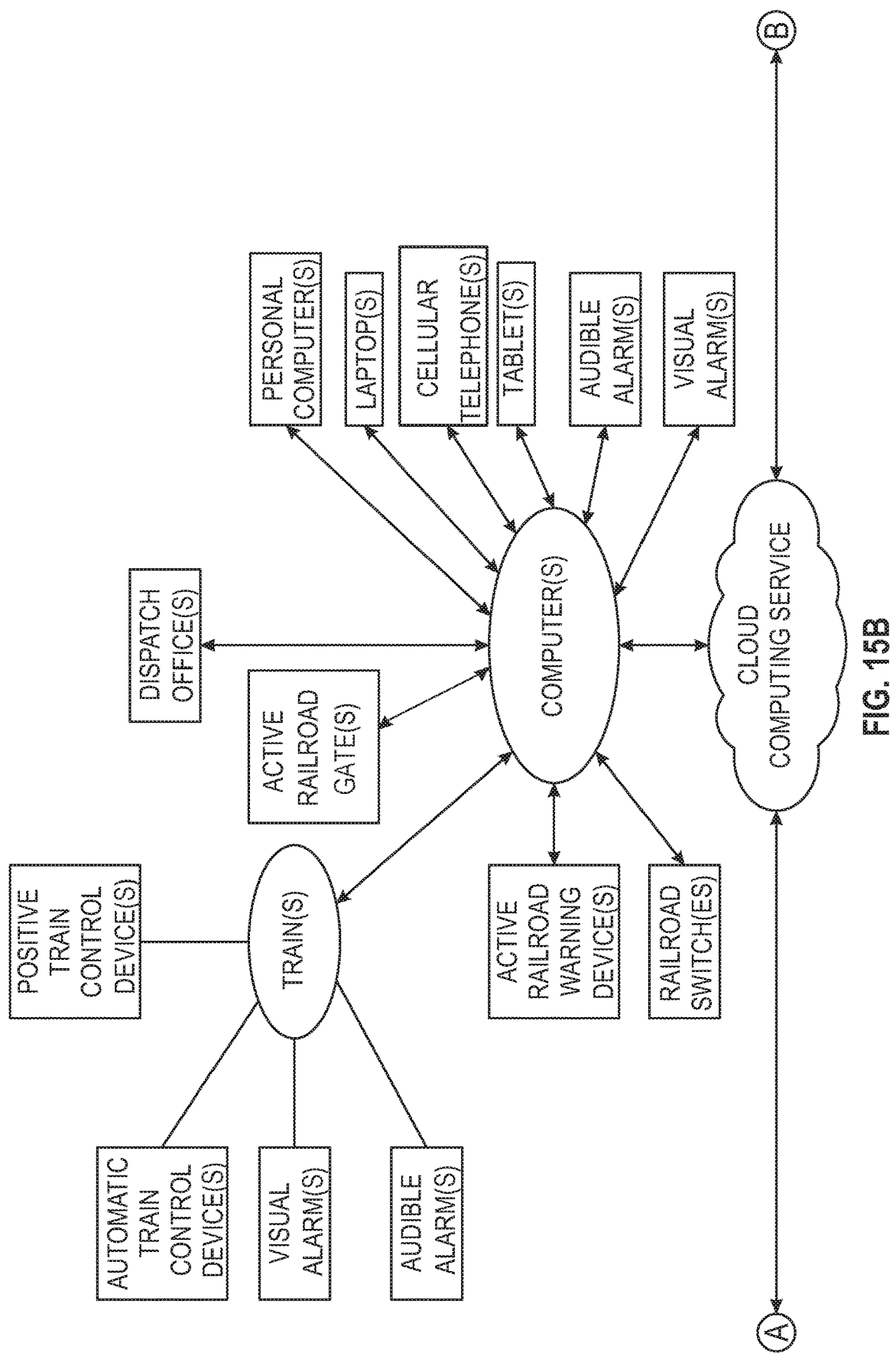
Figure 15C:
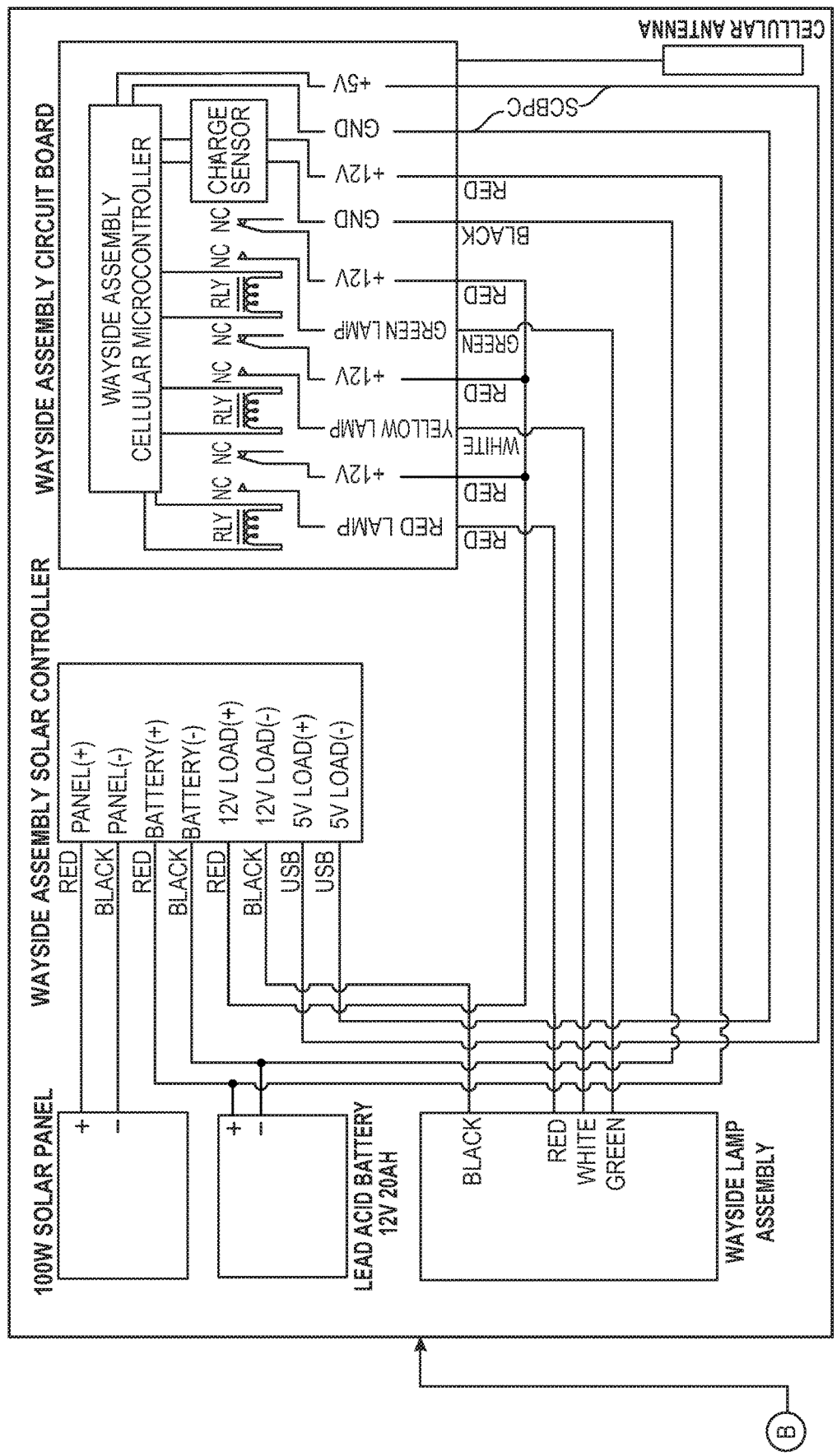
Figure 18:
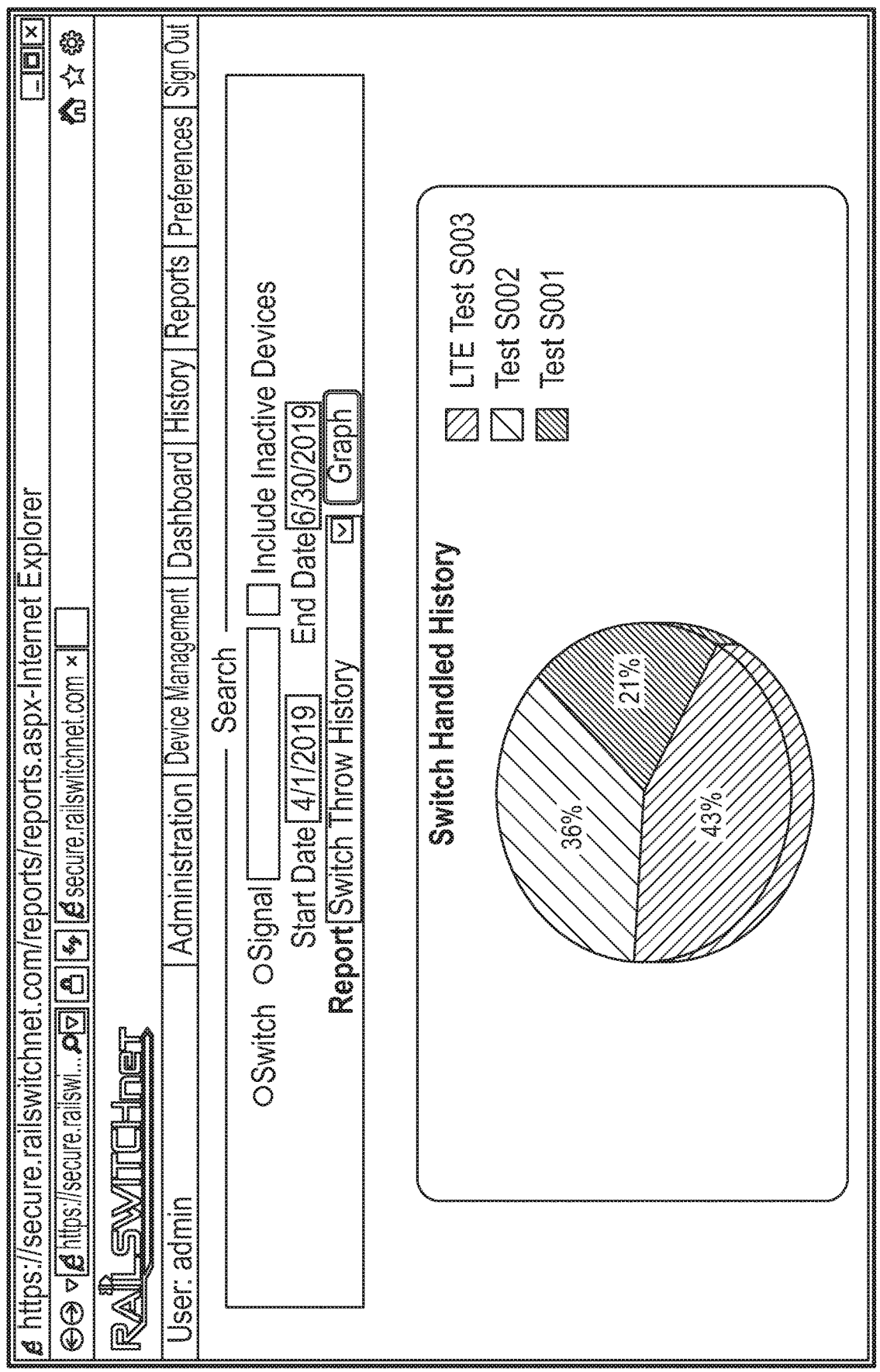
FIG. 18 is a screenshot of yet another one of the available data screen displays generated by the COMPUTER intended to report the switch throw history of the switches being monitored by the Solar Powered Cell Network Switch Point Indicator System device.
Figure 21:
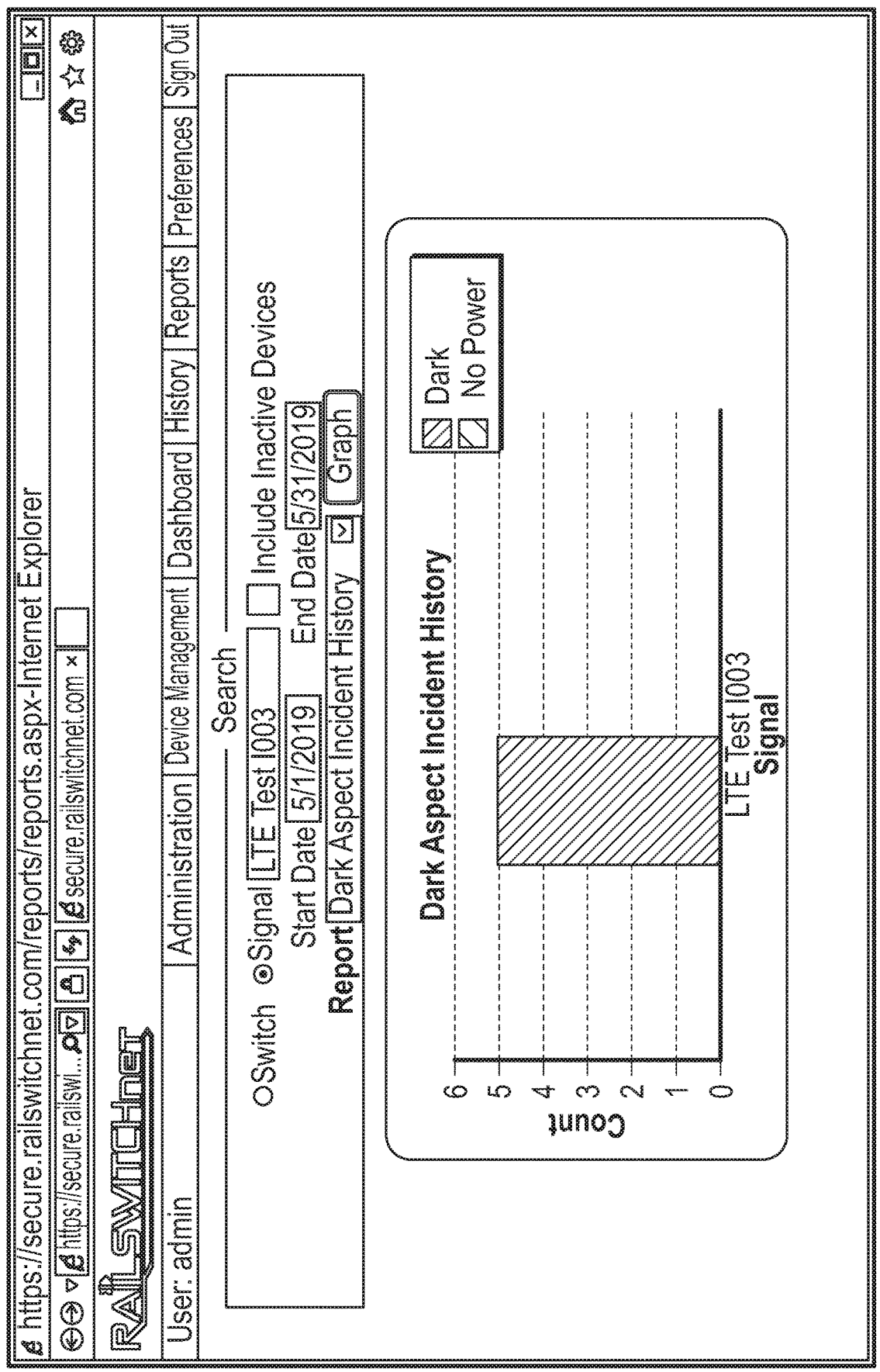
FIG. 21 is a screenshot of yet another one of the available data screen displays generated by the COMPUTER intended to report the dark aspect incident history of the wayside signals being monitored by the Solar Powered Cell Network Switch Point Indicator System device. The screen display depicted in FIG. 21 shows a user selected history report of thirty-one (31) days.

As depicted in FIG. 3B two Switch Circuit Controllers SCC1 and two Derail Switch Controllers DRCC are used to monitor two switches and two derails and are connected in parallel to the same Switch Assembly Circuit Board SIB1 at the same above and below referenced connection points on the Switch Assembly Wiring Block SIWB which locations are the same as if only one Switch Circuit Controller SCC1 and one Derail Switch Controller DRCC were connected as stated above and below. More than two Switch Circuit Controllers SCC1 and Derail Switch Controllers DRCC may be so connected. The Switch Assembly Cellular Microcontroller U1, where there are multiple Switch Circuit Controllers SCC1 and Derail Switch Controllers DRCC connected, is programmed such that only the most restrictive switch and derail position data will be communicated to the Wayside Assembly(ies) WIA by means of the Switch Assembly Cellular Microcontroller U1 transmission to the CLOUD COMPUTING SERVICE which is being accessed by the Wayside Assembly(ies) WIA as depicted in FIGS. 15A, 15B & 15C. In yet another embodiment the Switch Assembly Circuit Board SIB1 may include independent: relays; LED displays; and circuitry, to connect to multiple Switch Circuit Controllers SCC1 and Derail Switch Controllers DRCC, thereby facilitating the transmission of the precise switch and derail positions of the switches being monitored by means of the Switch Assembly Cellular Microcontroller U1 transmission to the CLOUD COMPUTING SERVICE which is being accessed thereby with the COMPUTER as depicted in FIGS. 15A, 15B & 15C.

Figure 14:
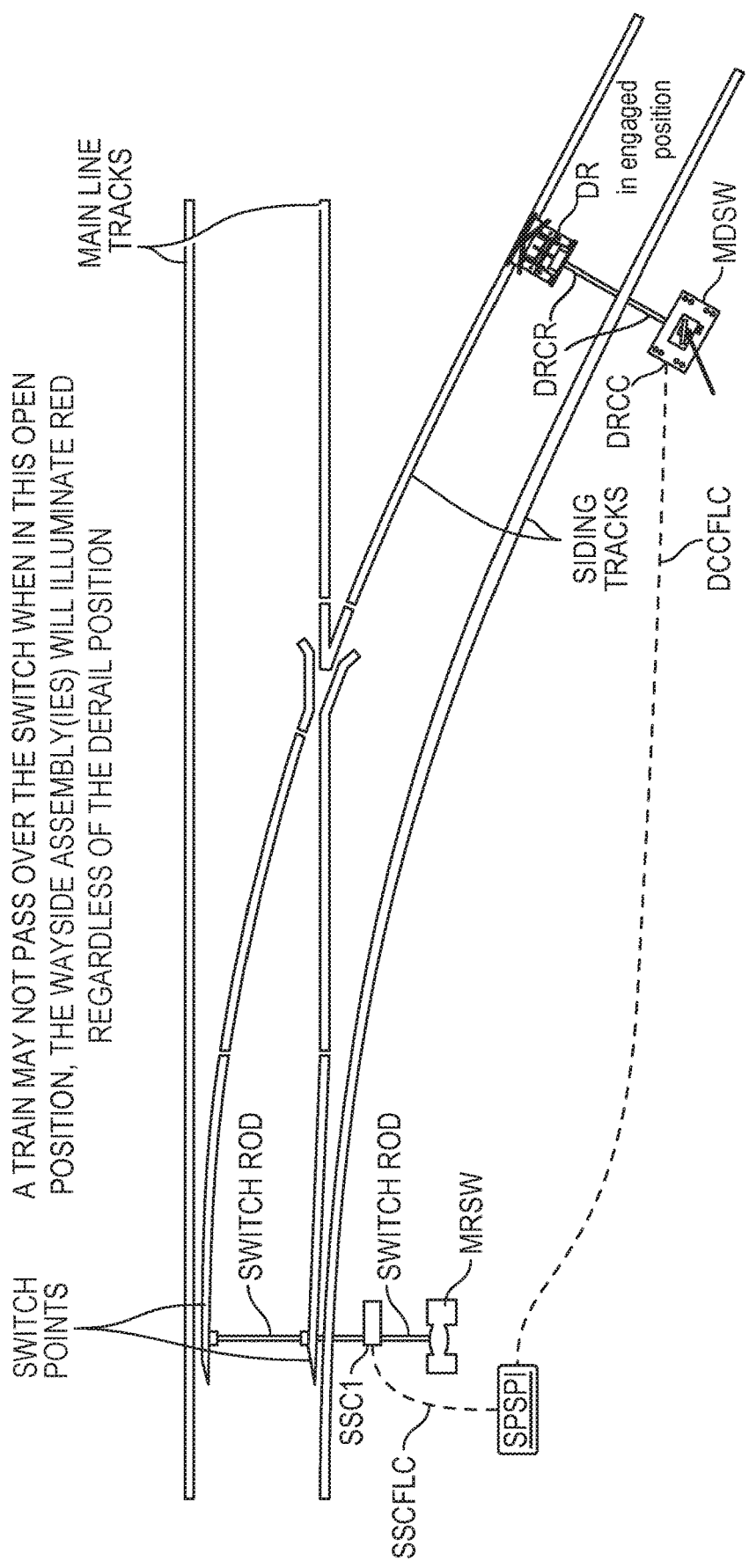
FIG. 14 is a top view of a typical railroad switch point at the location of siding tracks where the Manual Rail Switch MRSW is misaligned in an open position and will not allow a train to pass on the main line tracks or side tracks safely and will cause the train to derail resulting in significant damage and potential loss of life.

As depicted in FIGS. 1A, 1C, 9A, 9B & 15A the Derail Circuit Controller DRCC is operatively attached to a Derail Connecting Rod DRCR of the Manual Derail Switch MDSW such that when the Manual Derail Switch MDSW Derail Connecting Rod DRCR places the Derail DR in an engaged position as depicted in FIGS. 12 & 14 the Manual Derail Switch MDSW closes an electrical contact in the Derail Circuit Controller DRCC. With the Derail DR against the rail of a railroad siding (engaged position) as depicted in FIGS. 12 & 14 a train or other rail cars that are spotted or parked on the railroad siding are prevented from rolling toward the railroad switch being monitored by the Switch Assembly SPSCI thereby preventing the parked train or other rail cars from passing the clearance point heading towards the main rail line. If the parked train or other rail cars were to thus roll beyond or pass the clearance point toward the main rail line they would foul the main rail line and an approaching train on the main rail line could not pass the switch on the main rail line without colliding into them. The closure of the Derail Circuit Controller DRCC electrical contact grounds out the Derail 5V Reed Relay DK3 on the Switch Assembly Circuit Board SIB1 which is electrically connected to the Derail Circuit Controller DRCC, thereby generating a digital output that is inputted to the Switch Assembly Cellular Microcontroller U1 by means of input pin D2. The Switch Assembly Cellular Microcontroller U1 then processes the digital input from which it then generates and transmits engaged derail position data. Also as depicted in FIGS. 1A, 1B, 9A, 9B & 15A the Derail Circuit Controller DRCC can only function as intended in the Switch Assembly SPSCI if it is conductively connected to a Derail Common Circuit Board Feed Line Connection Point DCOM on the Switch Assembly Circuit Board SIB1 thereby providing a common ground in order that when the derail is an a engaged position as set by the Manual Derail Switch MDSW 5V electrical power may flow from the Switch Assembly Circuit Board SIB1 to the Derail Circuit Controller DRCC and back to the Derail Common Circuit Board Feed Line Connection Point DCOM of the Switch Assembly Circuit Board SIB1 by means of a conductively connected Derail Common Circuit Board Feed Line DRCBFL which is in turn conductively connected by means of the Switch Assembly Wiring Terminal Block SIWB to a Derail Common Feed Jump Line DRCJL which is in turn conductively connected by means of a Wire Connector WC to a Derail Common Feed Line DRCL which in turn is conductively connected to the Switch Circuit Controller SCC1 thereby completing its connection to the Derail Circuit Controller DRCC.

As depicted in FIGS. 1A, 1C, 9A, 9B & 15A the Derail Circuit Controller DRCC is operatively attached to a Derail Connecting Rod DRCR of Manual Derail Switch MDSW such that when the Manual Derail Switch MDSW is placed in a disengaged position whereby an unmanned train or railroad cars that are spotted or parked on the railroad siding or side track being monitored will not be prevented by the disengaged Derail DR from accidentally rolling into a position such that a train traveling on the main line could collide with them as depicted in FIG. 13, the Derail Circuit Controller DRCC electrical contact will not be closed and therefore the Derail 5V Reed Relay DK3 on the Switch Assembly Circuit Board SIB1 will not be grounded out. The absence of the digital output that would have been generated if the Derail DR had been engaged is interpreted by the Switch Assembly Cellular Microcontroller U1 to mean that the Derail DR is the disengaged position. The Switch Assembly Cellular Microcontroller U1 then processes the absence of a digital input and generates and transmits disengaged derail position data. When the Derail DR is in the engaged position such that the Derail Circuit Controller DRCC electrical contact is closed, 5V electrical power is transmitted to the Derail Condition Circuit Board Feed Line Connection Point DRL of the Switch Assembly Circuit Board SIB1 by means of a conductively connected Derail Condition Circuit Board Feed Line DRFBFL which is in turn conductively connected by means of the Switch Assembly Wiring Terminal Block SIWB to a Derail Condition Feed Jump Line DRFJL which is in turn conductively connected by means a Wire Connector WC to a Derail Condition Feed Line DRFL which in turn is conductively connected to the Derail Circuit Controller DRCC thereby completing its connection to the Switch Assembly Circuit Board SIB1.

As depicted in FIGS. 1A, 1C, 8, 9A & 9B the Derail Common Feed Line DRCL and the Derail Condition Feed Line DRFL both exit the Derail Circuit Controller DRCC inside a Derail Controller Two Feed Lines Conduit DCCFLC which carries the two wires through a Conduit Locknut Assembly CLA that permits the conduit to enter into the switch assembly weather resistant enclosure designated as the 12×10×6 Polycarbonate Enclosure BOX and be secured in that position by the Conduit Locknut Assembly CLA.

The Switch Assembly Circuit Board SIB1 as depicted in FIGS. 8, 9A, 9B, 10, 11A & 11B is protected from the weather and is securely attached inside of the switch assembly weather resistant enclosure designated as the 12×10×6 Polycarbonate Enclosure BOX to the Mounting Plate MP. The Switch Assembly Circuit Board SIB1 uses an operatively connected and attached Switch Assembly Cellular Microcontroller U1 to monitor three digital inputs (two from the Switch Circuit Controller SCC1 (one being generated by the 5V current flow to ground that indicates that the switch is in the normal position and the other being generated by the 5V current flow to ground that indicates that the switch is in reverse position) and one from the Derail Circuit Controller DRCC (being generated by the 5V current flow to ground that indicates that the derail is in the engaged position)) and three analog inputs (one each from: the Switch Assembly Solar Controller SC1; the ambient temperature inside the switch assembly weather resistant enclosure designated as 12×10×6 Polycarbonate Enclosure BOX which temperature is monitored and temperature input is generated by a Temperature Sensor U3; and the switch assembly battery designated as the 12V Lead Acid Battery BA1). The Temperature Sensor U3 is used for diagnostic purposes to make sure the temperature inside the enclosure of the 12×10×6 Polycarbonate Enclosure BOX does not go above 140 F and to monitor how often the temperature is below −4 F where the 12V Lead Acid Battery BA1 will begin to lose optimal charge capability. With this collective data, the Switch Assembly Cellular Microcontroller U1 determines the position of the Manual Rail Switch MRSW, the position of the Derail DR, the device temperature, and power status and sets the corresponding LED (light emitting diodes) indicators (Switch Assembly Circuit Board Blue LED D3, Switch Assembly Circuit Board Red LED D4, Switch Assembly Circuit Board Yellow LED D5, Switch Assembly Circuit Board Green LED D6 and Switch Assembly Circuit Board Derail Orange LED D7) on the Switch Assembly Circuit Board SIB1 using five digital outputs. The device firmware runs on the Switch Assembly Cellular Microcontroller U1 and interfaces to a user selected cloud computing service platform CLOUD COMPUTING SERVICE via the built in cell modem that transmits by means of a user selected cellular network the data that it receives from the Switch Circuit Board SIB1 by means of the Cellular Antennae CA. As depicted in FIGS. 8, 9A, 9B, 15A, 15B & 15C the data is transmitted by means of the Switch Assembly Cellular Microcontroller U1 cellular transmission through a Cellular Antennae Connecting Wire CACW connected to a Cellular Antennae CA then to the CLOUD COMPUTING SERVICE of a user selected cloud computing service provider via a cellular network, where an event is triggered to forward the data on: 1) to the Wayside Assembly WIA depicted in FIGS. 2, 4A, 4B, 6, 7A & 7B; and 2) to the COMPUTER's database where it generates user selected displays as depicted in FIGS. 16-21 and is accessible remotely by a PC, Laptop, Personal Electronic Device, Tablet or Cell Phone via the World Wide Web and other authorized user programmed functions responsive to the data such as: activating an audible alarm; activating a flasher or other illumination; generating an automated phone call to user selected railroad and/or emergency personnel; transmitting a radio signal message; transmitting an email; transmitting a text message; activating switches, activating crossing gates and/or other active railroad warning devices, activating automatic train control devices such as Positive Train Control and the like. The Switch Assembly Cellular Microcontroller U1 by means of the CLOUD COMPUTING SERVICE connection may be rebooted and/or reprogrammed remotely by authorized users on their devices or by means of the COMPUTER. The Switch Assembly Cellular Microcontroller U1 may be rebooted by means of the Reset Switch RESET of the Board Condition Monitoring Assembly BMA on the Switch Assembly Circuit Board SIB1. The Switch Assembly Cellular Microcontroller U1 may also be rebooted and/or reprogrammed by connecting a computer or other electronic device to the Switch Assembly Circuit Board SIB1 by means of the USB Type A Female Connector USB.

As depicted in FIGS. 8, 9A, 9B, 10, 11A & 11B the Switch Assembly Cellular Microcontroller U1 is powered by the switch assembly battery designated as the 12V Lead Acid Battery BA1 and receives five volts external power via the 12V Lead Acid Battery BA1 connection to the Switch Assembly Solar Controller SC1 which is also connected to a 50 W 17V Solar Panel PN1. Given the extremely low current draw of the Switch Assembly Cellular Microcontroller U1, the 12V Lead Acid Battery BA1 being 20 aH provides enough power for the Switch Assembly SPSCI to operate for at least a week without any sunlight. This is especially important on short, cloudy winter days.

Figure 10:
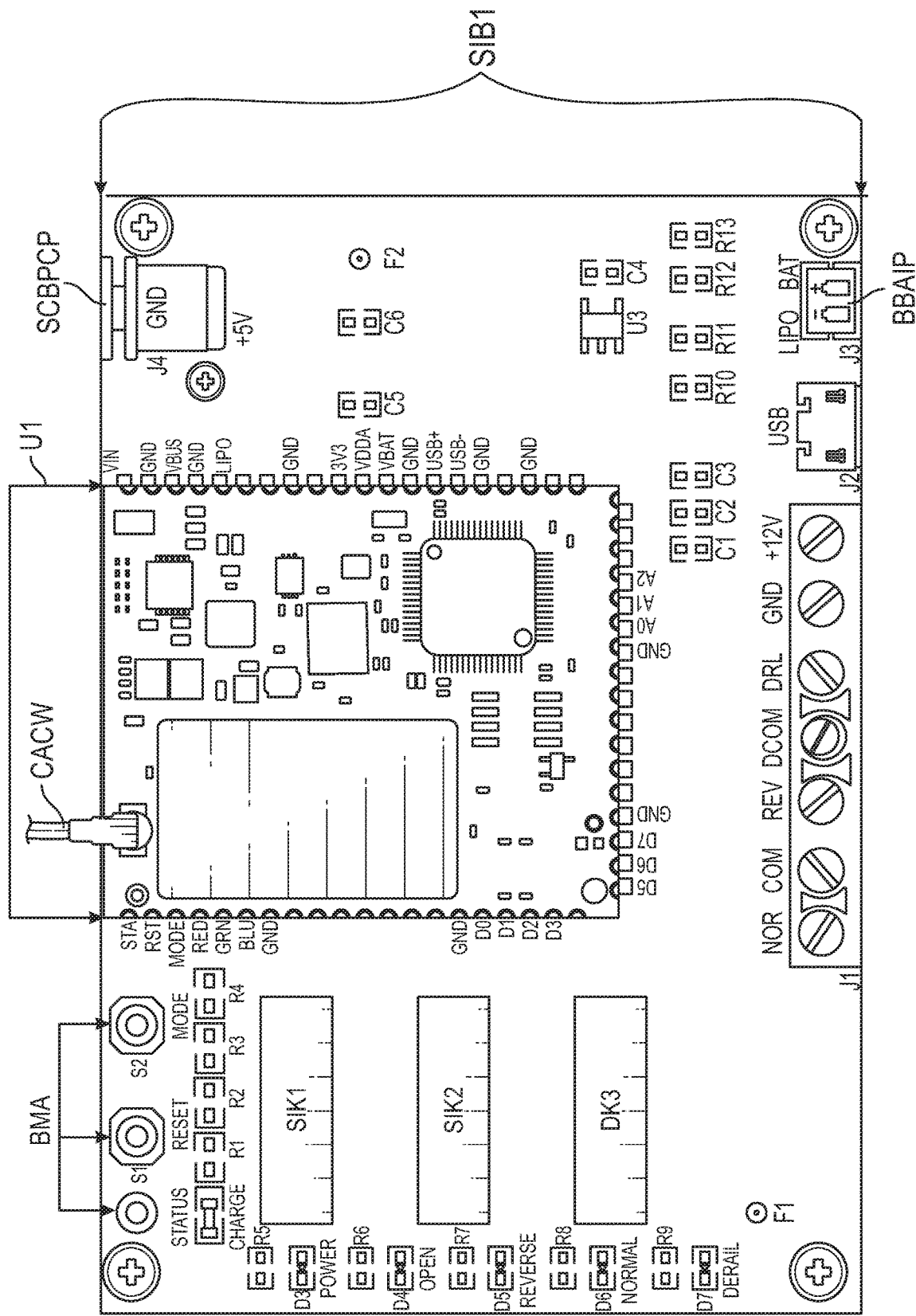
FIG. 10 is a top view of the Switch Assembly Circuit Board SIB1 depicted in FIGS. 8, 9A, 9B, 11A & 11B.

As depicted in FIGS. 10, 11A & 11B: when the Manual Rail Switch MRSW is set in the normal position as depicted in FIG. 13 the closure of the Switch Assembly Normal 5V Reed Relay SIK1 is facilitated which in turn controls a 3.3 volt signal on input pin D0 of the Switch Assembly Cellular Microcontroller U1; when the Manual Rail Switch MRSW is set in the reverse position as depicted in FIG. 12 the closure of the Switch Assembly Reverse 5V Reed Relay SIK2 is facilitated which in turn controls a 3.3 volt signal on input pin D1 of the Switch Assembly Cellular Microcontroller U1; and when the Manual Derail Switch MDSW is set in the engaged position as depicted in FIGS. 13 & 14 the closure of the Derail 5V Reed Relay DK3 is facilitated which in turn controls a 3.3 volt signal on input pin D2 of the Switch Assembly Cellular Microcontroller U1. Based on the value of these inputs to the Switch Assembly Cellular Microcontroller U1, the position of the Manual Rail Switch MRSW and the Manual Derail Switch MDSW can be determined. Input A0 is used to determine if the Switch Assembly Cellular Microcontroller U1 has power. Input A1 is used to determine the temperature of the device via the Temperature Sensor U3. Input A2 is used to determine the charge status of the battery and power output of the Switch Assembly Solar Controller SC1 by means of the CHARGE SENSOR. Pins D3-D7 on the Switch Assembly Cellular Microcontroller U1 are used to control (illuminate) five status indicator LED's located on the Switch Assembly Circuit Board SIB1 which LEDs are; 1) a Switch Assembly Circuit Board Blue LED D3 which when illuminated indicates that the Switch Assembly Cellular Microcontroller U1 has external power; 2) a Switch Assembly Circuit Board Green LED D6 which when illuminated indicates that the Manual Rail Switch MRSW is in the normal position as depicted in FIG. 13; 3) a Switch Assembly Circuit Board Yellow LED D5 which when illuminated indicates that the Manual Rail Switch MRSW is in the reverse position as depicted in FIG. 12; 4) a Switch Assembly Circuit Board Red LED D4 which when illuminated indicates that the Manual Rail Switch MRSW is in the open position as depicted in FIG. 14; and a Switch Assembly Circuit Board Derail Orange LED D7 which when illuminated indicates that the Manual Derail Switch MDSW is in the engaged position as depicted in FIGS. 13 & 14. The Switch Assembly SPSCI component of the Solar Powered Cell Network Switch Point Indicator System as depicted in FIGS. 1A-21 will perform its intended function regardless of the type of railroad switch or railroad derail that is used which include, but is not limited to automatic switches, power assisted switches, automatic derails or power assisted derails. The data that is indicated by the five LEDs is also transmitted to the user selected CLOUD COMPUTING SERVICE by means of the Switch Assembly Cellular Microcontroller U1 through the connected Cellular Antennae CA to the CLOUD COMPUTING SERVICE of a user selected cloud service provider via a user selected cellular network, where an event is triggered to forward the data on to a database on the COMPUTER as depicted in FIGS. 15A, 15B & 15C. The Cellular Antennae CA as depicted in FIGS. 8 & 9A is protected from the weather and is securely attached inside of the switch assembly weather resistant enclosure designated as the 12×10×6 Polycarbonate Enclosure BOX by means of a Cellular Antennae Bracket CAB which is in turn is attached to the Mounting Plate MP.

As depicted in FIGS. 8, 9A, 9B, 10, 11A & 11B a 3.7V Lithium Polymer Backup Battery BBA is electrically connected to the Switch Assembly Circuit Board SIB1 by means of a 3.7V Lithium Polymer Backup Battery Positive Feed Line BBAP and a 3.7V Lithium Polymer Backup Battery Negative Feed Line BBAN connection to a 3.7V Lithium Polymer Backup Battery Interface Plug BBAIP that is attached to the Switch Assembly Circuit Board SIB1 thereby facilitating 3.7V electrical power to the Switch Assembly Circuit Board SIB1 including the attached Switch Assembly Microcontroller U1, from the 3.7V Lithium Polymer Backup Battery BBA by means of the circuitry as depicted in FIGS. 11A & 11B. The 3.7V Lithium Polymer Backup Battery BBA as depicted in FIG. 9A is protected from the weather and is removably attached inside of the switch assembly weather resistant enclosure designated as the 12×10×6 Polycarbonate Enclosure BOX by means of a Backup Battery Velcro Holder BBAVH which is in turn is securely attached to the Mounting Plate MP. In the event of a power failure of the sources of electrical power within the Switch Assembly SPSCI the Switch Assembly Microcontroller U1 will still be able to operate by means of the 3.7V electrical power that it receives from the 3.7V Lithium Polymer Backup Battery BBA. In the event of such a power failure, with the power supplied by the 3.7V Lithium Polymer Backup Battery BBA, the Switch Assembly Microcontroller U1 will generate data indicating the loss of power condition when the Switch Assembly Microcontroller U1 fails to receive a flow of electrical current from the CHARGE SENSOR that is connected by means of the Switch Assembly Circuit Board SIB1 circuitry between the Switch Assembly Microcontroller U1 and both the Power Monitor Positive Connection Point +12V and the Power Monitor Negative Connection Point GND as depicted in FIG. 15A. The Switch Assembly Microcontroller U1 will then transmit the data indicating the loss of power condition to the CLOUD COMPUTING SERVICE where it may be accessed by the COMPUTER and the Wayside Assembly WIA as depicted in FIGS. 15A, 15B & 15C. In the event of such a power failure the switch being monitored by the device is now considered to be dark and approaching trains will be on notice by means of: its access to the COMPUTER; radio communication with the railroad dispatch office; or a flashing Wayside Red LED WRLED on the Wayside Lamp Assembly WLA, that the approach to the switch being monitored by the device is the restricted and to approach with extreme caution. In the event that power is restored after the event of a power failure the Switch Assembly Microcontroller U1 resumes functioning and the Switch Assembly Microcontroller U1 is programmed to resend or otherwise resume sending the switch position and derail position data to the CLOUD COMPUTING SERVICE.

The Wayside Assembly

The Wayside Assembly WIA is generally depicted in FIGS. 2, 3, 4A, 5, 6, 7A & 7B and is generally comprised of: a wayside assembly solar panel designated as the 100 W 17V Solar Panel PN2; a wayside assembly weather resistant enclosure designated as the 12×10×6 Polycarbonate Enclosure BOX; a Wayside Assembly Solar Controller WSC1; a Wayside Assembly Weather Resistant Battery Enclosure BABOX; a wayside assembly battery designated as the 12V Lead Acid Battery BA1; a wayside assembly temperature sensor designated as the Temperature Sensor U3; a Wayside Assembly Circuit Board WIB1; a Wayside Assembly Cellular Microcontroller U2; a 3.7V Lithium Polymer Backup Battery BBA; and a wayside assembly cellular antennae designated as the Cellular Antennae CA.

Figure 4A:
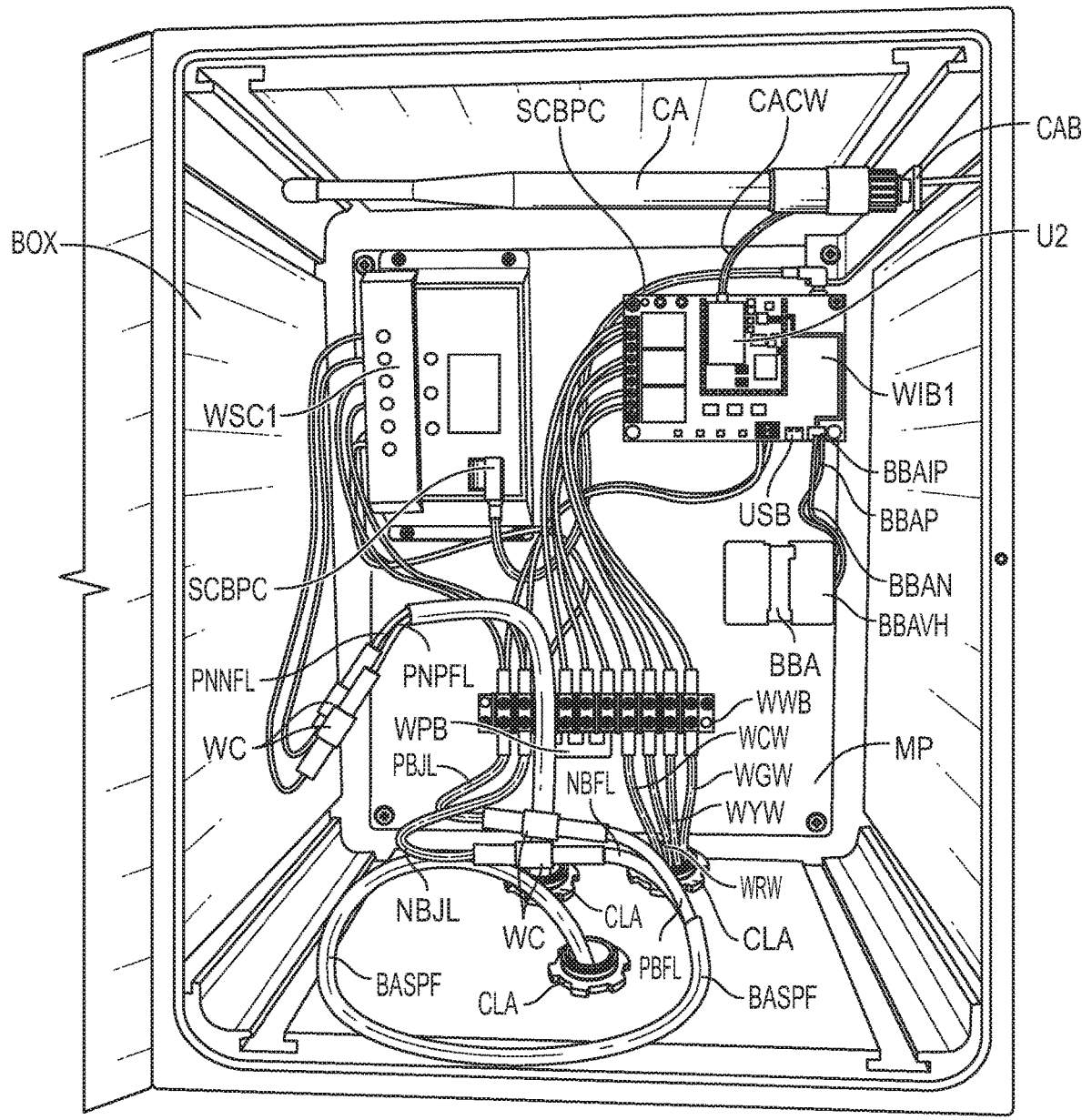
FIG. 4A is a front view of the wayside assembly weather resistant enclosure designated as the 12×10×6 Polycarbonate Enclosure BOX with the Wayside Assembly Circuit Board WIB1, the Wayside Assembly Cellular Microcontroller U2, the Wayside Assembly Solar Controller WSC1 and the wayside assembly cellular antennae designated as the Cellular Antennae CA functionally connected together and mounted in said 12×10×6 Polycarbonate Enclosure BOX with the wiring connected thereto and exiting therefrom for connections to the wayside assembly solar panel designated as the 100 W 17V Solar Panel PN2 depicted in FIG. 2 and the wayside assembly battery designated as the 12V Lead Acid Battery BA1 depicted in FIG. 5.
Figure 5:
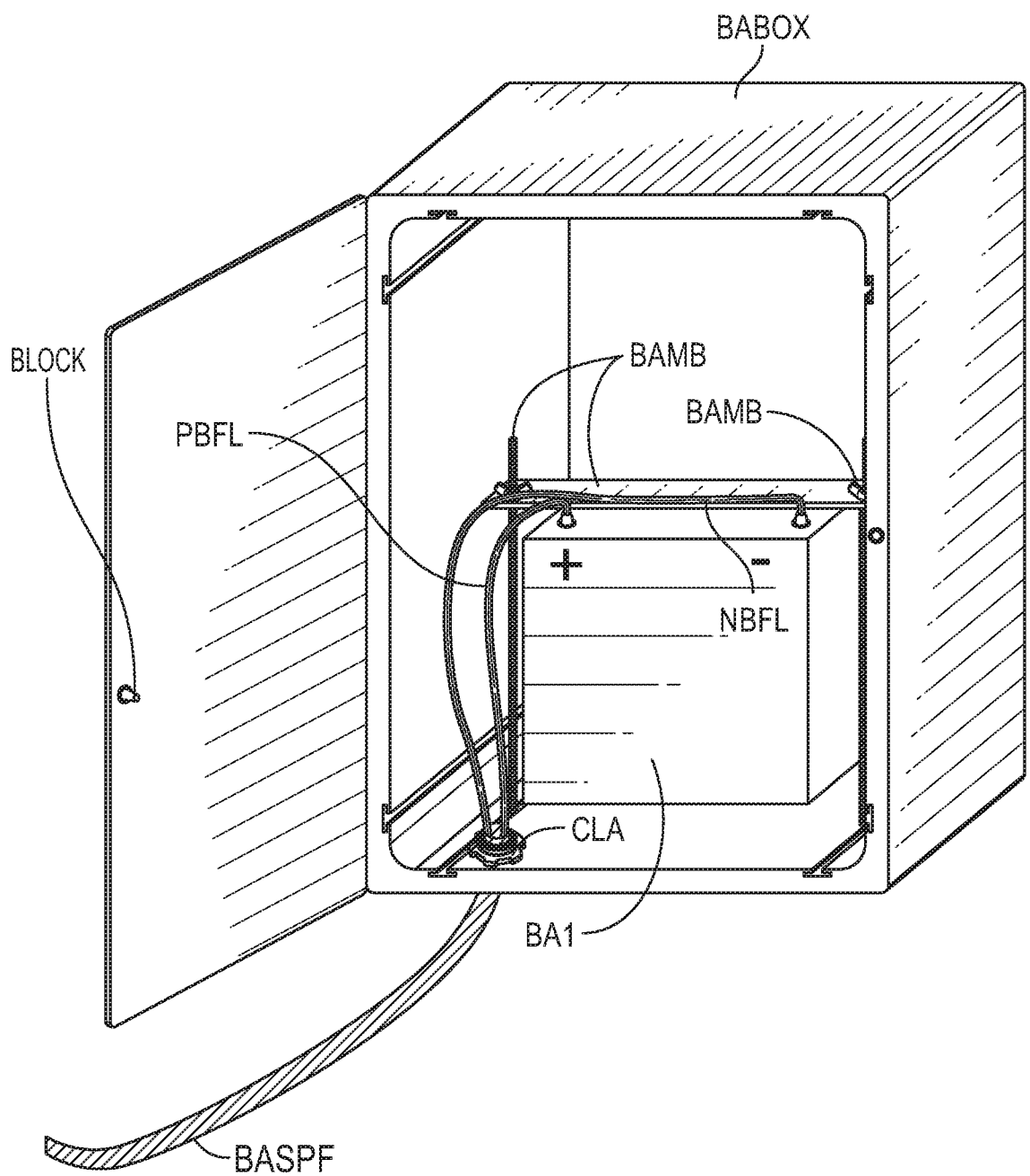
FIG. 5 is a front view of the Wayside Assembly Weather Resistant Battery Enclosure BABOX depicted in FIG. 2 in the open condition with the wayside assembly battery designated as the 12V Lead Acid Battery BA1 secured in place inside by a Cushioned Battery Mounting Plate BAMB with the wiring connected thereto and exiting therefrom for connection by jump lines to the Wayside Wiring Terminal Block WWB inside the wayside assembly weather resistant enclosure designated as the 12×10×6 Polycarbonate Enclosure BOX as depicted in FIG. 4.

As depicted in FIGS. 2, 4A & 5 the wayside assembly weather resistant enclosure designated as the 12×10×6 Polycarbonate Enclosure BOX and the Wayside Assembly Weather Resistant Battery Enclosure BABOX are fabricated from polycarbonate, fiberglass or other suitable material to permit the cell signal from the Wayside Assembly Cellular Microcontroller U2 as transmitted through the Cellular Antennae CA to propagate through the 12×10×6 Polycarbonate Enclosure BOX. The 12×10×6 Polycarbonate Enclosure BOX is capable of being opened and closed by means of a lid or door which may be locked to prevent unauthorized access similar the Box Lock BLOCK of the Wayside Assembly Weather Resistant Battery Enclosure BABOX depicted in FIG. 5.

Figure 4B:
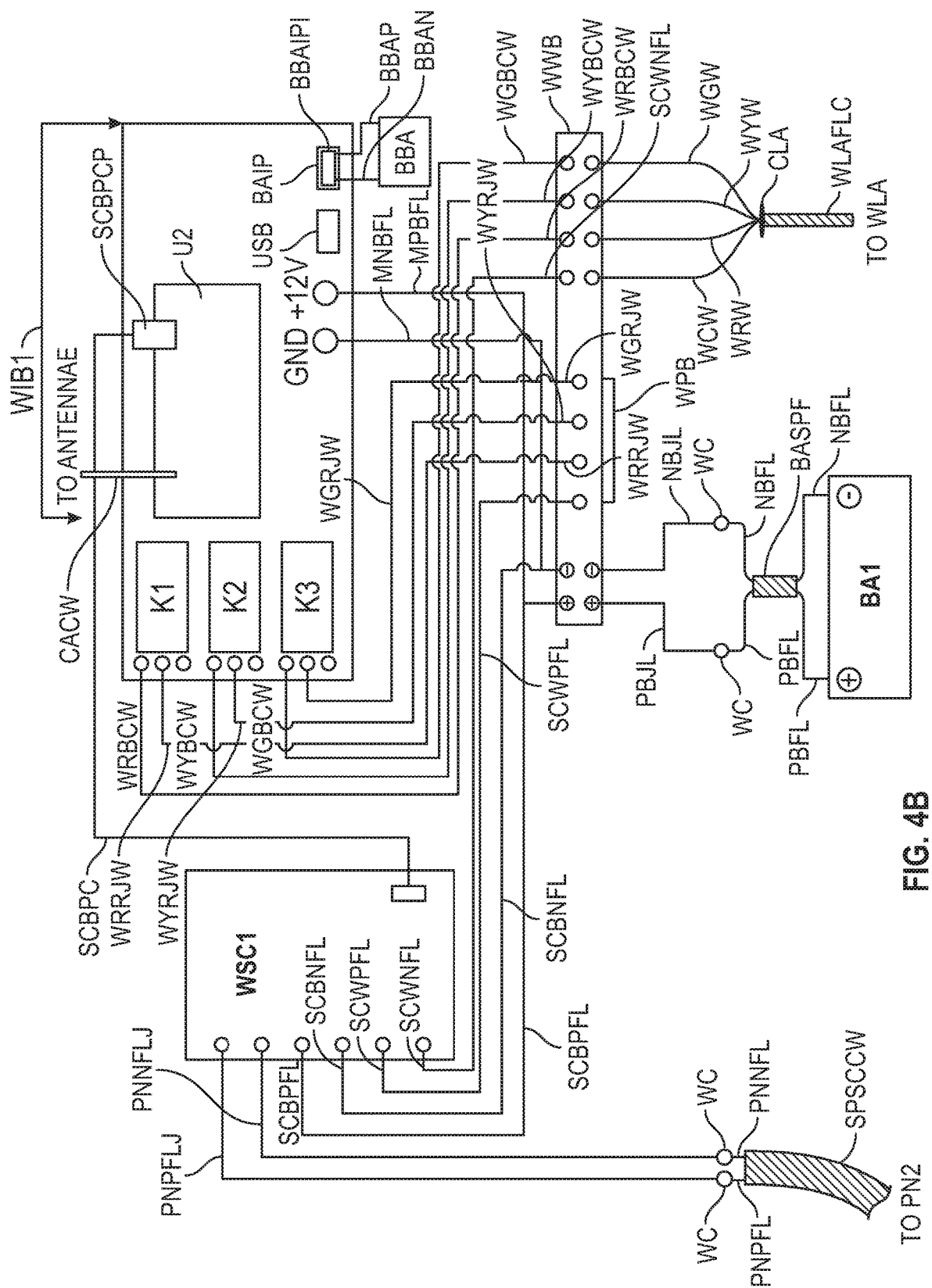
FIG. 4B is a wiring diagram of the Wayside Assembly WIA depicted in FIGS. 2, 4A, 5, 6, 7A, & 7B.

As depicted in FIG. 2 the wayside assembly solar panel designated as the 100 W 17V Solar Panel PN2 being used in this invention to convert sunlight into electrical energy is securely mounted to a 4" Diameter Post POST by means of a Solar Panel Mounting Bracket BRK1 in a position that maximizes the amount of sunlight coming in contact with the 100 W 17V Solar Panel PN2. As depicted in FIGS. 2, 4A & 4B the electrical energy being generated by the 100 W 17V Solar Panel PN2 is transmitted to the Wayside Assembly Solar Controller WSC1 by means of a Solar Panel Connecting Positive Feed Line to Solar Controller PNPFL and a Solar Panel Connecting Negative Feed Line to Solar Controller PNNFL that both exit the 100 W 17V Solar Panel PN2 inside a Solar Panel Connecting Two Wire Conduit to Solar Controller SPSCCW which carries the two wires through a Conduit Locknut Assembly CLA that permits the conduit to enter into the wayside assembly weather resistant enclosure designated as the 12×10×6 Polycarbonate Enclosure BOX and be secured in that position by the Conduit Locknut Assembly CLA. The switch assembly weather resistant enclosure designated as the 12×10×6 Polycarbonate Enclosure BOX is secured to 4" Diameter Post POST with an Enclosure Mounting Bracket BRK2 in a position that is at once accessible to user authorized personnel and will not block sunlight to the 100 W 17V Solar Panel PN2. The Solar Panel Connecting Positive Feed Line to Solar Controller PNPFL and the Solar Panel Connecting Negative Feed Line to Solar Controller PNNFL then extend outside the Solar Panel Connecting Two Wire Conduit to Solar Controller SPSCCW inside the wayside assembly weather resistant enclosure designated as the 12×10×6 Polycarbonate Enclosure BOX where by means of two Wire Connectors WC the Solar Panel Connecting Positive Feed Line to Solar Controller PNPFL is connected to a Solar Panel Connecting Positive Jump Line to Solar Controller PNPFLJ and the Solar Panel Connecting Negative Feed Line to Solar Controller PNNFL is connected to a Solar Panel Connecting Negative Jump Line to Solar Controller PNNFLJ. The Solar Panel Connecting Positive Jump Line to Solar Controller PNPFLJ and the Solar Panel Connecting Negative Jump Line to Solar Controller PNNFLJ then connect to the Wayside Assembly Solar Controller WSC1 thereby facilitating the electricity generated by the 100 W 17V Solar Panel PN2 to be transmitted to the Wayside Assembly Solar Controller SC1.

The Wayside Assembly Solar Controller WSC1 as depicted in FIG. 4A is protected from the weather and is securely attached inside of the wayside assembly weather resistant enclosure designated as the 12×10×6 Polycarbonate Enclosure BOX to a Mounting Plate MP. The Mounting Plate MP is securely attached to the wayside assembly weather resistant enclosure designated as the 12×10×6 Polycarbonate Enclosure BOX.

The Wayside Assembly Solar Controller WSC1 as depicted in FIGS. 4A, 4B, 6, 7A & 7B is conductively connected and provides 5V electrical power to the Wayside Assembly Circuit Board WIB1 and the Wayside Assembly Cellular Microcontroller U2 by means of a Solar Controller 5V Power Cable SCBPC one end of which plugs into the Wayside Assembly Solar Controller WSC1 and the other end of which plugs in to a Solar Controller 5V Power Cable Plug SCBPCP which is conductively connected to the Wayside Assembly Circuit Board WIB1 and the Wayside Assembly Cellular Microcontroller U2.

The Wayside Assembly Solar Controller WSC1 as depicted in FIGS. 4A, 4B, 6, 7A & 7B provides 12V electrical power to the Wayside Assembly Circuit Board WIB1 and the wayside assembly battery designated as the 12V Lead Acid Battery BA1 by being conductively connected to a Wayside Assembly Wiring Terminal Block WWB by means of a Solar Controller Positive Feed Line SCBPFL and a Solar Controller Negative Feed Line SCBNFL. The Wayside Assembly Wiring Terminal Block WWB is secured inside the weather resistant enclosure designated as the 12×10×6 Polycarbonate Enclosure BOX by means of its attachment to the Mounting Plate MP. The Wayside Assembly Circuit Board WIB1 is conductively connected with 12V power to the Wayside Assembly Solar Controller WSC1 by: conductively connecting a Main Positive Power Monitor Feed Line MPBFL to the same connection point on the Wayside Assembly Wiring Terminal Block WWB as the Solar Controller Positive Feed Line SCBPFL conductively connecting it thereto as depicted in FIG. 4B with the other end of the Main Positive Power Monitor Feed Line MPBFL being conductively connected to a Power Monitor Positive Connection Point +12V which is conductively connected to the circuitry of the Wayside Assembly Circuit Board WIB1 as depicted in FIGS. 4B, 6, 7A, 7B & 15C; and conductively connecting a Main Negative Power Monitor Feed Line MNBFL to the same connection point on the Wayside Assembly Wiring Terminal Block WWB as the Solar Controller Negative Feed Line SCBNFL conductively connecting it thereto as depicted in FIG. 4B with the other end of the Main Negative Power Monitor Feed Line MNBFL being conductively connected to a Power Monitor Negative Connection Point GND which is conductively connected to the circuitry of the Wayside Assembly Circuit Board WIB1 as depicted in FIGS. 4B, 6, 7A, 7B & 15C.

The Wayside Assembly Solar Controller WSC1 as depicted in FIGS. 4A, 4B, 6, 7A, 7B & 15C provides separate 12V electrical power to three wayside relays, namely a Wayside Red Relay K1, a Wayside Yellow Relay K2 and a Wayside Green Relay K3, each of which being conductively attached to the circuitry of the Wayside Assembly Circuit Board WIB1. The 12V electrical power is transmitted to the Wayside Red Relay K1, the Wayside Yellow Relay K2 and the Wayside Green Relay K3 respectively by means of a Wayside Red Relay Power Jump Line WRRJW, a Wayside Yellow Relay Power Jump Line WYRJW and a Wayside Green Relay Power Jump Line WGRJW each of which receiving the 12V electrical power from the Wayside Assembly Solar Controller WSC1 by means of a conductively connected Solar Controller Positive Wayside Assembly Feed Line SCWPFL that is conductively connected to the Wayside Assembly Wiring Terminal Block WWB thereby providing 12V electrical power to the Wayside Red Relay Power Jump Line WRRJW, the Wayside Yellow Relay Power Jump Line WYRJW and the Wayside Green Relay Power Jump Line WGRJW by means of a Wayside Power Bridge WPB conductively attached to the Wayside Assembly Wiring Terminal Block WWB. The Wayside Red Relay K1, Wayside Yellow Relay K2 and Wayside Green Relay K3 are each also conductively attached respectively to a Wayside Red LED WRLED, a Wayside Yellow LED WYLED and a Wayside Green LED WGLED, each being part of a Wayside Lamp Assembly WLA, respectively by means of a Wayside Red LED Power Wire WRW, a Wayside Yellow LED Power Wire WYW and a Wayside Green LED Power Wire WGW by means of each respective connection through the Wayside Assembly Terminal Block WWB to a Wayside Red LED Board Connecting Wire WRBCW, a Wayside Yellow LED Board Connecting Wire WYBCW and a Wayside Green LED Board Connecting Wire WRGCW. The Wayside Assembly Solar Controller WSC1 also providing a common ground to the Wayside Red LED WRLED, the Wayside Yellow LED WYLED and the Wayside Green LED WGLED ("The LEDS") by means of a Solar Controller Negative Wayside Assembly Feed Line SCWNFL that is conductively connected to The LEDS by means of its connection to a Wayside Common Wire WCW through the respective connections to the Wayside Assembly Terminal Block WWB as depicted in FIGS. 4A & 4B.

As depicted in FIGS. 2 & 5 the 12V Lead Acid Battery BA1 is secured in the Wayside Assembly Weather Resistant Battery Enclosure BABOX by means of a Cushioned Battery Mounting Plate BAMP.

As depicted in FIGS. 4A, 4B, 5 & 15C the positive terminal of the switch assembly battery designated as the 12V Lead Acid Battery BA1 is conductively connected to a Positive Battery Feed Line PBFL and the negative terminal of the switch assembly battery designated as the 12V Lead Acid Battery BA1 is conductively connected to a Negative Battery Feed Line NBFL. The Positive Battery Feed Line PBFL by means of a Wire Connector WC is conductively connected to a Positive Battery Jump Line PBJL and the Negative Battery Feed Line NBFL by means of a Wire Connector WC is conductively connected to a Negative Battery Jump Line NBJL. The Positive Battery Jump Line PBJL is conductively attached to the Wayside Assembly Wiring Terminal Block WWB whereby it is conductively connected to the Solar Controller Positive Feed Line SCBPFL thereby conductively connecting the Wayside Assembly Solar Controller WSC1 to the positive terminal of the switch assembly battery designated as the 12V Lead Acid Battery BA1. The Negative Battery Jump Line NBJL is conductively attached to the Wayside Assembly Wiring Terminal Block WWB whereby it is conductively connected to the Solar Controller Negative Feed Line SCBNFL thereby conductively connecting the Wayside Assembly Solar Controller WSC1 to the negative terminal of the switch assembly battery designated as the 12V Lead Acid Battery BA1. The Negative Battery Feed Line NBFL and the Positive Battery Feed Line PBFL both exit from the 12V Lead Acid Battery BA1 through a Conduit Locknut Assembly CLA that is attached to the Wayside Assembly Weather Resistant Battery Enclosure BABOX inside a Connecting Wire Conduit to Battery BASPF which carries the two wires through another Conduit Locknut Assembly CLA that permits the conduit to enter into the wayside assembly weather resistant enclosure designated as the 12×10×6 Polycarbonate Enclosure BOX and be secured in that position by the respective Conduit Locknut Assemblies CLA.

As depicted in FIGS. 4A, 4B, 5 & 15C the Wayside Assembly Solar Controller WSC1 is capable of receiving electrical power from either or both the wayside assembly battery designated as the 12V Lead Acid Battery BA1 and/or the 100 W 17V Solar Panel PN2. With the power thus received the Wayside Assembly Solar Controller WSC1 can then output both 5V and 12V electrical power. The Wayside Assembly Solar Controller SC1 being conductively connected to: the wayside assembly battery designated as the 12V Lead Acid Battery BA1 facilitating a 12V electrical power connection thereby; the 100 W 17V Solar Panel PN2 receiving solar generated electrical power thereby; the Wayside Assembly Circuit Board WIB1 supplying 5V electrical power thereby; The LEDS of the Wayside Lamp Assembly WLA supplying 12V electrical power thereby; and the Wayside Assembly Cellular Microcontroller U2 supplying 5V electrical power thereby, performs the following functions: 1) provides the 5V electrical power to the Wayside Assembly Cellular Microcontroller U2 that is required by the Wayside Assembly Cellular Microcontroller U2 to process: the railroad switch position data; the derail position data; and the loss of power condition data being received from the Switch Assembly SPSCI; 2) monitors, charges and maintains the 12V charge of the wayside assembly battery designated as the 12V Lead Acid Battery BA1; 3) provides the 5V electrical power to the Wayside Assembly Circuit Board WIB1; 4) provides the 12V electrical power to the Wayside Assembly Circuit Board WIB1 whereby the charge and power condition of the power sources to the Wayside Assembly WIA can be monitored by means of the CHARGE SENSOR; 5) monitors, charges and maintains the 3.7V charge of a 3.7V Lithium Polymer Backup Battery BBA; and 6) provides the 12V electrical power to The LEDS of the Wayside Lamp Assembly WLA.

As depicted in FIGS. 4A, 4B, 7A, 7B & 15C the Wayside Assembly Solar Controller WSC1 and the wayside assembly battery designated as the 12V Lead Acid Battery BA1 are connected in parallel to the Wayside Assembly Circuit Board WIB1 by means of the Main Positive Power Monitor Feed Line MPBFL and the Main Negative Power Monitor Feed Line MNBFL as explained above. This 12V current flow to the Switch Assembly Circuit Board SIB1 generates by means of the CHARGE SENSOR of the Wayside Assembly Circuit Board WIB1 an analog output that is accessed by the Wayside Assembly Cellular Microcontroller U2 by means of input A2 which interprets the input and then generates user desired data regarding the charge condition of the 12V Lead Acid Battery BA1 and condition of the Switch Assembly Solar Controller SC1 as depicted in FIG. 15C.

Figure 7A:
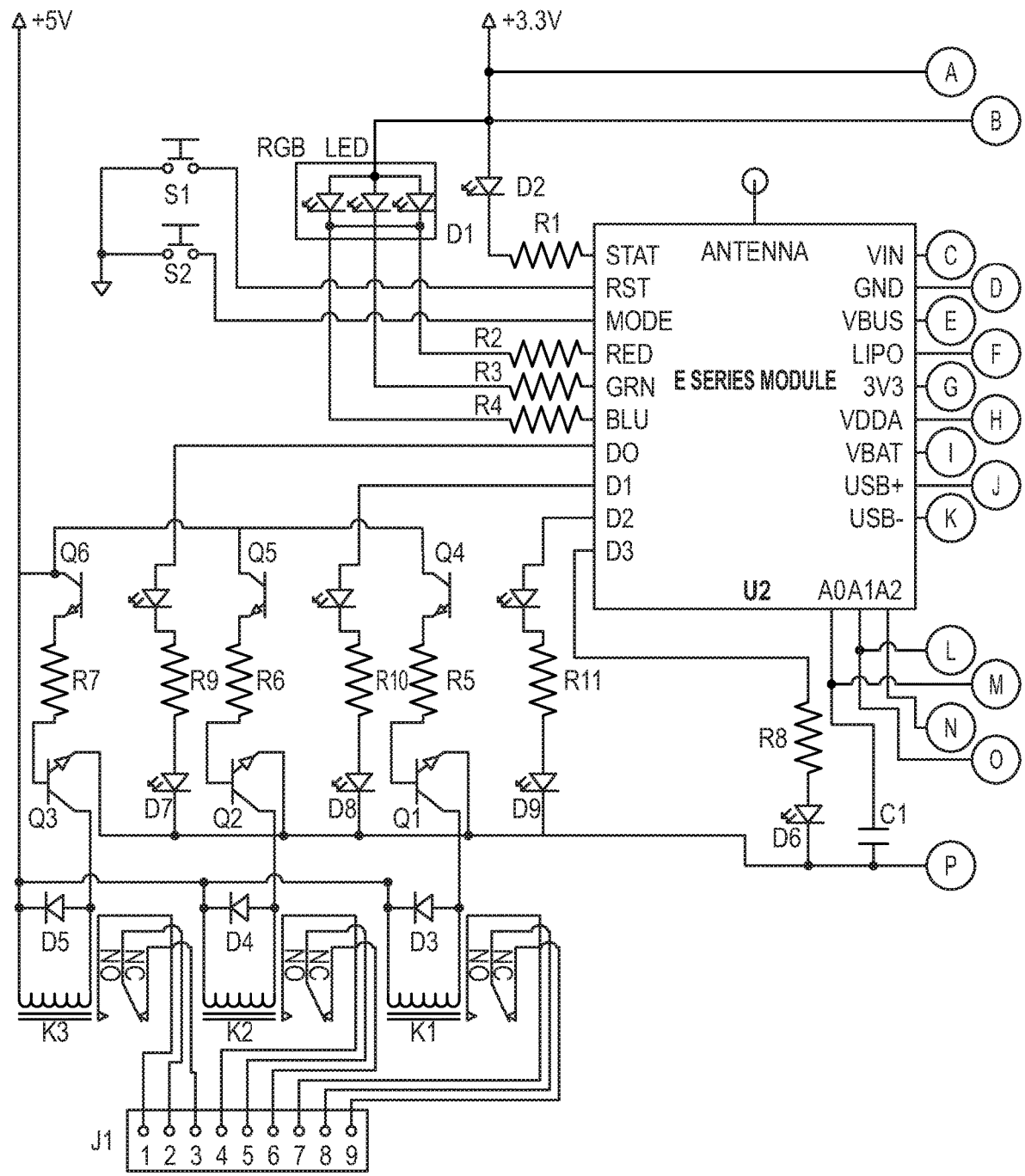
FIG. 7A is a portion of the circuit schematic of the Wayside Assembly Circuit Board WIB1 which when viewed together with FIG. 7B depicts the entire schematic of the Wayside Assembly Circuit Board WIB1 depicted in FIGS. 4A, 4B & 6.
Figure 7B:
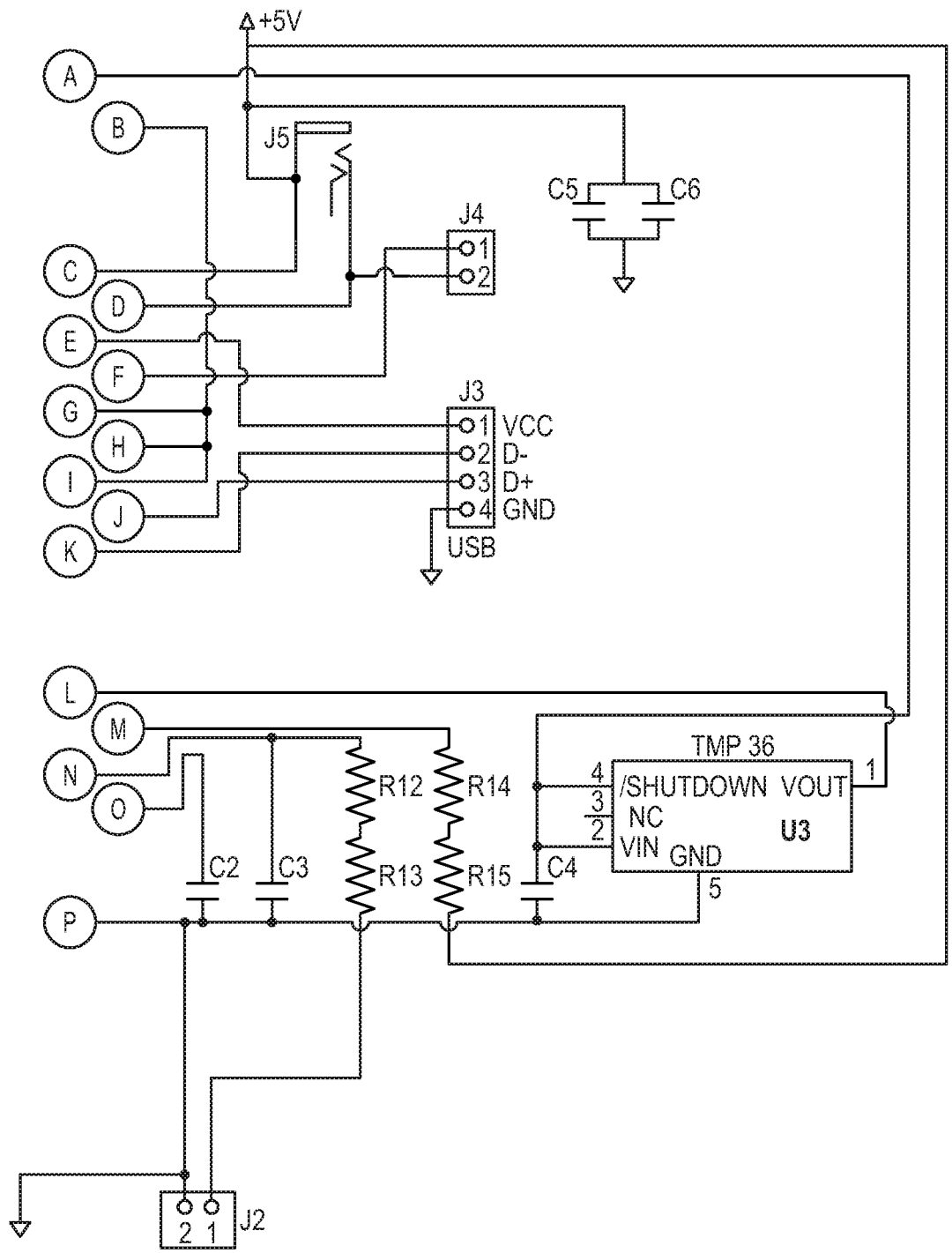
FIG. 7B is a portion of the circuit schematic of the Wayside Assembly Circuit Board WIB1 which when viewed together with FIG. 7A depicts the entire schematic of the Wayside Assembly Circuit Board WIB1 depicted in FIGS. 4A, 4B & 6.

As depicted in FIGS. 4A, 4B, 7A & 7B a 3.7V Lithium Polymer Backup Battery BBA is electrically connected to the Wayside Assembly Circuit Board WIB1 by means of a 3.7V Lithium Polymer Backup Battery Positive Feed Line BBAP and a 3.7V Lithium Polymer Backup Battery Negative Feed Line BBAN connection to a 3.7V Lithium Polymer Backup Battery Interface Plug BBAIP that is attached to the Wayside Assembly Circuit Board WIB1 thereby facilitating 3.7V electrical power to the Wayside Assembly Circuit Board WIB1 including the attached Wayside Assembly Microcontroller U2, from the 3.7V Lithium Polymer Backup Battery BBA by means of the circuitry as depicted in FIGS. 7A & 7B. The 3.7V Lithium Polymer Backup Battery BBA as depicted in FIG. 4A is protected from the weather and is removably attached inside of the wayside assembly weather resistant enclosure designated as the 12×10×6 Polycarbonate Enclosure BOX by means of a Backup Battery Velcro Holder BBAVH which is in turn is securely attached to the Mounting Plate MP. In the event of a power failure of the sources of electrical power within the Wayside Assembly WIA the Wayside Assembly Microcontroller U2 will still be able to operate by means of the 3.7V electrical power that it receives from the 3.7V Lithium Polymer Backup Battery BBA. In the event of such a power failure, with the power supplied by the 3.7V Lithium Polymer Backup Battery BBA, the Wayside Assembly Microcontroller U2 will generate data indicating the loss of power condition when the Wayside Assembly Microcontroller U1 fails to receive a flow of electrical current from the CHARGE SENSOR that is connected by means of the Wayside Assembly Circuit Board WIB1 circuitry between the Wayside Assembly Microcontroller U2 and both the Power Monitor Positive Connection Point +12V and the Power Monitor Negative Connection Point GND as depicted in FIG. 15C. The Wayside Assembly Microcontroller U2 will then transmit the data indicating the loss of power condition to the CLOUD COMPUTING SERVICE where it may be accessed by the COMPUTER as depicted in FIGS. 15A, 15B & 15C thereby alerting railroad personnel that the Wayside Assembly WIA is not functioning due to loss of power. When the Wayside Assembly WIA has such a loss of power none of The LEDs of the Wayside Lamp Assembly WLA will be illuminated thereby alerting an approaching train that the position of the switch it is approaching is unknown, unless the train has accessed the switch condition data by means of its access to the COMPUTER or by having that information communicated to it by railroad personnel by other means.

The Wayside Assembly Circuit Board WIB1 as depicted in FIGS. 4A, 4B, 6, 7A, 7B & 15C is protected from the weather and is securely attached inside of the wayside assembly weather resistant enclosure designated as the 12×10×6 Polycarbonate Enclosure BOX to the Mounting Plate MP. The Wayside Assembly Circuit Board WIB1 uses an operatively connected and attached Switch Assembly Cellular Microcontroller U2 to monitor six digital inputs it receives via the CLOUD COMPUTING SERVICE from the Switch Assembly SPSCI (the reverse position data; the normal position data; the open position data; the engaged derail position data; the disengaged derail position data; and the loss of power condition data) and three analog inputs from the Wayside Assembly Circuit Board WIB1 (one each from: the Wayside Solar Controller WSC1; the ambient temperature inside the 12×10×6 Polycarbonate Enclosure BOX which temperature is monitored and temperature input is generated by a Temperature Sensor U3; and the wayside assembly battery designated as the 12V Lead Acid Battery BA1). The Temperature Sensor U3 is used for diagnostic purposes to make sure the temperature inside the enclosure of the 12×10×6 Polycarbonate Enclosure BOX does not go above 140 F and to monitor how often the temperature is below −4 F where the 12V Lead Acid Battery BA1 will begin to lose optimal charge capability. With this collective data, the Wayside Assembly Cellular Microcontroller U3 determines the position of the Manual Rail Switch MRSW, the position of the Derail DR, the device temperature, and power status and sets the corresponding LED (light emitting diodes) indicators (Wayside Assembly Circuit Board Blue LED D6, Wayside Assembly Circuit Board Red LED D7, Wayside Assembly Circuit Board Yellow LED D8 and Wayside Assembly Circuit Board Green LED D9 on the Wayside Assembly Circuit Board WIB1 using four digital outputs. The device firmware runs on the Wayside Assembly Cellular Microcontroller U2 and interfaces to a user selected cloud computing service platform CLOUD COMPUTING SERVICE via the built in cell modem that transmits by means of a user selected cellular network the data that it receives from the Wayside Circuit Board WIB1 by means of the Cellular Antennae CA. As depicted in FIGS. 4A, 4B, 15A, 15B & 15C the data is transmitted by means of the Wayside Assembly Cellular Microcontroller U2 cellular transmission through a Cellular Antennae Connecting Wire CACW connected to a Cellular Antennae CA then to the CLOUD COMPUTING SERVICE of a user selected cloud computing service provider via a cellular network, where an event is triggered to forward the data on to the COMPUTER's database where it generates user selected displays as depicted in FIGS. 16-21 and is accessible remotely by a PC, Laptop, Personal Electronic Device, Tablet or Cell Phone via the World Wide Web and other authorized user programmed functions responsive to the data such as: activating an audible alarm; activating a flasher or other illumination; generating an automated phone call to user selected railroad and/or emergency personnel; transmitting a radio signal message; transmitting an email; transmitting a text message; activating switches, activating crossing gates and/or other active railroad warning devices, activating automatic train control devices such as Positive Train Control and the like. The Wayside Assembly Cellular Microcontroller U2 by means of the CLOUD COMPUTING SERVICE connection may be rebooted and/or reprogrammed remotely by authorized users on their devices or by means of the COMPUTER. The Wayside Assembly Cellular Microcontroller U2 may be rebooted by means of the Reset Switch RESET of the Board Condition Monitoring Assembly BMA on the Wayside Assembly Circuit Board WIB1. The Wayside Assembly Cellular Microcontroller U2 may also be rebooted and/or reprogrammed by connecting a computer or other electronic device to the Wayside Assembly Circuit Board WIB1 by means of the USB Type A Female Connector USB.

As depicted in FIGS. 4A, 4B, 7A, 7B & 15C the Wayside Assembly Cellular Microcontroller U2 is powered by the wayside assembly battery designated as the 12V Lead Acid Battery BA1 and receives five volts external power via the 12V Lead Acid Battery BA1 connection to the Switch Assembly Solar Controller SC1 which is also connected to the 100 W 17V Solar Panel PN2. Given the extremely low current draw of the Wayside Assembly Cellular Microcontroller U2, the 12V Lead Acid Battery BA1 being 20 aH provides enough power for the Wayside Assembly WIA to operate for at least a week without any sunlight. This is especially important on short, cloudy winter days.

As depicted in FIGS. 3A, 3B, 4A, 4B, 10, 11A, 11B, 15A & 15B when all of the Switch Assembly(ies) SPSCI Manual Rail Switch(es) MRSW are set in the normal position and all the Derails DR are engaged as depicted in FIG. 13 the Switch Assembly Cellular Microcontroller(s) U1 transmits that normal position data and engaged derail position data to the CLOUD COMPUTING SERVICE where it is accessed by one or more Wayside Assembly Cellular Microcontrollers WIB1 that have been programmed access to all the data transmitted from the particular Switch Assembly(ies) SPSCI being signaled by the Wayside Assembly(ies) WIA by means of the Wayside Assembly Cellular Microcontrollers WIB1. The Wayside Assembly Cellular Microcontroller U2 processes the normal position data and engaged derail position data and then based upon that data closes the wayside assembly normal 5V reed relay Wayside Green Relay K3. The closed Wayside Green Relay K3 in turn then completes a 12V circuit to the Wayside Green LED WGLED which is illuminated thereby.

When one or more of the Switch Assembly(ies) SPSCI Manual Rail Switch(es) MRSW is set in the normal position as depicted in FIG. 13, however any one of the Derails DR is set to the disengaged position as depicted in FIG. 12 the Switch Assembly Cellular Microcontroller(s) U1 transmits that normal position data and disengaged derail position data to the CLOUD COMPUTING SERVICE where it is accessed by one or more Wayside Assembly Cellular Microcontrollers WIB1 that have been programmed access to data from the particular Switch Assembly(ies) SPSCI. The Wayside Assembly Cellular Microcontroller U2 processes the disengaged derail position data and overrides all normal position and reverse position data (but not open position data) and then repeatedly opens and closes the wayside assembly reverse 5V reed relay Wayside Yellow Relay K2. The repeatedly opened and closed Wayside Yellow Relay K2 in turn then completes a 12V circuit to the Wayside Yellow LED WYLED which is caused to flash on and off thereby.

When one or more of the Switch Assembly(ies) SPSCI Manual Rail Switch(es) MRSW is set in the reverse position as depicted in FIG. 12 but all the Derails DR being monitored are set to the engaged position as depicted in FIGS. 13 & 14 the Switch Assembly Cellular Microcontroller(s) U1 transmits that reverse position data and engaged derail position data to the CLOUD COMPUTING SERVICE where it is accessed by one or more Wayside Assembly Cellular Microcontrollers WIB1 that have been programmed access to data from the particular Switch Assembly(ies) SPSCI. The Wayside Assembly Cellular Microcontroller U2 processes the reverse position data and engaged derail position data overriding all normal position data (but not open position data) and then closes the wayside assembly reverse 5V reed relay Wayside Yellow Relay K2. The closed Wayside Yellow Relay K2 in turn then completes a 12V circuit to the Wayside Yellow LED WYLED which is illuminated thereby.

When one or more of the Switch Assembly(ies) SPSCI Manual Rail Switch(es) MRSW is set in the reverse position and the Derail DR is set to the disengaged position as depicted in FIG. 12 the Switch Assembly Cellular Microcontroller(s) U1 transmits that reverse position data and disengaged derail position data to the CLOUD COMPUTING SERVICE where it is accessed by one or more Wayside Assembly Cellular Microcontrollers WIB1 that have been programmed access to data from the particular Switch Assembly(ies) SPSCI. The Wayside Assembly Cellular Microcontroller U2 processes the disengaged derail position data and overrides all normal position and reverse position data (but not open position data) and then repeatedly opens and closes the wayside assembly reverse 5V reed relay Wayside Yellow Relay K2. The repeatedly opened and closed Wayside Yellow Relay K2 in turn then completes a 12V circuit to the Wayside Yellow LED WYLED which is caused to flash on and off thereby.

When one or more of the Switch Assembly(ies) SPSCI Manual Rail Switch(es) MRSW is set in the open position as depicted in FIG. 14 the Switch Assembly Cellular Microcontroller(s) U1 transmits that open position data and any derail position data to the CLOUD COMPUTING SERVICE where it is accessed by one or more Wayside Assembly Cellular Microcontrollers WIB1 that have been programmed access to data from the particular Switch Assembly(ies) SPSCI. The Wayside Assembly Cellular Microcontroller U2 processes the open position data and overrides all loss of power condition, derail position, normal position, and reverse position data and then closes the wayside assembly open 5V reed relay Wayside Red Relay K1. The closed Wayside Red Relay K1 in turn then completes a 12V circuit to the Wayside Red LED WRLED which is caused to illuminate thereby.

When one or more of the Switch Assembly(ies) SPSCI Manual Rail Switch(es) MRSW experiences a power failure such that the Switch Assembly Cellular Microcontroller(s) U1 now powered only by the 3.7V Lithium Polymer Backup Battery BBA then transmits that loss of power condition data to the CLOUD COMPUTING SERVICE where it is accessed by one or more Wayside Assembly Cellular Microcontrollers WIB1 that have been programmed access to data from the particular Switch Assembly(ies) SPSCI. The Wayside Assembly Cellular Microcontroller U2 processes the loss of power condition data and overrides all derail position, normal position and reverse position data (but not open position data) and then repeatedly opens and closes the wayside assembly open 5V reed relay Wayside Red Relay K1. The repeatedly opened and closed Wayside Red Relay K1 in turn then completes a 12V circuit to the Wayside Red LED WRLED which is caused to flash on and off thereby.

In the event that the Wayside Assembly Cellular Microcontrollers WIB1 are not receiving any data from the Switch Assembly(ies) SPSCI the Wayside Lamp Assembly WLA will remain dark and none of The LEDS will be illuminated in any way. This event can occur as a result of a loss of connection to the CLOUD COMPUTING SERVICE or loss of cellular service by either the Switch Assembly(ies) SPSCI or the Wayside Assembly WIA, as well as other equipment failures. In the event that data transmission is restored to the Wayside Assembly Microcontroller U2, the Wayside Assembly Microcontroller U2 then resumes functioning such that the Wayside Lamp Assembly WLA will once again illuminate as programmed as set forth above.

Figure 6:
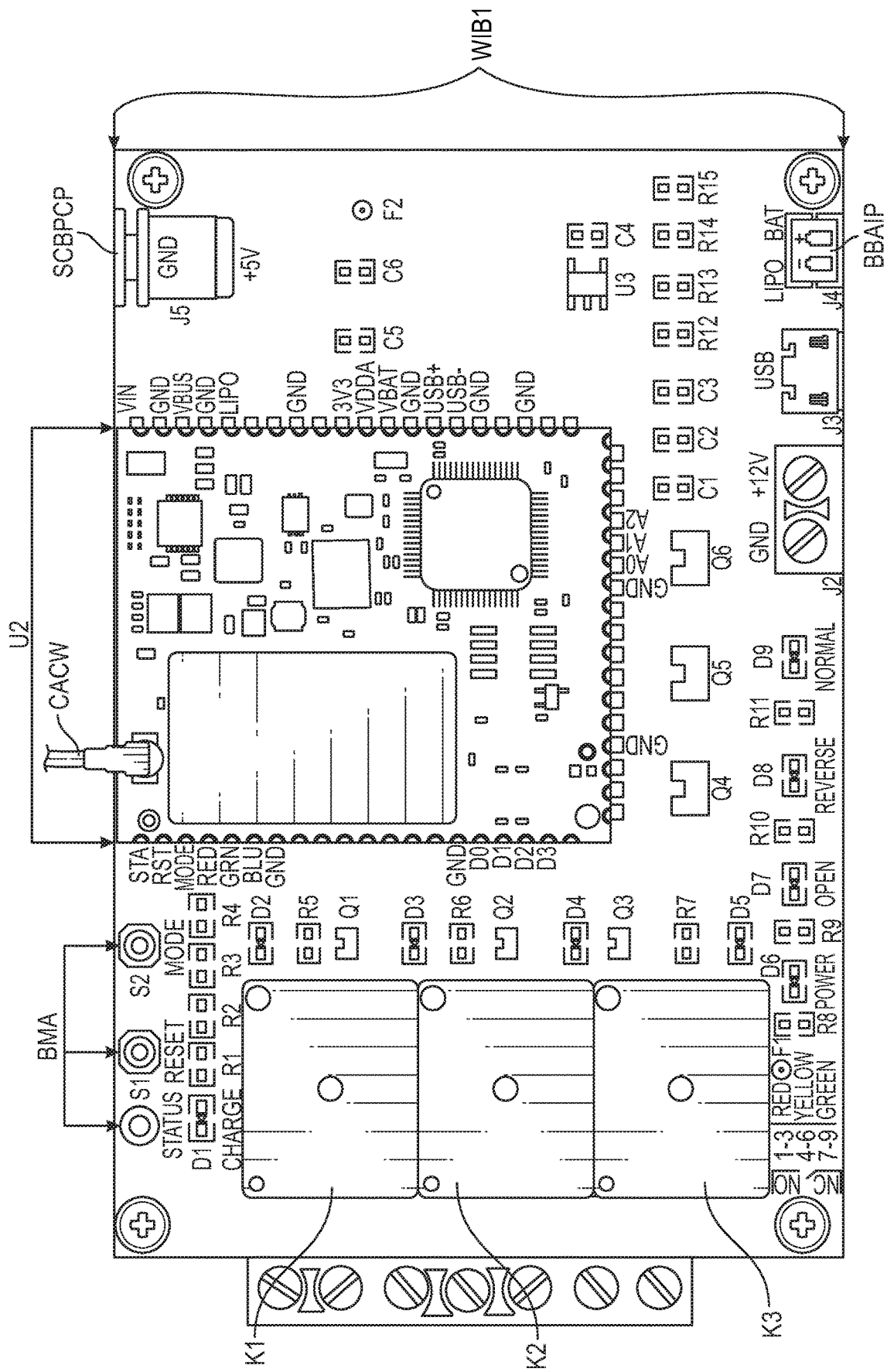
FIG. 6 is a top view of the Wayside Assembly Circuit Board WIB1 depicted in FIGS. 4A, 4B, 7A, & 7B.

As depicted in FIGS. 6, 7A & 7B input A0 is used to determine if the Wayside Assembly Cellular Microcontroller U2 has power. Input A1 is used to determine the temperature of the device via the Temperature Sensor U3. Input A2 is used to determine the charge status of the battery and power output of the Wayside Assembly Solar Controller WSC1 by means of the CHARGE SENSOR. Pins D7-D9 on the Wayside Assembly Cellular Microcontroller U2 are used to control (illuminate) four status indicator LED's located on the Wayside Assembly Circuit Board WIB1 which LEDs are; 1) a Wayside Assembly Circuit Board Blue LED D6 which when illuminated indicates that the Wayside Assembly Cellular Microcontroller U3 has 5V external power; 2) a Wayside Assembly Circuit Board Green LED D9 which when illuminated indicates that the Manual Rail Switch MRSW is in the normal position as depicted in FIG. 13; 3) a Wayside Assembly Circuit Board Yellow LED D8 which when illuminated indicates that the Manual Rail Switch MRSW is in the reverse position as depicted in FIG. 12; and 4) a Wayside Assembly Circuit Board Red LED D7 which when illuminated indicates that the Manual Rail Switch MRSW is in the open position as depicted in FIG. 14. The Wayside Assembly WIA component of the Solar Powered Cell Network Switch Point Indicator System as depicted in FIGS. 1A-21 will perform its intended function regardless of the type of railroad switch or railroad derail that is used which include, but is not limited to automatic switches, power assisted switches, automatic derails or power assisted derails. The data that is indicated by the four LEDs is also transmitted to the user selected CLOUD COMPUTING SERVICE by means of the Wayside Assembly Cellular Microcontroller U2 through the connected Cellular Antennae CA to the CLOUD COMPUTING SERVICE of a user selected cloud service provider via a user selected cellular network, where an event is triggered to forward the data on to a database on the COMPUTER as depicted in FIGS. 15A, 15B & 15C. The Cellular Antennae CA as depicted in FIG. 4A is protected from the weather and is securely attached inside of the switch assembly weather resistant enclosure designated as the 12×10×6 Polycarbonate Enclosure BOX by means of a Cellular Antennae Bracket CAB which is in turn is attached to the Mounting Plate MP.

Computer Access to Data

As depicted in FIGS. 15A, 15B & 15C data from the Switch Assembly(ies) SPSCI and the Wayside Assembly (ies) WIA are transmitted to the CLOUD COMPUTING SERVICE over a user selected cellular network where it may be accessed by one or more COMPUTER(S). With this connection through the CLOUD COMPUTING SERVICE not only may the position of all the user selected switches and derails be monitored on the COMPUTER(S), by means of the COMPUTER(S) the Switch Assembly Cellular Microcontroller U1 and the Wayside Assembly Cellular Microcontroller U2 may be remotely programmed and/or rebooted.

The COMPUTER(S) in the best mode is programmed with proprietary software that allows the computer to process the data from the Switch Assembly SPSCI that it has received over the cloud computing service to which it is connected for ultimate generation of a plurality of proprietary screen displays containing the data such as those depicted in FIGS. 16-21. The screen displays may then be selected and viewed by an authorized user including train crew personnel by means of a user selected device such as the COMPUTER(S), a personal computer, laptop computer, a personal electronic device, a tablet or cellular phone which has access to the data on the COMPUTER(S) by means of a direct connection, WiFi or the Internet. By means of the COMPUTER(S) an authorized user may program additional uses of the data it receives, such as: sounding an audible alarm; causing one or more lights to light up or flash; sending a text message to a mobile device; placing a telephone call with a voice message given once answered; broadcast a radio signal; send an email; print reports; activate a gate or other early warning device at a railroad crossing; contact select emergency personnel; activate railroad switches, activate derails; and activate automatic or positive train control devices.

The COMPUTER also being programmed to monitor the cellular signal strength and integrity of both the Switch Assembly(ies) SPSCI and the Wayside Assembly(ies) WIA.

Software Description:

Several pieces of code are needed to get the hardware signals translated and sent to a database for display on the World Wide Web by means of the CLOUD COMPUTING SERVICE.

The Switch Assembly Cellular Microcontroller U1 and the Wayside Assembly Cellular Microcontroller U2 each have a microcontroller which runs custom firmware written to process the inputs and control the outputs of the Switch Assembly Cellular Microcontroller U1 and the Wayside Assembly Cellular Microcontroller U2, as well as publish an event which is processed on user selected cloud computing service website. When an event is published to the cloud computing service an event is triggered which calls a webpage that inserts the data from the event into a SQL database. The data in the SQL database is then displayed on a webpage which refreshes every fifteen seconds.

Cell data usage is kept to an absolute minimum by using a sixteen bit integer to send all information regarding switch position, power status, cell signal status, temperature, and battery charge state. Bits 0 through 7 contain the battery charge percentage, bit 8 indicates the power status, bit 9 and 10 indicate the switch point position, bit 11 indicates the update type, bit 12 through 14 indicates the temperature, and bit 15 indicates the cell signal quality.

The sixteen bit integer as well as the event time stamp are inserted into the SQL database by a simple ASP.NET webpage that is called by the cloud computing service when an event is published from the Switch Assembly Cellular Microcontroller U1 and the Wayside Assembly Cellular Microcontroller U2. The SQL database contains a custom view/query that decodes the integer bits for battery charge percentage, power status, temperature, switch point position, cell signal quality, and the update type for display on a web page. The status of the Manual Rail Switch MRSW is viewed on separate ASP.NET webpage which reads from the SQL database and refreshes every fifteen seconds. Two additional web pages allow for detailed and switch change history display.

Enhancements:

While this invention's primary use will be with mechanical switches in Dark Territory it may also be incorporated into use with all forms of automatic train control systems, wayside signalization, including positive train control. The device can also be integrated with smartlock technologies that will allow real time monitoring of railroad switch lock tampering. Current technologies utilizing traditional analog and radio controlled devices have significant limitations and are quite costly to power, install and maintain. This invention's solar/battery powering and use of cloud computing service based cellular transmission of data is adaptable to fit within all existing railroad switch control technologies outlined in the prior art above. Additionally as the quality of micro camera technology continues to improve and becomes less expensive the integration of cameras into my invention would be a useful improvement.

It is also possible to incorporate BlueTooth or other WiFi technologies that would permit wireless connection of some of the component parts of my invention. This could reduce the cost of hard wiring the device. As mentioned above my invention is intended to monitor as many railroad switches and derails desired by a user. Additionally as disclosed above and depicted in the drawings FIGS. 3A & 3B it is not uncommon to have more than one switch and derail being monitored in a block which are not far apart from each other and that are signaled by two wayside lamp assemblies, one for each approach to the switches and derails in the block. An improvement to my current invention would be to add additional relays and circuitry to the Switch Assembly Circuit Board SIB1 such that multiple switch circuit controllers and derail circuit controllers may be independently monitored by one Switch Assembly Cellular Microcontroller U1 thereby enabling the COMPUTER(S) and the Wayside Assembly WIA to have access to separate data with respect to each switch and derail being monitored in that block. Where there are several switches and derails being monitored in relatively close proximity this ability could significantly reduce the cost of monitoring since only one power source and one cellular microprocessor would be required. In FIG. 3B are depicted two switch circuit controllers and two derail circuit controllers connected in parallel to the same switch assembly circuit board. While this configuration is capable of transmitting the most restrictive data for signalization it would not be possible for a user accessing the data via the COMPUTER(S) to determine the conditions of all the switches and derails since only the most restrictive data will be of any value to determine the appropriate wayside signalization. Ironically as disclosed above for purposes of the wayside signal that is generated by means of the configuration depicted in FIG. 3B and the above referenced improvement there would be no difference, just the data that would be accessible by the COMPUTER.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For example it would be obvious to cast the various components out of different types of plastics or other suitable materials or to make the device in different colors or fanciful shapes. It would also be obvious to design this invention to accommodate other electronic interfaces and controllers in common use in the railroad industry. It would also be obvious to make this invention with additional water proof features or water resistant thereby protecting the electronic components of this invention.

The above used terms, including "attached," "connected," "fastened," "secured," "coupled," "integrated," and the like are used interchangeably. In addition, while certain embodiments have been described to include a first element as being "coupled" (or "attached," "connected," "fastened," etc.) to a second element, the first element may be directly coupled to the second element or may be indirectly coupled to the second element via a third element.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Any actual dimensions listed are those of the preferred embodiments. Actual dimensions or exact hardware details and means may vary in a final product or most preferred embodiments and should be considered means for so as not to narrow the claims of the patent. Thus, the previous description is not intended to be limited to the implementations shown herein but is to be accorded the widest scope consistent with the principles and novel features disclosed herein. Accordingly, the scope of the invention should be determined not by the embodiments illustrated, but by the claims and their legal equivalents which accompany this application.

Having described my invention, I claim:

1. A solar powered cell network switch point indicator system comprised of:
   a switch assembly;
   the switch assembly being further comprised of: a switch assembly solar panel; at least one switch assembly weather resistant enclosure; a switch assembly solar controller; a switch assembly cellular microcontroller; a switch assembly cellular antennae connected to the switch assembly cellular microcontroller; a switch assembly battery; a switch assembly circuit board; at least one railroad switch position detection means; and at least one railroad derail position detection means;
   the switch assembly weather resistant enclosure being capable of providing weather protection to the switch assembly solar controller; the switch assembly cellular microcontroller; the switch assembly cellular antennae connected to the switch assembly cellular microcontroller; the switch assembly battery; and the switch assembly circuit board;
   at least one wayside assembly;
   the wayside assembly being further comprised of: a wayside assembly solar panel; at least one wayside assembly weather resistant enclosure; a wayside assembly solar controller; a wayside assembly cellular microcontroller; a wayside assembly battery; a wayside assembly cellular antennae connected to the wayside assembly cellular microcontroller; a wayside assembly circuit board; and a wayside signal means;
   the wayside assembly weather resistant enclosure being capable of providing weather protection to the wayside assembly solar controller; the wayside assembly cellular microcontroller; the wayside assembly cellular antennae connected to the wayside assembly cellular microcontroller; the wayside assembly battery; and the wayside assembly circuit board;
   a user selected cloud computing service;
   a user selected cellular network;
   at least one computer with Internet access capable of connecting to the user selected cloud computing service;
   the switch assembly and the wayside assembly being electronically connected to the user selected cloud computing service by means of the user selected cellular network;
   the computer being in electronic communication with the switch assembly and the wayside assembly by means of the user selected cloud computing service which the computer is capable of accessing by means of the Internet;
   the switch assembly solar controller being electrically connected to the switch assembly battery, the switch assembly solar panel, the switch assembly cellular microcontroller, the switch assembly circuit board, the railroad switch position detection means and the railroad derail position detection means whereby the switch assembly solar controller is capable of: being powered by the switch assembly solar panel and/or the switch assembly battery; maintaining a charge of the switch assembly battery with the power generated by the switch assembly solar panel; providing electrical power from the switch assembly solar panel and/or the switch assembly battery to the railroad switch position detection means; providing electrical power from the switch assembly solar panel and/or the switch assembly battery to the railroad derail position detection means; monitoring the power generation and storage of the switch assembly; and providing electrical power from the switch assembly solar panel and/or the switch assembly battery to the switch assembly cellular microcontroller;

the switch assembly circuit board also being electrically connected to the switch assembly battery as well as the switch assembly solar controller receiving electrical power thereby;

the switch assembly circuit board by means of an attached charge sensor monitors the electrical power that the switch assembly circuit board receives from the switch assembly battery and/or the switch assembly solar controller and determines the charge status of the switch assembly battery and the status of the power generation being delivered by the switch assembly solar controller, which statuses are then communicated to the switch assembly cellular microcontroller;

the switch assembly cellular microcontroller processes the charge status of the switch assembly battery and the status of the power generation being delivered by the switch assembly solar controller that is communicated from the switch assembly circuit board attached charge sensor according to user programmed parameters to generate user desired power status data that the switch assembly cellular microcontroller then transmits with the aid of the attached switch assembly cellular antennae to the user selected cloud computing service by means of the user selected cellular service whereby the power status data that the switch assembly cellular microcontroller generated can be accessed by the computer and the wayside assembly;

the railroad switch position detection means being electrically connected to the switch assembly circuit board whereby the position of a railroad switch attached to the railroad switch position detection means is communicated to the switch assembly circuit board;

the railroad derail position detection means being electrically connected to the switch assembly circuit board whereby the position of a railroad derail attached to the railroad derail position detection means is communicated to the switch assembly circuit board;

the switch assembly circuit board being in electrical communication with the switch assembly cellular microcontroller such that the position of the railroad switch received by the switch assembly circuit board that is communicated from the railroad switch position detection means and the position of the railroad derail received by the switch assembly circuit board that is communicated from the railroad derail position detection means is thereby communicated to the switch assembly cellular microcontroller where the position of the railroad derail is processed according to user programmed parameters to generate user desired switch position data and derail position data that the switch assembly cellular microcontroller then transmits with the aid of the attached switch assembly cellular antennae to the user selected cloud computing service by means of the user selected cellular service whereby the switch assembly cellular microcontroller user desired switch position data and derail position data that the switch assembly circuit board generated may be accessed by the computer and the wayside assembly;

the wayside assembly solar controller being electrically connected to the wayside assembly battery, the wayside assembly solar panel, the wayside assembly cellular microcontroller, the wayside assembly circuit board, the wayside signal means whereby the wayside assembly solar controller is capable of: being powered by the wayside assembly solar panel and/or the wayside assembly battery; maintaining a charge of the wayside assembly battery with the power generated by the wayside assembly solar panel; providing electrical power from the wayside assembly solar panel and/or the switch assembly battery to the wayside signal means; monitoring the power generation and storage of the wayside assembly; and providing electrical power from the wayside assembly solar panel and/or the wayside assembly battery to the wayside assembly cellular microcontroller;

the wayside assembly circuit board also being electrically connected to the wayside assembly battery as well as the wayside assembly solar controller receiving electrical power thereby;

the wayside assembly circuit board by means of an attached charge sensor monitors the electrical power that the wayside assembly circuit board receives from the wayside assembly battery and/or the wayside assembly solar controller and determines the charge status of the wayside assembly battery and the status of the power generation being delivered by the wayside assembly solar controller, which statuses are then communicated to the wayside assembly cellular microcontroller;

the wayside assembly cellular microcontroller processes the charge status of the wayside assembly battery and the status of the power generation being delivered by the wayside assembly solar controller that is communicated from the wayside assembly circuit board attached charge sensor according to user programmed parameters to generate user desired power status data that the wayside assembly cellular microcontroller then transmits with the aid of the attached wayside assembly cellular antennae to the user selected cloud computing service by means of the user selected cellular service whereby the power status data that the wayside assembly cellular microcontroller generated can be accessed by the computer;

the wayside assembly cellular microcontroller with the aid of the wayside assembly cellular antennae being in electronic communication with the user selected cloud computing service by means of the user selected cellular service thereby facilitating electronic communication with the computer and the switch assembly cellular microcontroller;

the wayside assembly cellular microcontroller being programmed to user defined parameters to receive and process from the user selected cloud computing service by means of the user selected cellular service the user desired switch position data and derail position data generated by the switch assembly cellular microcontroller that the switch assembly cellular microcontroller transmitted to the user selected cloud computing service for access by the computer and the wayside assembly;

the wayside assembly circuit board being in electrical communication with the wayside assembly cellular microcontroller such that the user desired switch position data and derail position data generated by the wayside assembly cellular microcontroller then activates at least one relay on the wayside assembly circuit board according to user programmed parameters, which relay(s) then provides electrical power to the wayside signal means from the wayside assembly solar controller and/or the wayside assembly battery activating the wayside signal means which thereby generates a wayside signal; and the computer being capable of being programmed to process: the user desired switch position data and derail position data generated by the switch assembly cellular microcontroller; the switch assembly user desired power status data generated by the switch assembly cellular microcontroller; the wayside assembly user desired power status data generated by the wayside assembly cellular microcontroller, and then complete at least one user selected functions selected from the group consisting of: generating user selected screen displays depicting the processed data; generating and sending email messages containing user selected portions of the processed data to user selected email addresses; generating and sending text messages containing user selected portions of the processed data to user selected cellular enabled devices; activating audible alarms; activating visual alarms; providing user defined access to the computer to user authorized electronic devices providing access to the processed data thereby; activating railroad active warning devices; activating railroad switches; activating railroad derail devices; activating automatic train control devices; integrating with computer automated dispatch systems; and activating positive train control devices.

2. The solar powered cell network switch point indicator system of claim 1 wherein the user authorized electronic devices are further comprised of at least one user authorized electronic device selected from the group consisting of: a laptop computer; a personal computer; a tablet; a personal electronic device; or a cellular telephone.

3. The solar powered cell network switch point indicator system of claim 1 wherein the switch assembly circuit board is further comprised of a switch assembly temperature sensor;

the switch assembly temperature sensor being capable of measuring the ambient temperature inside the switch assembly weather resistant enclosure thereby generating switch assembly temperature data;

the circuit board being capable of electronically communicating the switch assembly temperature data to the switch assembly cellular microcontroller; and the switch assembly cellular microcontroller being capable of processing the switch assembly temperature data and transmitting the processed switch assembly temperature data to the user selected cloud computing service by means of the user selected cellular service whereby the processed switch assembly temperature data may be accessed by the computer.

4. The solar powered cell network switch point indicator system of claim 3 wherein the wayside assembly circuit board is further comprised of a wayside assembly temperature sensor;

the wayside assembly temperature sensor being capable of measuring the ambient temperature inside the wayside assembly weather resistant enclosure thereby generating wayside assembly temperature data;

the circuit board being capable of electronically communicating the wayside assembly temperature data to the wayside assembly cellular microcontroller;

the wayside assembly cellular microcontroller being capable of processing the wayside assembly temperature data and transmitting the processed wayside assembly temperature data to the user selected cloud computing service by means of the user selected cellular service whereby the processed wayside assembly temperature data may be accessed by the computer.

5. The solar powered cell network switch point indicator system of claim 4 wherein the solar powered cell network switch point indicator system is further comprised of:

at least one switch assembly backup battery connected to the switch assembly circuit board;

the switch assembly backup battery being capable of being monitored and charged by the switch assembly solar controller;

at least one wayside assembly backup battery connected to the wayside assembly circuit board; and the wayside assembly backup battery being capable of being monitored and charged by the wayside assembly solar controller.

6. The solar powered cell network switch point indicator system of claim 4 wherein the wayside assembly is further comprised of a wayside assembly weather resistant battery enclosure.

7. The solar powered cell network switch point indicator system of claim 1 wherein the wayside assembly circuit board is further comprised of a wayside assembly temperature sensor;

the wayside assembly temperature sensor being capable of measuring the ambient temperature inside the wayside assembly weather resistant enclosure thereby generating wayside assembly temperature data;

the circuit board being capable of electronically communicating the wayside assembly temperature data to the wayside assembly cellular microcontroller; and the wayside assembly cellular microcontroller being capable of processing the wayside assembly temperature data and transmitting the processed wayside assembly temperature data to the user selected cloud computing service by means of the user selected cellular service whereby the processed wayside assembly temperature data may be accessed by the computer.

8. The solar powered cell network switch point indicator system of claim 1 wherein the position of the railroad switch attached to the railroad switch position detection means communicated to the switch assembly circuit board is comprised of two position outputs, a normal position output and a reverse position output which are generated by the railroad switch position detection means;

the railroad switch having three possible positions wherein the three possible positions are a normal position; a reverse position and an open position;

the normal position output being generated by the railroad switch position detection means when the railroad switch is in the normal position whereby a train can pass over the switch traveling on a railroad line of a railroad;

the reverse position output being generated by the railroad switch position detection means when the railroad switch is in the reverse position whereby a train cannot pass over the switch traveling on a railroad line of a railroad but may enter upon a railroad siding by means of the railroad switch in one direction only;

the normal position output when present activates a normal condition relay connected to the switch assembly circuit board thereby illuminating a green LED attached to the switch assembly circuit board and permitting the transmission of the normal position output to the switch assembly cellular microcontroller where the normal position output is processed to generate a normal position data output which is then transmitted to the user selected cloud computing service by means of the user selected cellular service whereby the normal position data output may be accessed by the computer and the wayside assembly;

the reverse position output when present activates a reverse condition relay connected to the switch assembly circuit board thereby illuminating a yellow LED attached to the switch assembly circuit board and permitting the transmission of the reverse position output to the switch assembly cellular microcontroller where the reverse position output is processed to generate a reverse position data output which is then transmitted to the user selected cloud computing service by means of the user selected cellular service whereby the reverse position data output may be accessed by the computer and the wayside assembly;

the switch assembly cellular microcontroller being programmed to generate an open position data output in the event the switch assembly circuit board is not transmitting to the switch assembly cellular microcontroller either the normal position output or the reverse position output thereby indicating that the railroad switch is in the open position;

the open position data output being generated by the switch assembly cellular microcontroller when the railroad switch is in the open position and is in neither the reverse position or the normal position whereby a train cannot pass over the railroad switch regardless of its direction of travel;

the switch assembly cellular microcontroller illuminates a red LED attached to the switch assembly circuit board when the switch assembly cellular microcontroller is generating an open position data output and the open position data output is also transmitted to the user selected cloud computing service by means of the user selected cellular service whereby the open position data output may be accessed by the computer and the wayside assembly.

9. The solar powered cell network switch point indicator system of claim 8 wherein the wayside signal means is comprised of a green light; a yellow light; and a red light;

the green light being electrically connected to a wayside normal position relay attached to the wayside assembly circuit board;

the yellow light being electrically connected to a wayside reverse position relay attached to the wayside assembly circuit board;

the red light being electrically connected to a wayside open position relay attached to the wayside assembly circuit board;

the wayside signal being comprised of the illumination of the green light, the yellow light or the red light;

the wayside signal being visible to a train crew operating a railroad train on a railroad line as the railroad train approaches the wayside signal means thereby communicating to the train crew whether or not the railroad train may pass over the railroad switch being monitored by the solar powered cell network switch point indicator system that it will be approaching further along on the railroad line in the railroad train's direction of travel;

the normal position data output when present and thereby accessed by the wayside assembly cellular microcontroller is processed by the wayside assembly cellular microcontroller to produce a green data output that activates the wayside normal position relay;

the activated wayside normal position relay illuminates a green LED attached to the wayside assembly circuit board and the activated wayside normal position relay illuminates the green light of the wayside signal means;

the illuminated green light of the wayside signal means signaling the train crew of the approaching train that the railroad switch being monitored by the solar powered cell network switch point indicator system that they are approaching is in the normal position and therefore the approaching train can pass over the railroad switch being monitored by the solar powered cell network switch point indicator system;

the reverse position data output when present and thereby accessed by the wayside assembly cellular microcontroller is processed by the wayside assembly cellular microcontroller to produce a yellow data output that activates a wayside reverse position relay;

the activated wayside reverse position relay illuminates a yellow LED attached to the wayside assembly circuit board and the activated wayside reverse position relay illuminates the yellow light of the wayside signal means;

the illuminated yellow light of the wayside signal means signaling the train crew of the approaching train that the railroad switch being monitored by the solar powered cell network switch point indicator system that they are approaching is in the reverse position and therefore the approaching train will not be able to pass over the railroad switch being monitored by the solar powered cell network switch point indicator system on the railroad line, but may enter upon a railroad siding made accessible by the railroad switch being monitored by the solar powered cell network switch point indicator system and the approaching train must approach the railroad switch being monitored by the solar powered cell network switch point indicator system with caution;

the open position data output when present and thereby accessed by the wayside assembly cellular microcontroller overrides all other data accessed by the wayside assembly cellular microcontroller and is processed by the wayside assembly cellular microcontroller to produce a red data output that activates a wayside open position relay;

the activated wayside open position relay illuminates a red LED attached to the wayside assembly circuit board and the activated wayside open position relay illuminates the red light of the wayside signal means; and the illuminated red light of the wayside signal means signaling the train crew of the approaching train that the railroad switch being monitored by the solar powered cell network switch point indicator system that they are approaching is neither in the normal position or the reverse position and therefore the approaching train will not be able to pass over the railroad switch being monitored by the solar powered cell network switch point indicator system and the approaching train must approach the railroad switch with caution.

10. The solar powered cell network switch point indicator system of claim 9 wherein the position of a railroad derail attached to the railroad derail position detection means being communicated to the switch assembly circuit board is comprised of one output being an engaged derail position output wherein the engaged derail position output is generated by the railroad derail position detection means when the railroad derail is engaged and operative;
   the engaged derail position output when present activates an engaged derail condition relay connected to the switch assembly circuit board thereby illuminating an orange LED attached to the switch assembly circuit board and permitting the transmission of the engaged derail position data output to the switch assembly cellular microcontroller where the disengaged derail position output is processed to generate a engaged derail position data output which is then transmitted to the user selected cloud computing service by means of the user selected cellular service whereby the engaged derail position data output may be accessed by the computer and the wayside assembly;
   the wayside assembly cellular microcontroller being programmed such that when the engaged derail position data output and the open position data output are both not present the wayside assembly cellular microcontroller overrides and does not process the normal position data output or the reverse position data output;
   the engaged derail position data output and the open position data output when not present are both processed by the wayside assembly cellular microcontroller to produce a flashing yellow data output that repeatedly activates and deactivates the wayside reverse position relay;
   the repeatedly activated and deactivated wayside reverse position relay then causes the yellow LED attached to the wayside assembly circuit board to flash on and off;
   the repeatedly activated and deactivated wayside reverse position relay also causes the yellow light of the wayside signal means to flash on and off
   the flashing yellow light of the wayside signal means signaling the train crew of the approaching train that the railroad derail being monitored by the solar powered cell network switch point indicator system that they are approaching is in a disengaged position and therefore one or more unattended railcars left on a rail siding intended to be prevented by the derail from rolling too near to or over the railroad switch being monitored by the solar powered cell network switch point indicator system thereby fouling the railroad line may have rolled to a position that would not allow the approaching train to pass by the railroad switch on the railroad line without colliding into the unattended railcars and that the approaching train must approach the railroad switch and railroad derail being monitored by the solar powered cell network switch point indicator system with caution.

11. The solar powered cell network switch point indicator system of claim 10 wherein the switch assembly circuit board is further comprised of a switch assembly temperature sensor and the wayside assembly circuit board is further comprised of a wayside assembly temperature sensor;
   the switch assembly temperature sensor being capable of measuring the ambient temperature inside the switch assembly weather resistant enclosure thereby generating switch assembly temperature data;
   the circuit board being capable of electronically communicating the switch assembly temperature data to the switch assembly cellular microcontroller;
   the switch assembly cellular microcontroller being capable of processing the switch assembly temperature data and transmitting the processed switch assembly temperature data to the user selected cloud computing service by means of the user selected cellular service whereby the processed switch assembly temperature data may be accessed by the computer;
   the wayside assembly temperature sensor being capable of measuring the ambient temperature inside the wayside assembly weather resistant enclosure thereby generating wayside assembly temperature data;
   the circuit board being capable of electronically communicating the wayside assembly temperature data to the wayside assembly cellular microcontroller; and
   the wayside assembly cellular microcontroller being capable of processing the wayside assembly temperature data and transmitting the processed wayside assembly temperature data to the user selected cloud computing service by means of the user selected cellular service whereby the processed wayside assembly temperature data may be accessed by the computer.

12. The solar powered cell network switch point indicator system of claim 10 wherein the solar powered cell network switch point indicator system is further comprised of:
   at least one switch assembly backup battery connected to the switch assembly circuit board;
   at least one wayside assembly backup battery connected to the wayside assembly circuit board; and
   the wayside assembly backup battery being capable of being monitored and charged by the wayside assembly solar controller.

13. The solar powered cell network switch point indicator system of claim 12 wherein:
   the switch assembly backup battery is capable of providing electrical power to the switch assembly cellular microcontroller such that in the event that the switch assembly battery and the switch assembly solar controller are no longer providing electrical power to the switch assembly circuit board or the switch assembly cellular microcontroller, the switch assembly cellular microcontroller then generates a power failure data output that is transmitted to the user selected cloud computing service by means of the user selected cellular service whereby the power failure data output may be accessed by the computer and the wayside assembly cellular microcontroller;
   the wayside assembly cellular microcontroller being programmed such that when the power failure data output is present the wayside assembly cellular microcontroller processes the power failure data output to produce a flashing red data output that repeatedly activates and deactivates the wayside open position relay;
   the repeatedly activated and deactivated wayside open position relay then causes the red LED attached to the wayside assembly circuit board to flash on and off;
   the repeatedly activated and deactivated wayside open position relay also causes the red light of the wayside signal means to flash on and off
   the flashing red light of the wayside signal means signaling the train crew of the approaching train that the positions of the railroad switch and railroad derail being monitored by the solar powered cell network switch point indicator system cannot be determined because of a power failure at the switch assembly and that the approaching train must approach the railroad switch and railroad derail being monitored by the solar powered cell network switch point indicator system with caution;

the wayside assembly backup battery is capable of providing electrical power to the wayside assembly cellular microcontroller such that in the event that the wayside assembly battery and the wayside assembly solar controller are no longer providing electrical power to the wayside assembly circuit board or the wayside assembly cellular microcontroller, the wayside assembly cellular microcontroller then generates a wayside assembly power failure data output that is transmitted to the user selected cloud computing service by means of the user selected cellular service whereby the wayside assembly power failure data output may be accessed by the computer;

the wayside signal means will fail to produce any wayside signal in the event that the wayside assembly battery and the wayside assembly solar controller are no longer providing electrical power to the wayside assembly circuit board or the wayside assembly cellular microcontroller;

the wayside signal means will fail to produce any wayside signal in the event that the wayside assembly cellular microcontroller is not receiving any data from the user selected cloud computing service; and the failure of the wayside signal means to produce a wayside signal thereby alerts the train crew of the approaching train that the positions of the railroad switch and railroad derail being monitored by the solar powered cell network switch point indicator system cannot be determined and that the approaching train must approach the railroad switch and railroad derail being monitored by the solar powered cell network switch point indicator system with caution.

14. The solar powered cell network switch point indicator system of claim 12 wherein the wayside assembly is further comprised of a wayside assembly weather resistant battery enclosure.

15. The solar powered cell network switch point indicator system of claim 1 wherein the solar powered cell network switch point indicator system is further comprised of at least one switch assembly backup battery connected to the switch assembly circuit board;

the switch assembly backup battery being capable of being monitored and charged by the switch assembly solar controller.

16. The solar powered cell network switch point indicator system of claim 15 wherein the solar powered cell network switch point indicator system is further comprised of at least one wayside assembly backup battery connected to the wayside assembly circuit board;

the wayside assembly backup battery being capable of being monitored and charged by the wayside assembly solar controller.

17. The solar powered cell network switch point indicator system of claim 1 wherein the solar powered cell network switch point indicator system is further comprised of at least one wayside assembly backup battery connected to the wayside assembly circuit board;

the wayside assembly backup battery being capable of being monitored and charged by the wayside assembly solar controller.

18. The solar powered cell network switch point indicator system of claim 1 wherein the wayside assembly is further comprised of a wayside assembly weather resistant battery enclosure.

* * * * *